Nov. 1, 1949    G. R. STIBITZ    2,486,809
BI-QUINARY SYSTEM CALCULATOR
Filed Sept. 29, 1945    24 Sheets-Sheet 1

INVENTOR
G. R. STIBITZ
BY
ATTORNEY

Nov. 1, 1949

G. R. STIBITZ 2,486,809

BI-QUINARY SYSTEM CALCULATOR

Filed Sept. 29, 1945

INVENTOR
G.R. STIBITZ
BY
ATTORNEY

Nov. 1, 1949  G. R. STIBITZ  2,486,809
BI-QUINARY SYSTEM CALCULATOR
Filed Sept. 29, 1945  24 Sheets-Sheet 3

INVENTOR
G. R. STIBITZ
BY
ATTORNEY

Nov. 1, 1949        G. R. STIBITZ        2,486,809
BI-QUINARY SYSTEM CALCULATOR
Filed Sept. 29, 1945        24 Sheets—Sheet 4

INVENTOR
G. R. STIBITZ
BY
ATTORNEY

Nov. 1, 1949         G. R. STIBITZ         2,486,809
              BI-QUINARY SYSTEM CALCULATOR
Filed Sept. 29, 1945                 24 Sheets-Sheet 5

INVENTOR
G. R. STIBITZ
BY
ATTORNEY

Nov. 1, 1949  G. R. STIBITZ  2,486,809
BI-QUINARY SYSTEM CALCULATOR
Filed Sept. 29, 1945  24 Sheets-Sheet 6

INVENTOR
G. R. STIBITZ
BY John A. Hall
ATTORNEY

Nov. 1, 1949  G. R. STIBITZ  2,486,809
BI-QUINARY SYSTEM CALCULATOR
Filed Sept. 29, 1945  24 Sheets-Sheet 7

INVENTOR
G. R. STIBITZ
BY
ATTORNEY

Nov. 1, 1949        G. R. STIBITZ        2,486,809
BI-QUINARY SYSTEM CALCULATOR
Filed Sept. 29, 1945        24 Sheets-Sheet 8

INVENTOR
G. R. STIBITZ
BY John A. Hall
ATTORNEY

INVENTOR
G. R. STIBITZ

Nov. 1, 1949  G. R. STIBITZ  2,486,809
BI-QUINARY SYSTEM CALCULATOR
Filed Sept. 29, 1945  24 Sheets-Sheet 10
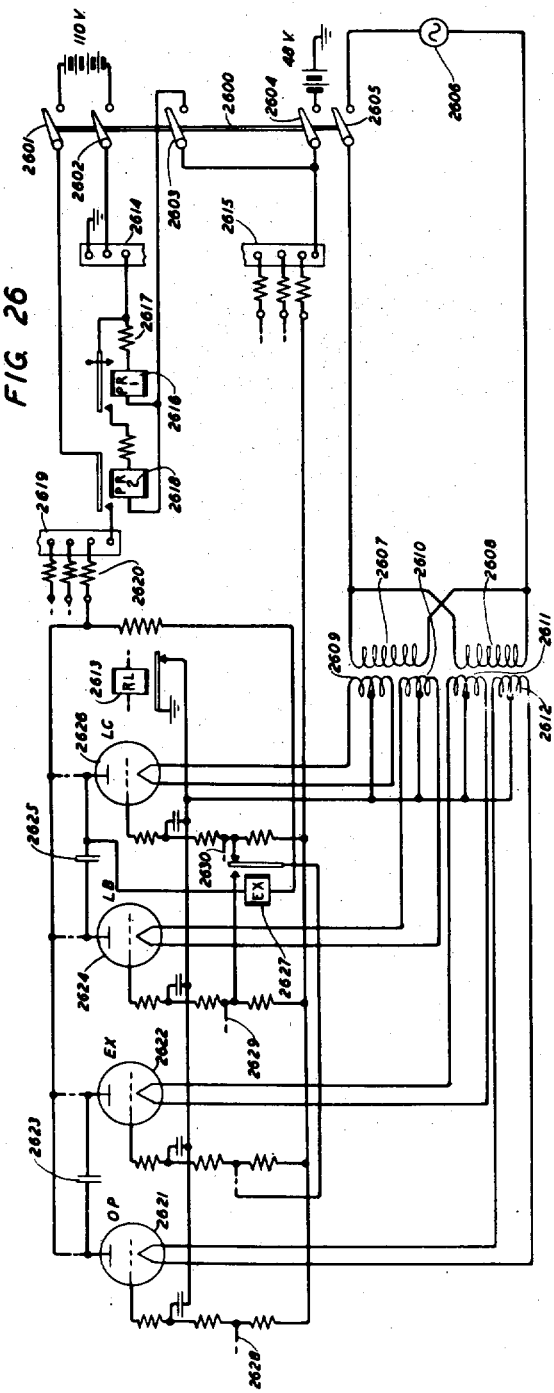
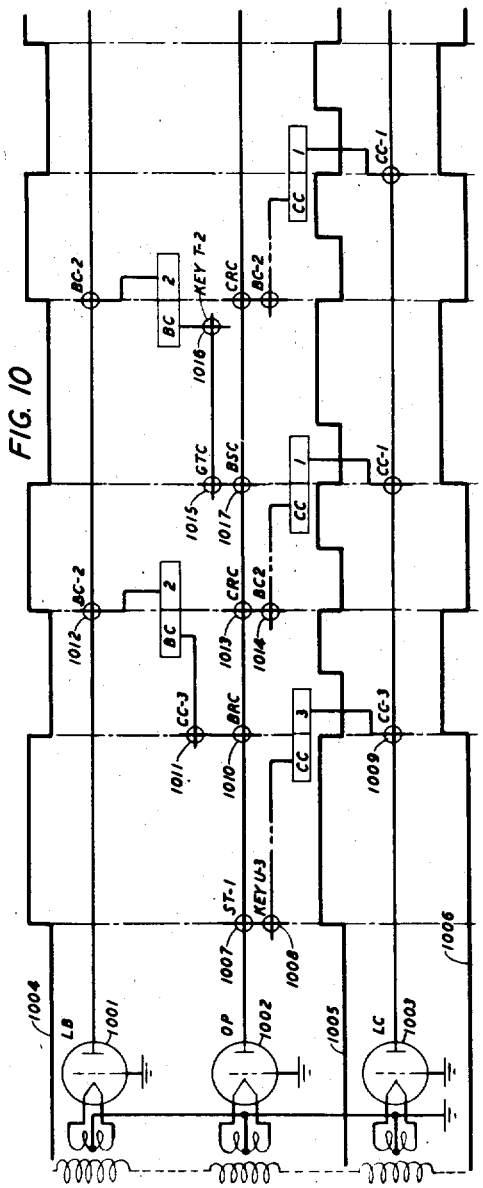
INVENTOR
G. R. STIBITZ
BY
ATTORNEY Nov. 1, 1949 G. R. STIBITZ 2,486,809
BI-QUINARY SYSTEM CALCULATOR
Filed Sept. 29, 1945 24 Sheets-Sheet 11

INVENTOR
G. R. STIBITZ
BY
ATTORNEY

Nov. 1, 1949  G. R. STIBITZ  2,486,809
BI-QUINARY SYSTEM CALCULATOR
Filed Sept. 29, 1945  24 Sheets—Sheet 14

INVENTOR
G. R. STIBITZ
BY John A. Hall
ATTORNEY

Nov. 1, 1949  G. R. STIBITZ  2,486,809
BI-QUINARY SYSTEM CALCULATOR
Filed Sept. 29, 1945  24 Sheets-Sheet 15

INVENTOR
G. R. STIBITZ
BY John A. Hall
ATTORNEY

Nov. 1, 1949 G. R. STIBITZ 2,486,809
BI-QUINARY SYSTEM CALCULATOR
Filed Sept. 29, 1945 24 Sheets-Sheet 16

INVENTOR
G. R. STIBITZ
BY
ATTORNEY

Nov. 1, 1949 G. R. STIBITZ 2,486,809
BI-QUINARY SYSTEM CALCULATOR
Filed Sept. 29, 1945 24 Sheets—Sheet 17

INVENTOR
G. R. STIBITZ
BY
ATTORNEY

INVENTOR
G. R. STIBITZ
ATTORNEY

Nov. 1, 1949 G. R. STIBITZ 2,486,809
BI-QUINARY SYSTEM CALCULATOR
Filed Sept. 29, 1945 24 Sheets-Sheet 20

INVENTOR
G. R. STIBITZ
BY
ATTORNEY

Nov. 1, 1949    G. R. STIBITZ    2,486,809
BI-QUINARY SYSTEM CALCULATOR
Filed Sept. 29, 1945    24 Sheets-Sheet 21

INVENTOR
G. R. STIBITZ
BY
ATTORNEY

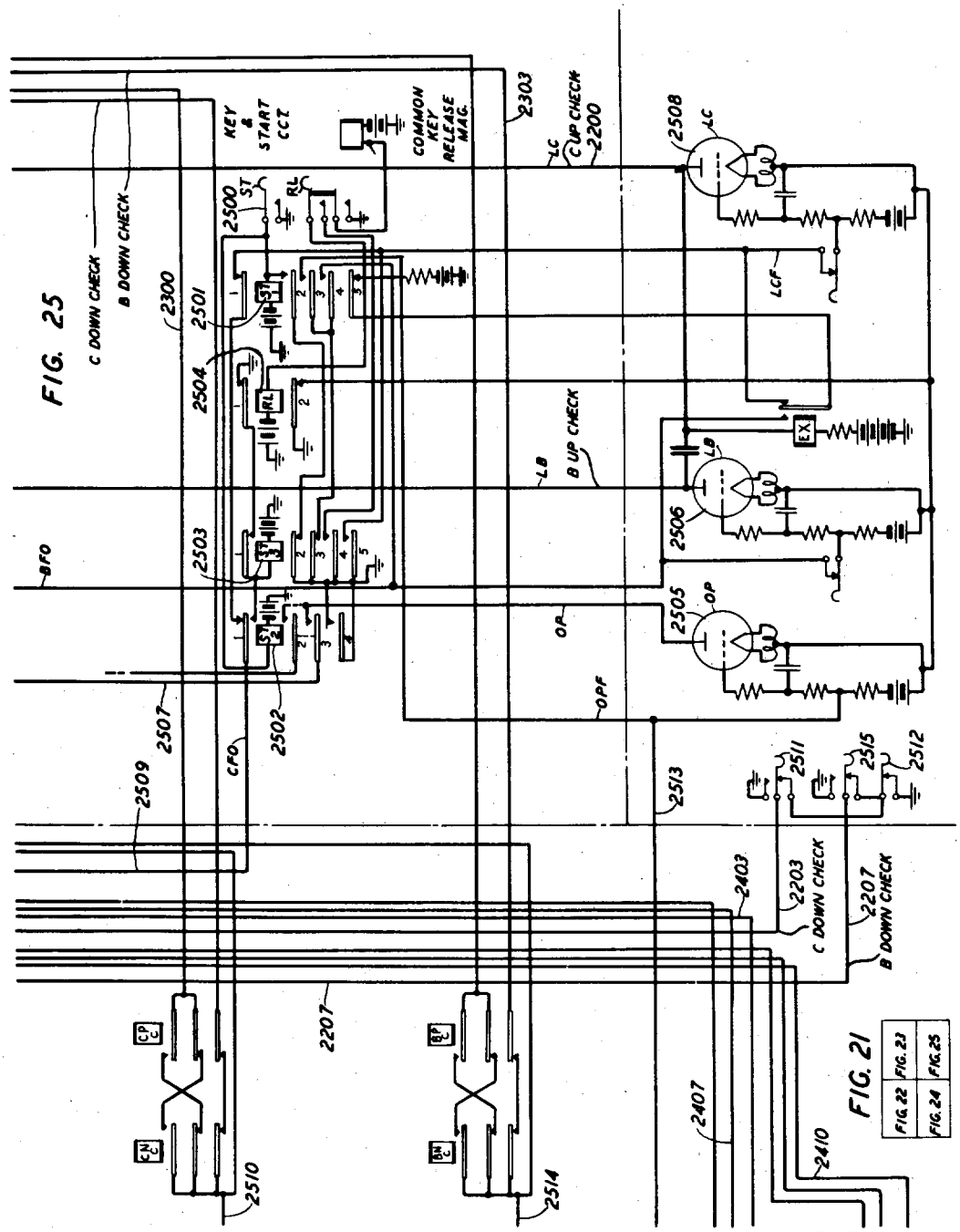

Nov. 1, 1949 G. R. STIBITZ 2,486,809
BI-QUINARY SYSTEM CALCULATOR
Filed Sept. 29, 1945 24 Sheets-Sheet 24

FIG. 27

INVENTOR
G. R. STIBITZ
ATTORNEY.

Patented Nov. 1, 1949

2,486,809

UNITED STATES PATENT OFFICE 2,486,809

BIQUINARY SYSTEM CALCULATOR

George R. Stibitz, Boonton, N. J., assignor to Bell Telephone Laboratories, Incorporated, New York, N. Y., a corporation of New York Application September 29, 1945, Serial No. 619,395

40 Claims. (Cl. 235—61)

1

This invention relates to calculating methods and apparatus and particularly to systems of electrical control. The invention may be characterized as an improvement in summing means.

An object of the invention is to provide an electrical summing means operating on a code basis wherein the same code is employed in the addend, the augend and the sum. The code employed and used within each decimal denominational order is one which lends itself especially well to expression by relay operation employing only front or make contact circuit closing devices where the contact pressure may be easily made of a higher order than back contact pressure.

The present system is known as the biquinary system, the appellation being derived from the fact that each digit is expressed through the selection of one of two alternatives out of a first group of two and one of five alternatives out of a second group of five. One of the groups may thus be said to be on a binary basis whereas the other may be said to be on a qinary basis and the combination of the two groups is, therefore, said to be on a biquinary basis. If the two alternatives in the first group are given the values of 0 and 5 and the five alternatives of the second group are given the values of 0, 1, 2, 3 and 4 respectively, then the ten digits 0 to 9, inclusive, may be expressed by the various permutations of two alternatives one being taken from each group.

A feature of the invention is the use in a calculator of a decimal code system of registration of numbers in a summing device wherein the same code is used in the addend, the augend and the sum elements thereof with carry means provided between decimal denominational orders operating during and as part of the summing cycle. Heretofore summing means have been provided in a decimal code system where the carry operation between decimal orders became a separate operation following the summing cycle. This separate operation has been avoided in two manners, first by translating the whole decimally expressed numbers of the addend, the augend and the sum on a code basis without grouping in decimal denominational orders and second by using a code for the sum differing from the codes used for the addend and the augend. The present invention has the advantage of all these prior art systems combined since the codes used within each decimal denominational order are uniform for the three elements of the summing means and the carry over between decimal orders operates as part of the summing cycle, no time being lost in translation or additional operations after a sum has been found. In accordance with the present system and by way of example, given an augend of eight and an addend

2 of seven the sum is immediately found to be five with a carry over of one into the next higher decimal order.

Another feature of the invention is the simple means for expressing the complement of a number. This is accomplished by inversion, the term inversion or the expression inverting the code or inverting the operation of the code relays being understood hereinafter and in the claims to mean a circuit change whereby the operating circuits for the two relays of the binary portion are interchanged one for the other and the five operating circuits for the five relays of the quinary portion are interchanged in the order 0 to 4, 1 to 3, 3 to 1 and 4 to 0. By this simple circuit change a number expressed by the operation of the code relays is changed to the expression of its nine's complement.

Another feature of the invention is the automatic addition during inversion of the fugitive one whereby the nine's complement of a number produced by the simple operation of inversion is changed to the normal ten's complement. Thus a number such as 2468 may be changed by inversion to 7531 and by the automatic addition of the fugitive one becomes 7532 which is the true ten's complement of 2468, this as well understood being the remainder left when the number 2468 is subtracted from 10000. The fugitive one is that quantity which moves from its normal position to make the subtraction (particularly by mechanical means) possible. Thus when the problem

```
1 0 0 0 0
  2 4 6 8
``` is to be performed, the first operation is a movement of the fugitive one to produce

```
9 9 9 (10)
2 4 6 8
``` whereby a remainder may be calculated. Since the code for each decimal denominational order is the same the operation becomes

```
9 9 9 9
2 4 6 8
7 5 3 1
``` whereupon the fugitive one is automatically added as follows:

```
7 5 3 1
        1
7 5 3 2
```

In accordance with this feature the complement, which is considered a negative number, when expressed in code, is accompanied by the operation of a sign relay and this sign relay controls the carry circuits incoming to the extreme right-hand decimal denominational order. The sign being changed from + to − the carry 1 lead is grounded (electrically characterized) instead of the carry 0 lead. Thus the fugitive one automatically enters the calculation in the extreme right-hand decimal denominational order and the ten's complement is produced.

The fugitive one is simply a carry but it becomes particularly spectacular in its movements when it moves, as above, from one end of a row of numbers to another. It may, therefore, be defined as a carry, either additive or subtractive, which travels through every decimal denominational order of a number.

Another feature of the invention is the use of three sets of code relays for functioning as augend, addend and sum relays, one of said sets permanently operating as addend means and the other two sets alternately operating as augend and sum means. Heretofore where a set of relays acted permanently as sum means, some additional means had to be provided to transfer the sum calculated either to an accumulator or back to the other set of relays permanently acting as augend means. In accordance with this feature the arrangements are much simplified and much apparatus is saved for now a sum calculated is locked into the relays just having acted as a sum means and is used on the next operation as an augend means whereby transfer of the value calculated is avoided.

Another feature of the invention is a column shift arrangement by which the last sum in an iterative addition operation in a multiplication is found by using augend and addend summing relays in the respective decimal denominational orders and cooperatively arranged sum relays of respective preceding decimal denominational orders. By way of example, in the illustrative embodiment of the present invention, if a value transmitted to the addend relays is to be multiplied by 3, then this value is added to 0 (or any other value which may at that time be registered in the augend relays) twice to produce sums on the sum relays of the corresponding decimal denominational orders but the third time on the sum relays of the preceding decimal denominational order. Thus the final addition in a multiplication operation becomes a simultaneous or combined summing and column shifting operation. By thus shifting the sum (which immediately becomes the augend for the next summing operation) the addend remains undisturbed and hence high speed in calculation is attained.

It will be understood that shifting to the left may be done with equal facility, the choice being determined by certain practical considerations.

Another feature of the invention is what may be termed the zero shift. Means are provided where a multiplier digit is 0 to drive the summing relays through a single half summing cycle in the same manner as where the multiplier digit is 1 but with this difference, that whereas in the latter case the addend expressed by the selective operation of the A relays is effectively added in to the sum of the values expressed by the incoming carry and the augend, in the present case such addend value is not so added in. By way of example, if the addend is 03700 and the multiplier digit is 1 the operation will consist of a simultaneous summing and shifting operation, as follows:

```
C 00000
A 03700
―――――
B 00370
```

In the case of the zero shift the operation w appear as follows:

```
C 00000
A 03700
―――――
B 00000
```

Again let us suppose the problem is to mult ply the value 37 by 02 (the value 02 being us rather than simply 2 since the device herein di closed, by way of example, is designed to multip two digit numbers by two digit numbers). T operation would then appear as follows:

```
C 00000
A 03700
B 03700
A 03700
―――――
C 00740
A 03700
―――――
B 00074
```

It therefore appears that regardless of the val of the augend, the zero shift means will sh the columns of the derived sum one place to t right and at the same time disregard any val expressed on the addend relays.

The zero shift means comprises additional r lays controlled by the counting relays when th are set to represent 0 which will interconnect t contacts of the relays at that time acting as au end means with the windings of the other set relays at that time acting as sum means in t next right-hand decimal denominational ord at the same time holding open any circuits clos by the addend relays.

Another feature of the invention is an improv arrangement of carry leads, consisting of a p of decimal carry leads between each decimal d nominational order and a pair of intersubgro carry leads within each decimal order. Each p of carry leads consists of a carry 0 and a carry lead and where they are on a decimal basis ma the difference between a one or two-digit su found in a preceding decimal order. Where th are on a binary basis within a decimal order th extend from a quinary subgroup of relays a carry the information into an associated bina subgroup that the sum found in the quinary su group is one of the values 0 to 4 or, alternativel is one of the values 5 to 9. The operation of t sum relays in each decimal order is responsive the electrical characterization of one of the pa of incoming carry leads. The operation of one a pair of selected quinary sum relays is direct responsive to such electrical characterization ar the operation of a selected binary relay is also d rectly responsive to such electrical character zation when the unweighted quinary sum (befo the value of the incoming decimal carry has be considered) is equal to 4 or 9. It may also noted that when this unweighted quinary sum equal to 4, but a single binary relay is selected f operation and the outgoing carry is electrical characterized from a local source, whereas whe this unweighted quinary sum is 9, two comple and different networks are established each i cluding a quinary relay, a binary relay and  outgoing carry lead and the effectiveness of the networks is directly responsive to the selecti electrical characterization of the two incomir carry leads.

Stated in another manner, the quinary sul group may be considered a first stage, the bina subgroup may be considered a second stage and the carry out leads may be considered a third stage. Ordinarily the carry in leads are extended only into the first stage. However, when the unweighted quinary sum is 4 or 9 the carry in leads are extended also into the second stage and when this quinary sum is 9 are further extended into the third stage.

Another feature of the present invention is the use of two separate and distinct carry networks which are placed in use alternatively and in accordance with which set of summing relays are being used as augend relays and which set are being used as sum relays. Thus, there are four incoming carry leads and four outgoing carry leads for each decimal denominational order. When, by way of example, the B relays are acting as augend means, the BCY—1 and BCY—0 leads (B carry 1 and B carry 0 leads) are operative and by the same token when the C relays are acting as augend means the CCY—1 and CCY—0 leads are operative.

Another feature of the invention is a short-cut method of multiplication. Whereas in most calculating devices multiplication is performed by iterative addition, the number of operations is at least equal to the sum of the digits of the multiplier, it will be realized that if the multiplier digits can be held to the low number digits, such sum will be held correspondingly low. Therefore a feature of the present invention is a means for using the complement of a multiplier digit when it is five or more. In accordance with this feature, use is made of the fact that the multiplier digits are each expressed in the biquinary code so that when any of the digits 0 to 4 inclusive are being expressed, a certain one of the two relays in the binary part of the code relays will be operated, and when any one of the digits 5 to 9, inclusive, is being expressed, the other of the two relays will be operated. Therefore, it is a simple matter to differentiate between a low value multiplier digit and a high value multiplier digit, and this differentiation is used as a short-cut multiplication operator. Now from a mathematical standpoint, a number may be multiplied by adding such number together that number of times dictated by the multiplier digit or alternatively by adding its complement together that number of times dictated by the complement of the multiplier digit and then adding the multiplicand once in its true form shifted to the next higher decimal denominational order. By way of example, if the number 03700 is to be multiplied by 18 to calculate the product 666, the number 03700 may first be iteratively added eight times, as

```
00000
03700
03700
03700
07400
03700
11100
03700
14800
03700
18500
03700
22200
03700
25900
03700
29600
```

Then the result of this addition may be shifted and the number 03700 added again (for the tens digit 1 of the multiplier 18), thus

```
02960
03700
06660
```

However, the same result may be obtained by adding the figure 03700 (10—2) times for the digit 8 and once for the digit 1. Multiplying it by this stratagem, the complement is used where the —2 term of this multiplier digit is used. Therefore, the operation becomes

```
00000
96300
96300
96300     (1)

99260
03700     (2)
02960
03700     (3)
06660
```

The double line (1) is here used to denote a shift simultaneously carried out with the summing operation. The addition (2) represents the operation denoted by the 10 in the factor (10—2) and the last addition (3) denotes the multiplication by the tens digit of the multiplier 18.

This short-cut method of multiplication involves means to invert the addend when a multiplier digit is converted into a plus and minus quantity (whose algebraic sum is equal to the actual multiplier digit). However, considerable apparatus can be saved by using still another feature of the present invention whereby the inversion is not carried out until the last of the iterative operations is reached, whereupon a triple operation is performed consisting of (1) the summing operation, (2) the shifting operation and (3) the inverting operation, thus

```
00000
03700
03700
03700

99260
03700
02960
03700
06660
```

Another feature of the invention is therefore means responsive to the registration of a multiplier digit greater than five for simultaneously carrying out the last of the iterative summing operations directed by the complement of such a multiplier digit, shifting the denominational orders of such derived sum and inverting such derived sum into its complement. Closely associated with this feature is another feature whereby multiplication of a number by a multiplier digit greater than five is converted into multiplication by an algebraic factor consisting of 10 minus the complement of the actual multiplier digit. In actual operation this becomes as above-illustrated, the iterative addition of the number, a number of times dictated by such complement, on the last summing operation of which the sum is shifted and inverted and then the addition of the number an extra time to take care of the ten in the algebraic expression (10 minus the complement of the multiplier digit).

By these features it will be seen that a large number of operations may be saved. Thus, in the illustration above, 9 (the sum of the digits of the multiplier 18) summing operations is reduced to 4.

As a further example, take the figure 88 to be used as a multiplier and algebraically add the equivalents of the separate digits, only instead of expressing 8 as being equal to 10−2, express it as 1 tens summing operation and 2 complemental units summing operations. Then algebraically

```
      H  T  U
 8=      1 -2
80=1 -2
88=1 -1 -2
``` so that there will be a total of 1+1+2=4 summing operations as against 8+8=16.

In this connection it is to be noted that whereas in the above description it was stated that the complement was taken in a triple operation on the last summing operation under what may be termed the units multiplier digit, the inversion to produce a complement is not carried out if the next digit to be used (the tens digit) is also negative. Thus, multiplying 03700 by 88, or as it is converted by (1) (−1) (−2) in the hundreds, tens and units places, the operation becomes

```
00000⎫
03700⎪
03700⎬−2
03700⎭

00740⎫−1
03700⎭

99556⎫+1
03700⎭
03256
```

It may then be stated that inversion only takes place on the last summing operation of a negative multiplier digit before a succeeding first operation of a positive multiplier digit of the next higher order.

As a further example the operations when 37 is multiplied by 82 to produce the product 3034 may be shown as follows. The addition operations become

```
      H  T  U
 2=         +2
80=1 -2
82=1 -2 +2
``` and the computation is as follows:

```
00000
03700
03700
03700

99260 (1)
03700
02960
03700

99334 (2)
03700
03034
```

Here it may be noted both at (1) and (2) that a shift and an inversion take place each time the sign changes.

Again take the product 37×99=3663. The operations become

```
      H  T  U
 9=     +1 -1
90=+1 -1
99=+1  0 -1
``` and the computation is as follows:

```
00000
03700

99963 (1)
03700
03663
```

Here again it is to be noted that an inversion is made (1) as the sign changes. It should also be noted that due to the 0 operation in the tens place a double shift is made.

A feature of the invention is, therefore, a means responsive to a succession, reading from the lowest decimal denominational order up, of multiplier digits each greater than 4 to defer the inversion of a partial product until a digit 4 or less is encountered.

In accordance with this feature, there is provided a set of function relays whose duties are to control the pattern of operations. Relays designated GTB and GTC function to control the sign relays through the tens multiplier digit keys on the last summing operation controlled by a units digit key. Relays designated GHB and GHC function to control the sign relays on the last summing operation controlled by a tens multiplier digit key. Relays GXB and GXC control the performance of an extra summing operation after the last of a succession of negative multiplier digits and relays GLB and GLC control the performance of the last summing operation. Through the use of these group relays the shift and inverting relays are operated separately or in combination as the pattern of operations require.

Another feature of the invention is the use of gas tubes for controlling the summing cycle whereby great speed is attained. It may be stated in general that the operation of the gas tube is in the order of ten times as fast as a relay, or stated in another manner, the gas tube will come into full operation in a period of one millisecond while the best comparable operation of a relay requires a period of ten milliseconds.

The device of the present invention employing several time saving expedients such as the gas tube control, the combined summing and shifting operation and the short-cut method of multiplication is a truly fast operating device. On the assumption that standard relays with standard manufacturing variations are used, the time required to multiply two average nine-digit numbers together will be in the order of 0.8 second whereas the fastest of the known commercial devices takes 5.5 seconds and others run up to 10 seconds or more.

It will be noted hereinafter that the summing cycle consists of several operations each following a selective or derived rearranged operated pattern of the summing relays. Each rearrangement is proven by a check circuit whereupon the following operation is carried out in the shortest possible time through the firing of a gas tube capable of handling a considerable current flow so that little time is lost in operation after the check circuit reports that the predetermined conditions have been fulfilled.

In accordance with this feature an operating and a pair of locking tubes are employed. The operating tube responds to a signal denoting the fact that the sum relays are each and every one released, and that the sign relays, and other switching relays are operated in a given logical pattern. Thereupon the operating tube fires and the consequent operation of the sum relays immediately disrupts this check circuit. Now another check circuit denoting the fact that the sum relays have operated according to a predetermined plan (one and one only of the relays in each binary subgroup and one and one only of the relays in each quinary subgroup) is closed to prove the summing operation and as a result a locking tube is fired which through its action not only locks in the operated sum relays but extinguishes the operating and the other locking tube. This is followed by the release of that set of relays which were up to this time acting as augend means in preparation for their new role as sum means. As they become fully released a new circuit for the operating tube is established as before and these operations continue until the counting relays have been run down. Thus a feature of the invention is the combination of a plurality of tubes and of relays, the relays establishing firing circuits for the tubes and the tubes operating the relays in new combinations, this mutual control being steered through a number of cycles in accordance with a condition established by a counting means.

Thus another feature of the invention is a proof circuit control exercised by the switching and calculating relays over the summing cycle control means whereby the said summing cycle control must be assured that the said switching and calculating relays are in proper position before another step in the summing cycle may be taken. In accordance with this feature, and by way of example, a chain circuit is controlled by all the switching and calculating relays when they are in fully released positions which must be closed before the initial step may be taken. Thus when the signal for the start of a summing cycle is received the control means will begin to function only when assurance is given that every relay which will be employed in the following operations is released and therefore ready to properly participate in such operations. As another example of this means for mutual control, there is a chain circuit controlled by each biquinary set of calculating relays closed on the operation of such set when and only when one relay in the binary subgroup and one relay in the quinary subgroup is operated, whereby assurance may be given that at least the proper pattern of operation has taken place.

Another feature of the invention is a self-proving circuit whereby any deviation from proper operation is immediately detected and reported. Thus within each decimal denominational order there is provided means to insure that one and one only of the two devices in the binary part is operated and one and one only in the quinary part is operated. The proof of this condition for every decimal denominational order is built into and is part of the summing cycle control so that unless the proper operation takes place the operation is stopped and the failure is reported.

Another feature of the invention is a counting relay arrangement in which two sets of decimal code relays alternately act as the counter for the other. In counting relay arrangements of the prior art it is usual to have a comparison set of relays to hold the registration during a counting cycle, a single decimal value being counted on each cycle of said relays. In this new arrangement however two similar sets of relays are employed one set acting in the capacity of the usual companion relays and then reversing its function so that it now acts as the principle set while the first set now acts as the companion. By this arrangement two successive decimal values are counted on each complete cycle of operations, whereby the operations are faster and considerable apparatus is saved.

The drawings consist of twenty-four sheets having twenty-eight figures, as follows:

Fig. 10 is a combination of current graphs and a schematic circuit diagram which will help to an understanding of the action of the counting relays;

Fig. 11 is a block diagram showing how Figs. 12 to 20, inclusive, may be placed together to form a complete shorthand schematic circuit diagram of the device of the present invention, and in which Fig. 12 shows the first or highest decimal denominational order summing arrangement;

Fig. 21 is a block diagram showing how Figs. 22 to 25, inclusive, may be placed together to form a complete schematic circuit diagram of the check circuits and in which

Fig. 25 shows the remainder of the common switching relays, the summing cycle control key, relays and gas tubes and the release key and relay;

Fig. 26 is a circuit diagram which may be termed the power circuit intended to show the arrangement of the batteries, the source of alternating current and the fuse bus box; and Fig. 27 is a time sequence chart showing the sequence of operations for the four examples given.

Figure 0:
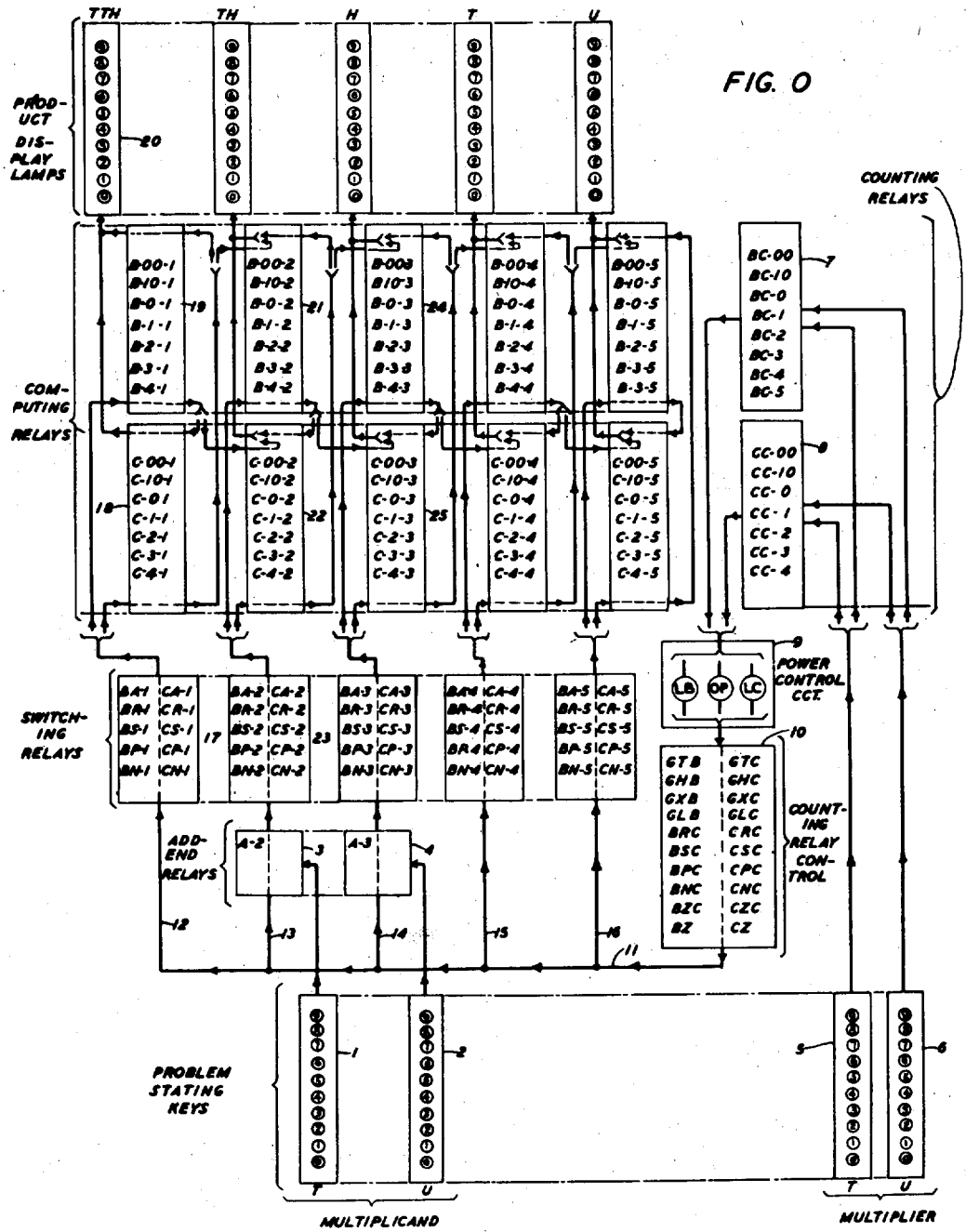
Fig. 0 is a flow chart which will show the general direction of operations and be of help in following the description.

In the following description the system of designating individual elements of the circuit is based primarily on the engineering specifications for the device. In this specification the various relays are designated by both letters and numerals which have come to have certain significance to the engineers. By way of example, the computing relays are known as the A, B and C relays, the A relays being the addend means and the B and C relays those which are used alternatively as augend and sum means. In the present case there are seven relays in each set, the two designated A00 and A10 comprising the binary subgroup and the five designated A0, A1, A2, A3 and A4 comprising the quinary subgroup. Further where such a relay is designated A00—2 or A00—3 it indicates that such a relay is included in the second or the third decimal denominational order respectively. Where conductors or other apparatus are designated by numerals, the number used will be a combination of the figure number with a two-digit number individual to such figure. Thus 123 will be found on Fig. 1 and 2256 will be found on Fig. 22 by way of example. Where a conductor extends through several figures it will be designated by a numeral which will identify the figure from which the conductor was initially traced.

Use has been made in this specification of what might be termed a shorthand schematic circuit diagram since some of the circuits are so extensive that it would be confusing and laborious to try to trace them in the conventional manner. In this type of schematic circuit diagram where two lines cross each other and the crossing point is encircled, the designation at such a point will indicate a normally open contact which will be closed by the operation of the relay bearing a like designation. Thus a small circle at the crossing point of two wires designated A00—2 will indicate that upon the operation of relay A00—2 a connection will be established between such two wires.

For obvious purposes in certain cases conductors will bear the same designation as other apparatus. This is not to be taken as a duplication of the designation but will be readily understood that such a conductor bears such an intimate relation to the other piece of apparatus that the use of the same designation is a help rather than a source of confusion. By way of example the main source of operating ground for all the circuits is the gas tube OP. Now this tube when fired effectively connects ground to a bus which will be found in nearly all the circuit diagrams where it also is designated OP so that it will at once be understood that a conductor marked OP wherever it is found is connected to the plate of tube OP and will, therefore, be grounded in accordance with the operation of this tube.

Similar logical means for designating various elements of the circuits will be found in the drawings and are used as an aid to the clear understanding of the present arrangement.

The apparatus

The apparatus used in constructing the device of the present invention is mostly standard communication apparatus, details of which may be found in the following references.

The keys used as multiplicand and multiplier keys are of the type shown in Patent 1,378,950 to A. D. Haigan, May 24, 1921.

Details of the relays employed are to be found in the following patents: 1,156,671, E. B. Craft, Oct. 12, 1915; 1,633,576, C. H. Franks, June 28, 1927; 1,652,489, E. D. Mead, Dec. 13, 1927; 1,652,490, D. D. Miller, Dec. 13, 1927; 1,652,491, D. D. Miller, Dec. 13, 1927; 2,178,656, P. W. Swenson, Nov. 7, 1939; and 2,323,961, F. A. Zupa, July 13, 1943.

The tubes employed are of the type disclosed in Patents 1,432,867, M. J. Kelly, Oct. 24, 1922; 1,590,352, J. M. Eglin, June 29, 1926; and 2,069,-814, D. S. Bond, Feb. 9, 1937.

Other apparatus is of conventional design.

Reference is made to my previously filed applications showing relay calculators having certain generic aspects with regard to the present invention: Complex computer, Ser. No. 564,853, filed Nov. 23, 1944; Automatic calculator, Ser. No. 569,867, filed Dec. 26, 1944.

Physical embodiment

Figure 1:
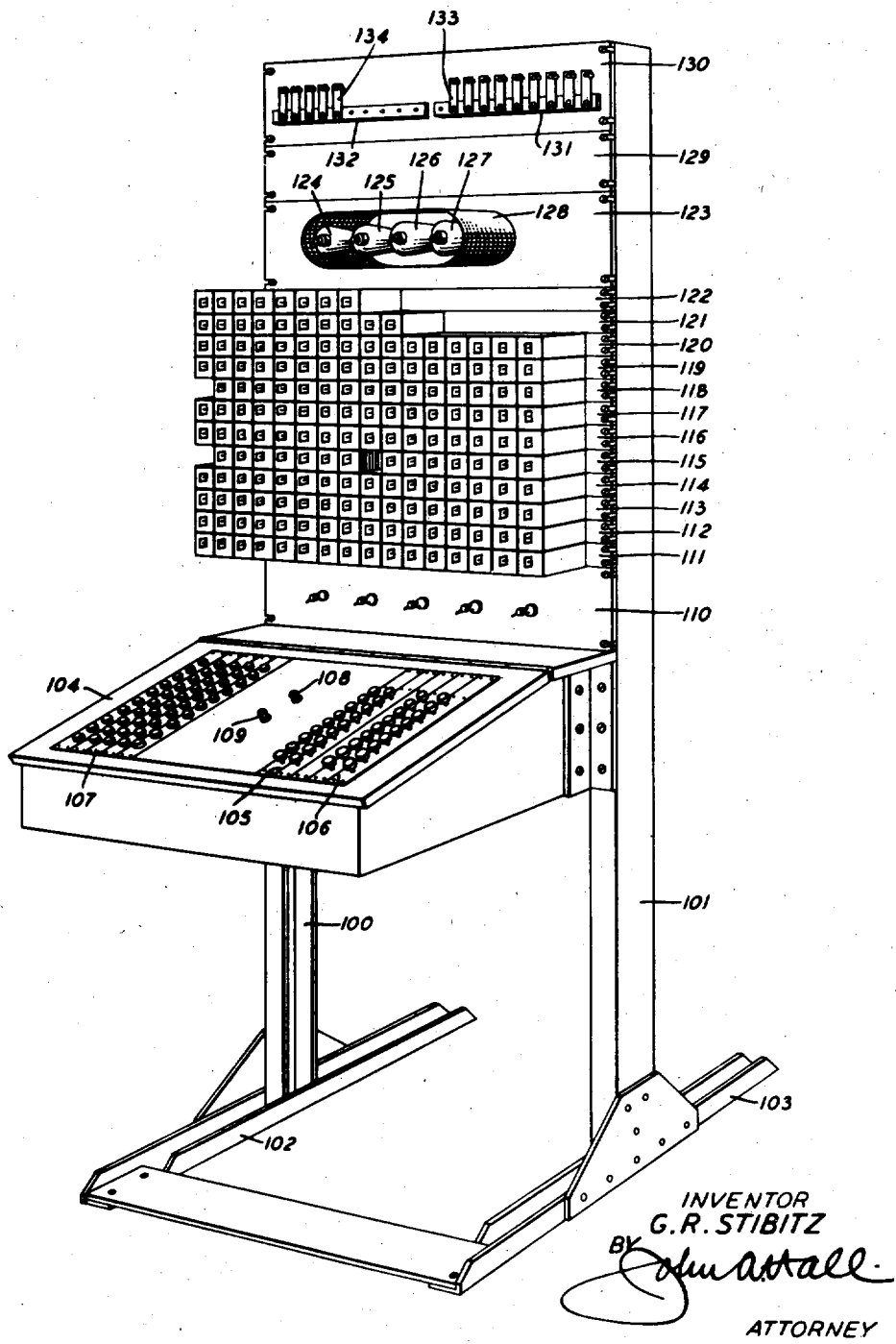
Fig. 1 is a perspective view of a physical embodiment of the invention, showing a relay and apparatus rack, and a shelf provided with a set of multiplicand keys, multiplier keys, certain other control keys and a bank of signal lamps by which the product of a multiplication may be displayed.

The physical aspects of one embodiment of the invention are shown in Fig. 1. Here a pair, 100 and 101 of channel beams, suitably mounted on base members 102 and 103 constitute a conventional mounting frame for electrical apparatus. To this frame there are secured a number of mounting plates on which in turn the apparatus employed herein is mounted. First, there is an inclined shelf 104, having two rows of multiplicand keys 105 and two rows of multiplier keys 106, and five rows of signal lamps 107. The device operates to multiply any two-digit number by any other two-digit number, the product being calculated and displayed on the lamps 107. When the multiplicand and the multiplier are "written up" on the keys 105 and 106 a start key 108 is depressed whereupon the calculation is made and the product displayed by the lighting of one lamp in each of the five rows. This display will last until released by the operation of the release key 109.

Lest it be said that this device is in an unattractive commercial form and of apparent limited utility, it may be understood that this is in the nature of a demonstration set constructed and arranged to prove the speed, dependability and simplicity of the new principles involved. Though the invention is illustrated by means to multiply two-digit numbers by other two-digit numbers, the principles of operation apply equally well and without any change in the circuits except the addition of more apparatus, to more extensive use such for instance as the multiplication of twenty-digit numbers by other equally long numbers as might be employed in astronomical calculations. It will be abundantly clear that the keyboard and the product display device may be housed in any sort of attractive form and placed at any distance from the calculating circuits in the manner fully disclosed in my previously filed applications. It will, furthermore, be clear that it would be a simple matter to use some other sort of device for displaying the products or for permanently recording them in any one of several well-known and conventional manners.

In the device as illustrated in Fig. 1 the mounting plate 110 above the key shelf holds a number of keys placed in the common circuits for testing purposes. Above this there are twelve mounting plates 111 to 122, inclusive, each carrying a plurality of relays, one hundred and seventy-five relays being shown in all. The next plate 123 is used for mounting the four thyratrons 124 to 127 and the shield 128. The mounting plate 129, shown blank, actually has mounted on its rear surface a plurality of resistance elements, and the topmost mounting plate 130 carries two battery bus bars 131 and 132 which feed various circuits through fuses such as 133 and 134. The wiring of this apparatus is in conventional form in the rear.

While not shown in this Fig. 1, each piece of apparatus is properly marked with its own designation. As a matter of interest and as an aid in a clear understanding of the arrangement of such apparatus the following table shows the relay markings:

```
B B B B B G G G
S R Z P N T H L
C C C C C C C C
─────────────────
C C C C G G G G
S R Z P N T H L X
C C C C C B B B C
─────────────────
B B B B B B B B B C C C C
C C C C C C C S R P N S R P N
0 1 2 3 4 5 00 10 1 1 1 1 1 1 1
─────────────────
C C C C C C C B B B B B B B
C C C C C C C A 1 1 1 1 1 1 1
0 1 2 3 4 5 00 10 1 0 1 2 3 4 00 10
─────────────────
    S S S   R   E B C C C C C C
B C T T T   L   X A 1 1 1 1 1 1
Z Z 1 2 3                1 0 1 2 3 4 00 10
─────────────────
B B B C C C C B B B B C C C C
S R P N S R P N S R P N S R P N
2 2 2 2 2 2 2 2 3 3 3 3 3 3 3 3
─────────────────
C B B B B B B B C B B B B B B B
A 2 2 2 2 2 2 2 A 3 3 3 3 3 3 3
2 0 1 2 3 4 00 10 3 0 1 2 3 4 00 10
─────────────────
  A A A A A A A   A A A A A A A
  2 2 2 2 2 2 2   3 3 3 3 3 3 3
  0 1 2 3 4 00 10 0 1 2 3 4 00 10
─────────────────
B C C C C C C C B C C C C C C C
A 2 2 2 2 2 2 2 A 3 3 3 3 3 3 3
2 0 1 2 3 4 00 10 3 0 1 2 3 4 00 10
─────────────────
B B B C C C C C B B B B C C C C
S R P N S R P N S R P N S R P N
4 4 4 4 4 4 4 4 4 5 5 5 5 5 5 5
─────────────────
C B B B B B B B C B B B B B B B
A 4 4 4 4 4 4 4 A 5 5 5 5 5 5 5
4 0 1 2 3 4 00 10 5 0 1 2 3 4 00 10
─────────────────
B C C C C C C C B C C C C C C C
A 4 4 4 4 4 4 4 A 5 5 5 5 5 5 5
4 0 1 2 3 4 00 10 5 0 1 2 3 4 00 10
```

The general arrangement of the device is one by which five decimal denominational orders are provided, this being the maximum necessary when two, two-digit factors are to be multiplied together. Only the second and third orders are provided with addend means, however, an order to the left (a higher order) being provided to take care of carries and two to the right being provided to take care of the product after two column shifting operations. In these blank denominational orders the wiring is provided just as though addend means were present and were permanently set to represent 0. Thus, if the multiplicand keys are operated to write up the factor 37, the addend means would represent this as 03700.

If the multiplier keys are set to represent 23, the product 851 will appear on the lamps 107 as 00851. When the multiplier 88 is used, the product will appear as 03256. The extreme left-hand order while always showing a zero in the final product will often contain some other figure during the summing operations, as for instance, when the multiplier 19 is used whereupon the operations appear as follows:

```
C 00000
A 03700
═════
B 99630
A 03700
C 03330
A 03700
═════
B 00703
```

*The flow chart*

Fig. 0 is an attempt to show the general flow of operations in a rather complex electrical circuit. The rectangles 1 and 2 represent the tens and units multiplicand key-sets which will directly operate the addend relays represented by the rectangles 3 and 4 respectively. In the multiplicand key-sets the ten digit keys are represented by the small circles each having one of the digits inscribed thereon. The biquinary set of addend relays in rectangles 3 and 4 is represented by the listing of the designations of the A relays. Similarly the key-sets 5 and 6 represent the tens and units multiplier keys which have control over the two sets of counting relays, those known as the BC relays in rectangle 7 and those known as the CC relays in the rectangle 8. The lines going from one rectangle to another indicate the direction of flow by the arrowheads thereon. It will be noted that the flow from the tens multiplier keys 5 may take alternate paths either to the CC counting relays in rectangle 8 or the BC counting relays in rectangle 7. By the same token the lines flowing from these rectangles enter a rectangle 9 which is known as the power control circuit and contains the three gas tubes LB, OP and LC. Generally speaking the OP tube is an operating means and functions when the circuits are ready to supply an operating impulse. The tubes LB and LC respectively operate as locking means to lock in the B or the C relays. The flow then continues from the power control circuit through the counting relay control circuit represented by the rectangle 10 in which are listed the eight group relays such as GTB and the twelve master relays such as BRC, etc. With these relays properly energized in accordance with the control exercised by the multiplier keys through the agency of the counting relays, the power control circuit will at the proper times electrically characterize leads which are here represented as flowing through the channel 11 and thence out in parallel through the channels 12, 13, 14, 15 and 16 to the five decimal denominational orders respectively. The channel 12 for instance passes through the rectangle 17 representing the switching relays individual to the first decimal denominational order and then the flow takes one of two paths either through the contacts of the C relays in rectangle 18 and ending in the operation of the B relays in rectangle 19 or through the contacts of the B relays in rectangle 19 ending in the operation of the C relays in rectangle 18. It will be brought out hereinafter that the B and C relays of each decimal denominational order operate alternately as augend and sum relays. Thus when the path flows first through the contacts of the C relays in rectangle 18 these C relays are acting in the capacity of augend means and the B relays which are operated thereby are operating in the capacity of the sum relays. On the next half summing cycle when the flow is through the contacts of the B relays in rectangle 19 then these B relays are operating as augend means and the C relays which are operated thereby are acting in the capacity of the sum relays. The direction of flow thereafter is toward the product display lamps in rectangle 20 which will appear hereinafter to be operated only at the end of the final summing cycle. Another point to be noted is that the shifting operation at the end of the control exercised, let us say, by a units multiplier digit, will be either through the contacts of the C relays in rectangle 18 to operate the B relays of the next lower decimal denominational order in rectangle 21 or, alternatively, through the contacts of the B relays in rectangle 19 to operate the C relays of the next lower decimal denominational order shown in rectangle 22.

In the case of the second and third decimal denominational orders the sum is effected also by the operation of the addend relays so that when the OP tube of the power control circuit 9 operates then the flow is through the channel 13, the contacts of the A relays in rectangle 3, the paths selected by the operation of the switching relays 23 and thence through the contacts of the C relays in rectangle 22 to operate the B relays in rectangle 21 or on the last summing cycle for a multiplier digit into the B relays of the next lower decimal denominational order shown in rectangle 24. Alternatively the flow may be through the contacts of the A relays in rectangle 3, through the paths selected by the switching relays in rectangle 23, through the contacts of the B relays shown in rectangle 21 to cause the operation of the C relays shown in rectangle 22 or on the last summing operation alternatively to operate the C relays of the next lower decimal denominational order shown in rectangle 25.

It may also be noted and it will be fully explained hereinafter that in certain cases described under the heading of the zero shift that the summing operation, let us say through the contacts of the C relays to operate the B relays of a lower decimal denominational order, is controlled by such relays as BZC and BZ to by-pass the contacts of the addend relays whereupon any value expressed by the operation of the C relays will be transferred to the B relays in each case of a lower decimal denominational order.

No attempt is made in this diagram to explain the operation of the carry leads but this will be brought out in detail hereinafter. It is believed sufficient for the present purposes to indicate merely that the multiplicand keys control the addend relays and the second and third decimal denominational orders, that the multiplier keys exercise either control through the counting relays and the common control circuits so that the summing is done through alternate paths either through the C relays to the B relays or through the B relays to the C relays. Upon the final summing operation the product display lamps will give an indication of the product which has been calculated.

*Fundamentals of biquinary addition*

Figure 2:
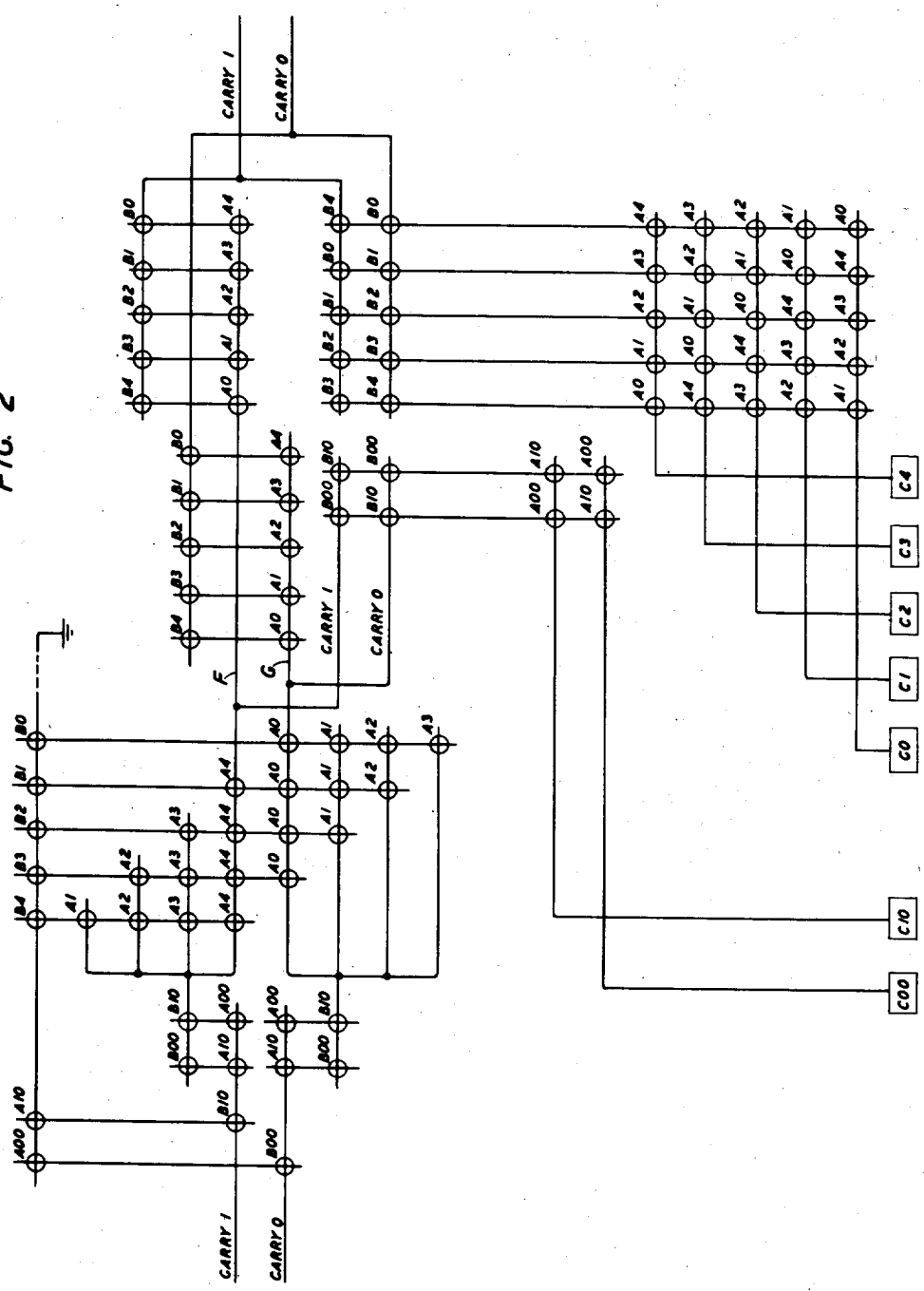
Fig. 2 is a schematic circuit diagram useful for explaining the fundamental conception of biquinary addition.

Fig. 2 is a theoretical schematic circuit diagram by means of which the fundamental operations in biquinary addition may be explained. There are three sets of relays provided, the A relays representing the addend, the B relays representing the augend and the C relays representing the sum. Only the C relays are shown in this diagram and here they are only indicated (at the bottom) in the form of small rectangles each representing the winding thereof. Only one lead, that over which the relay is operated is indicated, the other lead being assumed as a proper connection to a source of battery so that when a circuit from a ground connection is traced to one of these windings it is assumed that the thus indicated relay operates. None of the armatures of the C relays are shown as the function of the C relay is quite immaterial for the purposes of this discussion. The windings of the A and the B relays are not shown as the manner in which these relays become operated is likewise quite immaterial for the present purposes.

Now each set of relays, the A, the B and the C set are divided into two subgroups, one known as the binary subgroup and the other known as the quinary subgroup. The binary subgroup consists of two relays such as C00 and C10 having an arithmetical weight of 0 and 5, respectively. Similarly, the quinary subgroup consists of five relays such as C0, C1, C2, C3 and C4, having the arithmetical weights 0, 1, 2, 3 and 4 respectively. Operation of one relay in each said subgroup will represent the digital values 0 to 9 as follows:

| Binary Relay | Quinary Relay | Digital Value |
|---|---|---|
| 00 | 0 | 0 |
| 00 | 1 | 1 |
| 00 | 2 | 2 |
| 00 | 3 | 3 |
| 00 | 4 | 4 |
| 10 | 0 | 5 |
| 10 | 1 | 6 |
| 10 | 2 | 7 |
| 10 | 3 | 8 |
| 10 | 4 | 9 |

Biquinary addition, considering a single decimal denominational order consists of the summing of an augend, an addend, and an incoming decimal carry from a preceding decimal denominational order to find a sum expressed as a digital value and a decimal carry to a succeeding decimal denominational order. Only digital values are expressed by the coded operation of the sum relays and hence if the sum of the incoming carry, the augend and the addend exceeds 9, the sum relays will express only the units digit of such sum while the tens digit thereof is expressed as an outgoing carry. By way of example the following combinations (out of the two hundred possible combinations) will illustrate the summing pattern employed:

| Incoming carry | + Augend | + Addend | = Outgoing carry | + Sum |
|---|---|---|---|---|
| 0 | 3 | 1 | 0 | 4 |
| 0 | 6 | 6 | 1 | 2 |
| 0 | 4 | 2 | 0 | 6 |
| 0 | 9 | 2 | 1 | 1 |
| 1 | 2 | 6 | 0 | 9 |
| 1 | 6 | 7 | 1 | 4 |
| 1 | 2 | 2 | 0 | 5 |
| 1 | 8 | 8 | 1 | 7 |

Further, to explain the matter of binary addition, there is what might be termed an intersubgroup carry. Whenever the sum expressed by the sum relays is 0 to 4 there will be an intersubgroup carry of 0 and whenever such sum is 5 to 9 there will be an intersubgroup carry of 1.

The intersubgroup carry of 0 may result in the operation of either the binary relay (C00) weighted 0 or the binary relay (C10) weighted 5, and likewise the intersubgroup carry 1 may result in the operation of either (C00) or (C10). This statement may be easily checked in the next table wherein the operated augend relays (B), the operated addend relays (A), and the intersubgroup carries (listed as "binary carry") are shown.

the last addition listed in the above table. With an incoming carry 1 and with relays B10, B3, A10 and A3 listed as operated the following circuits will be established. First a circuit from the incoming carry 1 lead through closed contacts of relays B3 and A3 to the winding of relay C2, second from the local ground through closed contacts of relays B3 and A3, conductor F (constituting the intersubgroup carry 1 lead) through the closed contacts of relays B10 and A10 to the winding of relay C10 and third from the local ground toward the extreme left and through the closed contacts of relays A10 and B10 to the outgoing carry 1 lead. Thus relays C10 and C2 are operated to express the digital value 7 and the outgoing carry 1 lead is electrically characterized

*Schematic of biquinary addition*

| Carry in | Augend | | Addend | | Binary Carry | Sum | | | Carry out |
| --- | --- | --- | --- | --- | --- | --- | --- | --- | --- |
| | Value | Represented by Operation of Relays | Value | Represented by Operation of Relays | | Value Digits | | Represented by Operation of Relays | |
| | | | | | | T | U | | |
| 0 | 3 | B00 B3 | 1 | A00 A1 | 0 | | 4 | C00 C4 | 0 |
| 0 | 6 | B10 B1 | 6 | A10 A1 | 0 | 1 | 2 | C00 C2 | 1 |
| 0 | 4 | B00 B4 | 2 | A00 A2 | 1 | | 6 | C10 C1 | 0 |
| 0 | 9 | B10 B4 | 2 | A00 A2 | 1 | 1 | 1 | C00 C1 | 1 |
| 1 | 2 | B00 B2 | 6 | A10 A1 | 0 | | 9 | C10 C4 | 0 |
| 1 | 6 | B10 B1 | 7 | A10 A2 | 0 | 1 | 4 | C00 C4 | 1 |
| 1 | 2 | B00 B2 | 2 | A00 A2 | 1 | | 5 | C10 C0 | 0 |
| 1 | 8 | B10 B3 | 8 | A10 A3 | 1 | 1 | 7 | C10 C2 | 1 |

In this figure the incoming carries are shown as the carry 1 and carry 0 leads coming in from the right, the outgoing carries are shown as the carry 1 and carry 0 leads going out at the left and the intersubgroup carries are shown as carry 1 (F) and carry 0 (G) leads in the center of the diagram. When any A or B relay is operated a connection will be made at the crosspoint indicated by a circle drawn at the crossing of two conductors and labelled with the designation of the relay. Thus following the carry 0 lead in from the right and then in a downwardly direction this conductor first crosses another vertically downward extending conductor at a point denoted by a small circle marked B0. This is an indication that when the relay B0 is operated a connection will be made by an armature and contact of this relay between these two conductors shown crossing each other at this point.

As an example, let us take the first addition listed in the table above. With an incoming carry 0 and with relays B00, B3, A00 and A1 listed as operated the following circuits will be established. First a circuit from the incoming carry 0 lead through closed contacts of relays B3 and A1 to the winding of relay C4, second, from the incoming carry 0 lead through the conductor extending upwardly and then to the left, closed contacts of relays B3 and A1 conductor G which constitutes the intersubgroup carry 0 lead, thence through the closed contacts of relays B00 and A00 to the winding of relay C00 and third, from the local ground (top, center) toward the extreme left and through the closed contacts of relays A00 and B00 to the outgoing carry 0 lead. Thus relays C00 and C4 are operated to express the digital value 4 and the outgoing carry 0 lead is electrically characterized to carry 0 into the next decimal denominational order.

As another example, and to point out a different type or pattern of connections, let us take to carry 1 into the next decimal denominational order.

It will thus be seen that in some cases the ground for operating the relay C00 or relay C10 comes from the incoming carry lead and in other cases from a local ground. An examination of this figure will show a certain regularity in pattern which will render the tracing of circuits therethrough a very simple matter. The remaining examples of addition in the above table may be readily checked. It will also be noted that the examples of addition given therein are selected with a view toward showing all the various combinations of the three carries, i. e., the incoming carry, the intersubgroup carry and the outgoing carry.

Figure 3:
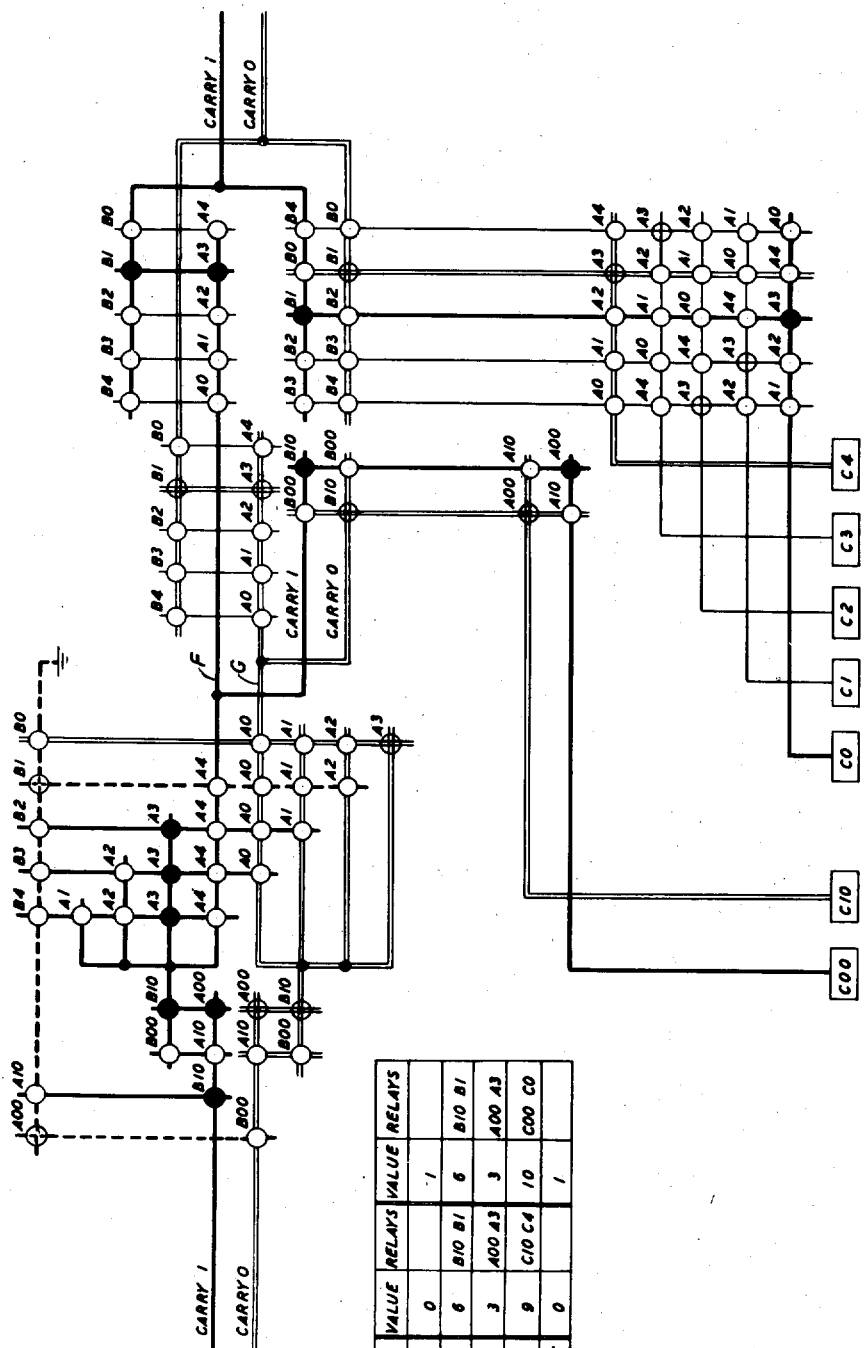
Fig. 3 is a similar schematic circuit diagram marked to show the operation of the circuit when a specific problem is posed.

Fig. 3 is a schematic circuit diagram with exactly the same fundamental pattern as Fig. 2 but with some of the conductors drawn in heavy lines and others drawn with double lines to show the conditions which exist when, by way of example, the addend relays are energized to represent the digital value 3 (relays A00 and A3 are operated) and the augend relays are energized to represent the digital value 6 (relays B10 and B1 are operated). This will make it abundantly clear that the operation of the addend and augend relays in any given pattern will establish two completely independent circuits from the two incoming carry leads which will exist side by side as long as the addend and augend relays remain operated in that pattern but that only one of these will become effective in accordance with which one of the two carry leads incoming to this decimal denominational order is grounded. This effect is particularly striking in this case where the addition of the incoming carry 1 makes the difference between a one-digit (9) or two-digit (10) sum. In other cases where the local ground supplies the connections for the operation of relays C00 and C10 and the outgoing carry, the effect is the same regarding the quinary subgroup of sum relays.

Inversion of code for complements

Figure 4:
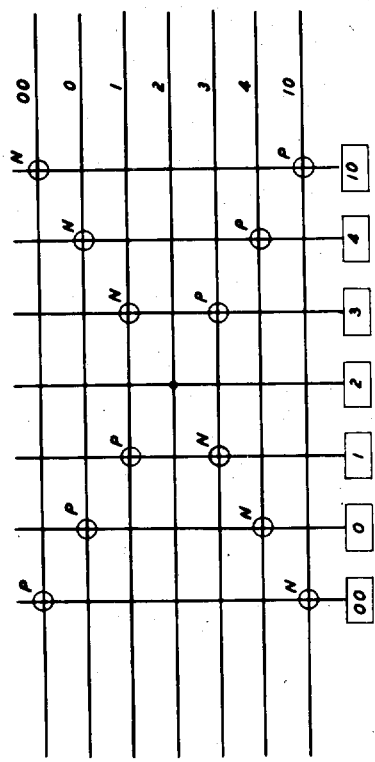
Fig. 4 is a schematic circuit diagram designed to show in the simplest manner how the operation of a biquinary set of code relays may be inverted to express the complement in place of the number in its regular form.

Fig. 4 is a schematic circuit diagram showing the manner in which the operation of the coded relays for representing a digital value is inverted to represent the complement of a number. As pointed out hereinbefore a set of these relays consists of seven, divided into a binary subgroup of two and a quinary subgroup of five. Any one of the ten digits may be expressed by the operation of a single relay from each subgroup and the nine's complement of such a digit may be expressed by what is termed the inverted operation of a single relay from each subgroup. Thus the relays 00 and 10 form the binary subgroup and the relays 0 to 4 form the quinary subgroup. In this diagram there are seven conductors correspondingly marked, that is, 00, 10, 0, 1, 2, 3 and 4. These conductors are shown as horizontal lines crossing the vertical lines each representing a terminal of one of the relays 00, 10, 0, 1, 2, 3 and 4. Where certain of these lines cross, there is a small circle representing a pair of contacts which may be closed to make a connection between the circuits crossing each other at such a point by a relay whose designation is placed adjacent thereto. It will now be seen that there are two such relays involved, one marked P (for positive) and the other marked N (for negative) and which are employed for connecting the horizontal leads to the vertical relay terminations. When the number to be expressed is in its ordinary form the P relay will be operated so that the conductors 00, 10, 0, 1, 2, 3 and 4 will be connected to correspondingly designated relays. When the complement of the number is to be expressed the N relay will be operated, whereupon in the binary group the conductors 00 and 10 will be connected to relays 10 and 00 respectively, and in the quinary group the conductors 0, 1, 2, 3 and 4 will be connected to relays 4, 3, 2, 1 and 0 respectively. It will be noted that in the quinary group the number 2 conductor is invariably connected to the number 2 relay and therefore neither the P nor the N relay has a pair of contacts provided for closing such a connection, but that on the other hand a permanent connection for this purpose is provided. Thus where any set of code relays, such as those used as augend and as sum relays, are employed at times to express the complement of a number, there are also employed the positive and negative relays to connect them in regular or inverted pattern to their operating leads.

Alternative functions of augend and sum relays

One of the important features of the present invention is the use of two sets of code relays alternatively functioning as augend and sum means respectively, in a summing arrangement. In the scheme used herein for designating the elements of the circuits there is provided in a complete decimal denominational order a biquinary set of relays marked A00, A10, A0, A1, A2, A3 and A4 which invariably act as addend means. Another set of relays B00, B10, B0, B1, B2, B3 and B4 act in one part of a summing cycle as augend means and in another part thereof as sum means. By the same token a set of relays C00, C10, C0, C1, C2, C3 and C4 act in one part of a summing cycle as sum means and in another part thereof as augend means. The summing cycle consists generally of an operation in which two sums are calculated, the first with relays B, A and C functioning as augend, addend and sum means respectively and the second with relays C, A and B functioning as augend, addend and sum means respectively. It will thus be seen that the sum calculated in the first part of the summing cycle and registered on the C relays becomes the augend for the second part of the summing cycle. It will further appear hereinafter that an operation may be carried through one or more parts of such summing cycles, that is, while a complete summing cycle may be considered as including two summing operations it is not necessary that a complete summing cycle be performed in each operation.

Figure 5:
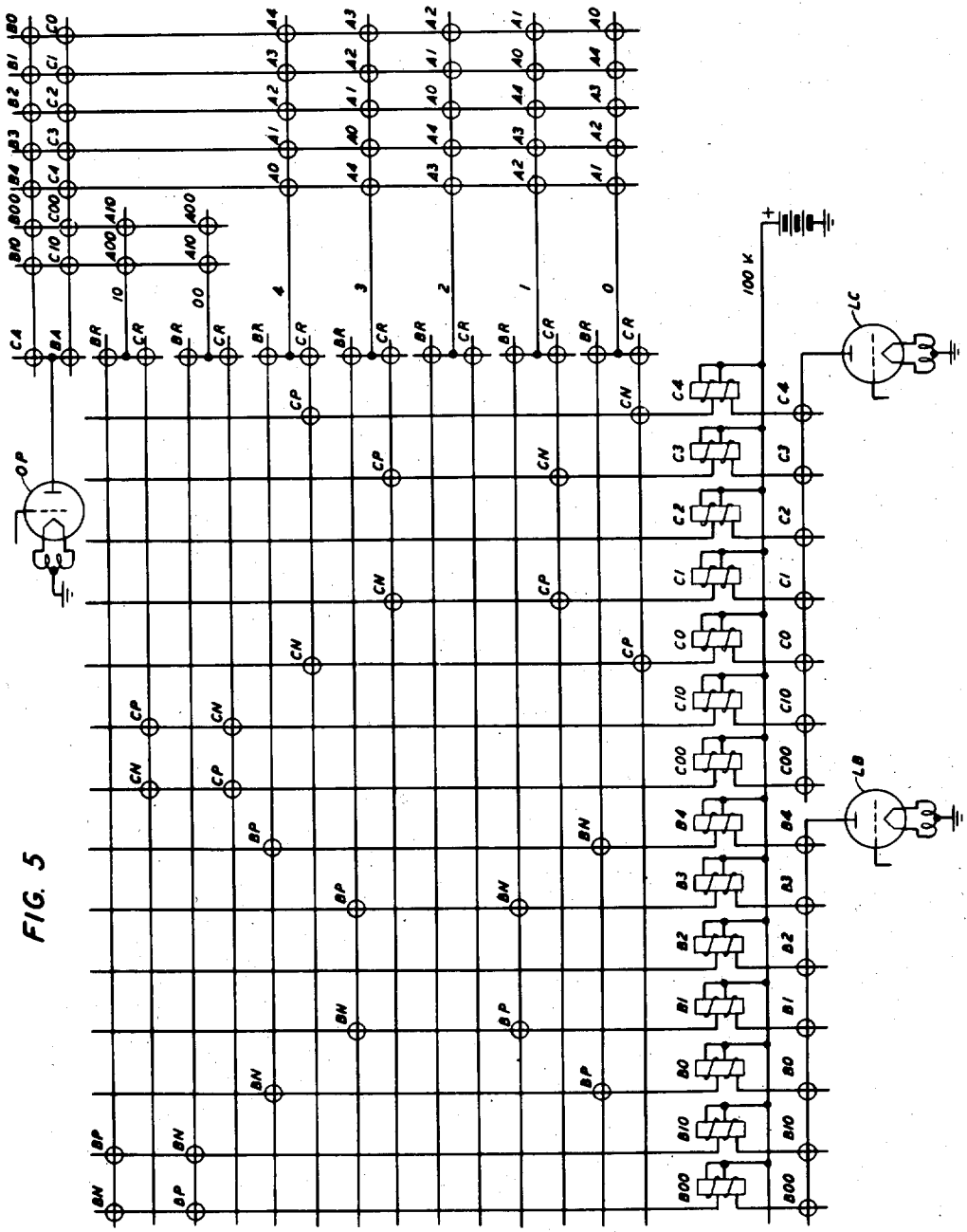
Fig. 5 is a schematic circuit diagram which will serve to show how the B and the C relays alternatively function as augend and sum relays.

Fig. 5 is a schematic circuit diagram which will illustrate in a general way the manner in which the B and C relays are used alternatively as augend and sum relays. As will more fully appear hereinafter an operation is started with the B relays set to represent 0, that is, the B00 and the B0 relays will be operated. The circuits are controlled by three gas tubes LC, LB and OP. When any one of these tubes has fired it effectively connects ground to its plate circuit and will cause the operation of any relay connected thereto whose other terminal is connected to a source of battery of positive potential. Now within each decimal denominational order there is a set of switching relays in addition to the set of computing relays. Thus in Fig. 5 it will be seen that there are contacts operated by relays BA, CA, BR, CR, BP, CP, BN and CN. During that part of the summing cycle in which the B relays are acting as augend means the switching relays CA and CR and either the relay CP (for positive) or CN (for negative) will be operated. The relay CA operates to connect the operating ground from tube OP into the network controlled by the contacts of the B relays and the relay CR operates to connect the ground now extended through the contacts of the B and A relays to the inverting network (as in Fig. 4) so that with the proper positive or negative C relay operated the sum will be calculated through the operation of the C relays in proper combination.

Now, it will be noted that each of the B and each of the C relays are provided with an operating (upper) winding and a locking (lower) winding. Under our assumption that relays B00 and B0 have been operated they will now be held in operated condition by their lower windings, a contact of their own and the blocking tube LB. Now as relays CA, CR and (let us say) CP are operated this is followed by the firing of tube OP, whereby the C relays are combinationally operated. Before the tube OP is quenched the tube LC will be fired so that those C relays which have been operated will remain locked through their lower windings. Thereafter the tube LB will be quenched, thus releasing any of the B relays which were operated (B00 and B0 as assumed). At the same time relays CA, CR and CP will be released thus completing the first half of a summing cycle. Thereafter relays BA, BR and BP will be operated so that now when tube OP is fired the B relays will be combinationally operated through the contacts of the C relays (now acting as augend means) and the A relays. The operated B relays will now lock through the tube LB and this will be followed by the quenching of tube LC and the release of relays BA, BR and BP thus completing the second half of the summing cycle. The manner in which the summing cycle is controlled by the connecting relays will be explained in detail hereinafter. It may now be noted that under control of the connecting relays there is a regular action during certain parts of the summing cycle (as just described) and a shifted operation, which may be explained with the half of the next figure.

The shift

Figure 6:
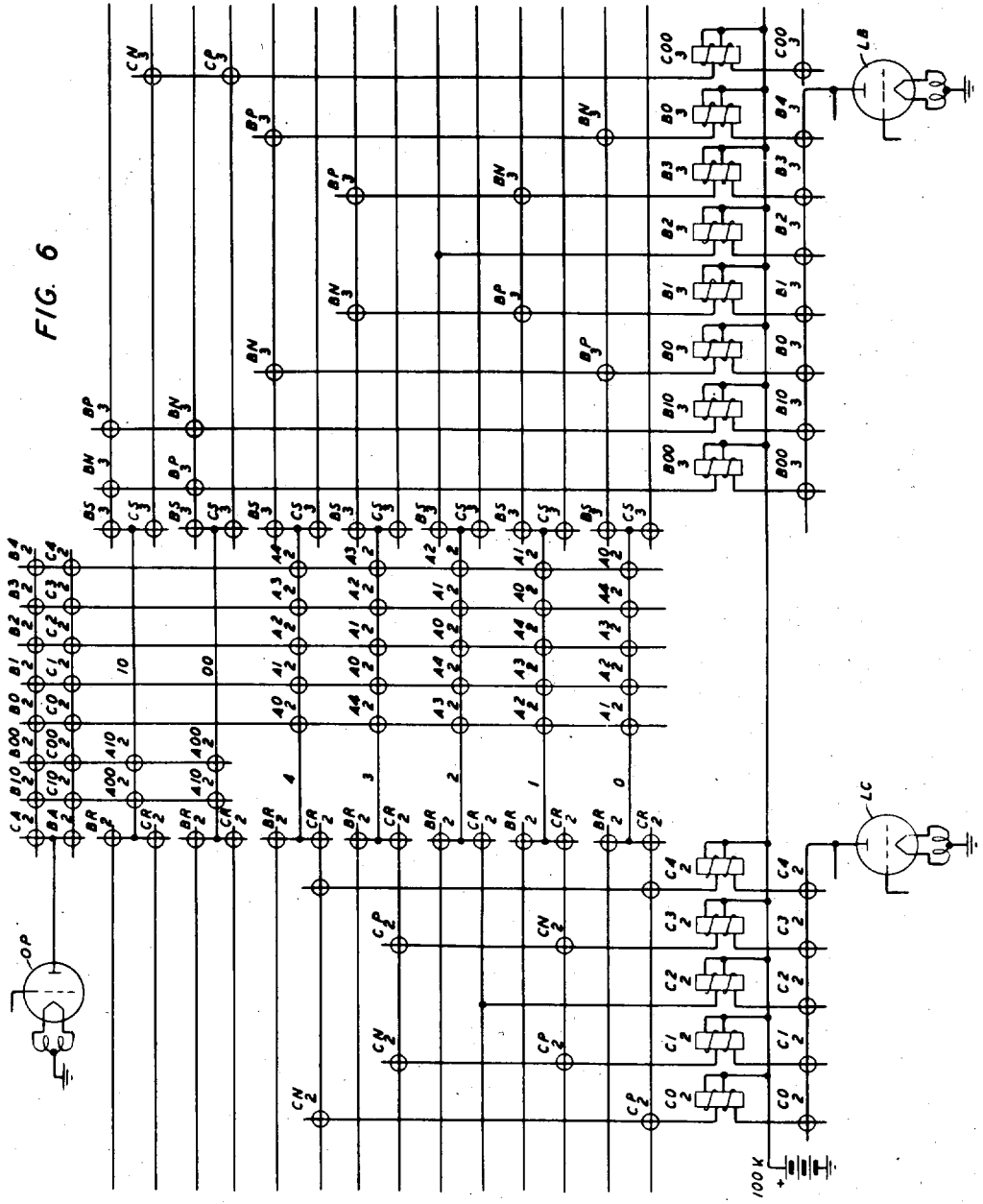
Fig. 6 is a similar schematic circuit diagram which will show how the sum in the last summing operation under control of a given multiplier digit is simultaneously calculated and shifted to the right so that the next multiplication can be performed without shifting the addend.

Fig. 6 is another schematic circuit diagram showing part of a network like that of Fig. 5 and part of a network of a preceding decimal order. In this case then each relay is designated also with the number of the decimal order to which it belongs. Thus the relay CA of Fig. 5 now appears as CA—2 since it belongs in the second decimal denominational order, and relay A00, for example, likewise is designated A00—2.

Now it will appear hereinafter that a multiplier digit is a measure of the number of half-cycles of the summing cycle through which the summing relays are driven, and that the last half-cycle causes a change in control whereby with relay CA—2 for example, becoming operated, a relay CS—3 will operate simultaneously instead of the relay CR—3. It will, therefore, appear that upon the firing of tube OP a circuit will be extended through the contacts of the B and A relays of the number 2 decimal order to the C relays of the number 3 decimal order. The result is as follows: let it be assumed that the value 03700 is to be multiplied by 2. The multiplier digit is 2 and therefore the summing cycle will be driven by the counting relays through two half-cycles during the first of which the value 00000 expressed by the C relays will be added to the value 03700 expressed by the A relays to produce the sum 03700 expressed by the B relays, thus

```
C 0 0 0 0 0
A 0 3 7 0 0
─────────
B 0 3 7 0 0
```

The value now expressed by the B relays will be used as an augend and since the next addition will be the last the sum will be calculated and the shift made at the same time, thus

```
B 0 3 7 0 0
A 0 3 7 0 0
═════════
C 0 0 7 4 0
```

In this example, and others which may be given hereinafter, the double line will indicate a simultaneous summing and shifting operation.

It will appear hereinafter that means are provided whereby the extreme left-hand decimal order will automatically be provided with a 0 on a shift (or a 9, in case the N relays are operated) despite the fact that there are no augend and addend relays of a preceding order to operate the sum relays of this order on the shift.

The zero shift

Figure 7:
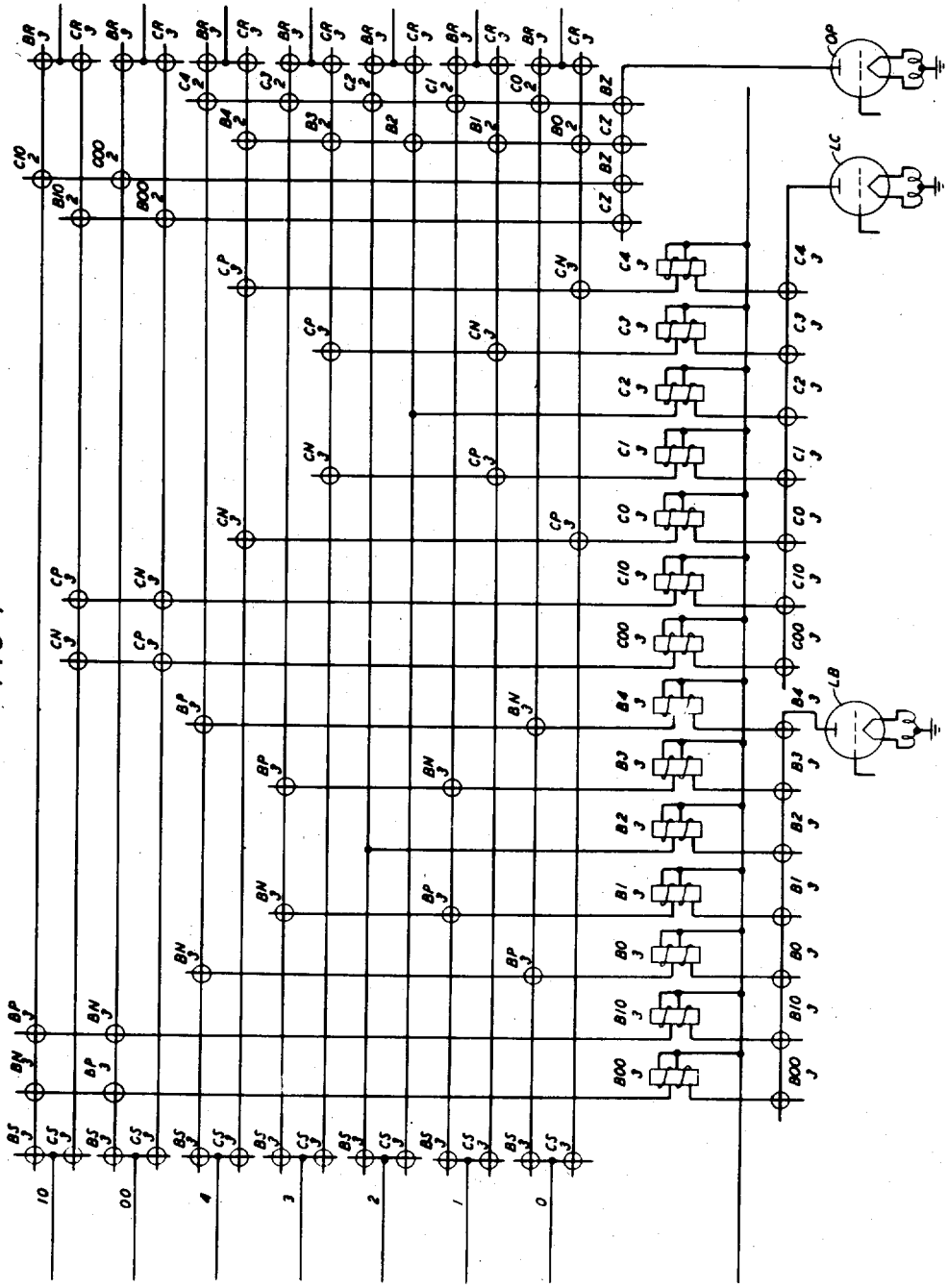
Fig. 7 is a similar schematic circuit diagram which will show how the values registered on the augend relays will be transferred without change to the sum relays of the next right-hand order when a multiplier digit of 0 is encountered, regardless of any value concurrently expressed by the addend relays.

Fig. 7 is another schematic circuit diagram showing part of a decimal denominational order network and indicating the means by which the value expressed by the augend relays of a preceding (left-hand) order is transferred directly to the sum relays of the order shown regardless of any value expressed through the operation of the addend relays. It will be noted in this figure that most of the contact points are designated to indicate that this is the third decimal denominational order. Note the designations of the sign relays, such as BP—3, BN—3, CP—3 and CN—3, the summing relays such as B10—3, B00—3, B0—3 and so forth and the switching relays such as BS—3, CS—3, BR—3 and CR—3.

All of these belong to the third order. There is, at the right-hand portion of the figure, however, a set of four leads by which the ground from the tube OP is extended by the common relays BZ and CZ into this third order network. These leads form entry means into this network controlled by the summing relays of a preceding order. Thus, upon the operation of the relay CZ, when the B relays are acting as augend means, the B relays, such as B10—2, B00—2, B0—2, etc., of a preceding order will extend connections into this third order to operate like numbered C relays. If, for instance, the augend expressed by the B relays of the second order is 3 and the relays B00—2 and B3—2 are energized, the sum now transferred by this zero shift will result in the operation of relays C00—3 and C3—3. Since at this time no one of the switching relays BS—3, CS—3, BR—3 or CR—3 is energized it will be plain that the operation of the A relays (addend) will not enter into the circuit operation.

Figure 8:
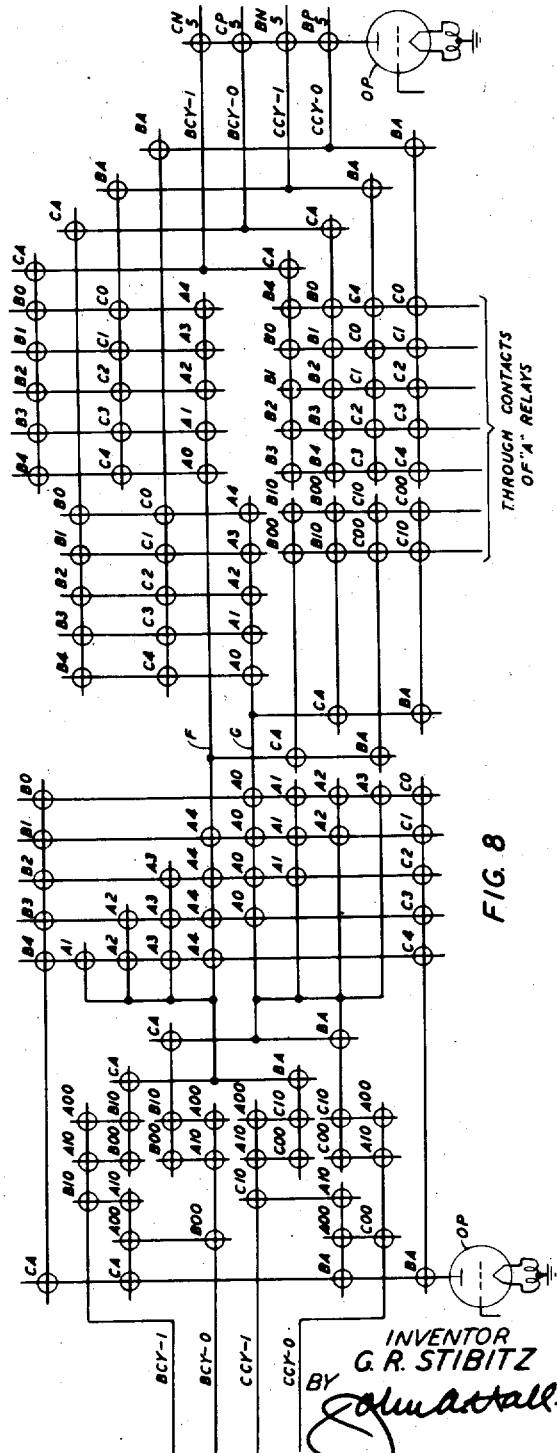
Fig. 8 is a schematic circuit diagram which will show the complete carry circuit network for a single decimal denominational order with an extension of the four incoming carry leads to the extreme right-hand decimal order to indicate how the carry is brought in to such order by the sign relays.

Fig. 8 is a diagrammatic representation of the carry lead network. This follows the same pattern as that detailed in Fig. 2 with the exception that in this figure there are shown four incoming and four outgoing carry leads, to work in with the plan for the alternative use of the B and the C relays as augend and sum means. It will be noted that when the B relays have been set and are acting as augend means, then the switching relays CA are operated and the incoming and outgoing carry leads BCY—0 and BCY—1 are effective. Under this condition the effective circuits will be an exact duplicate of the circuits of Fig. 2 with the BCY—0 leads corresponding to the incoming and outgoing carry 0 leads and the BCY—1 leads corresponding to the incoming and outgoing carry 1 leads.

Similarly, when the C relays are acting as augend means, the BA switching relays will be operated and the incoming and outgoing CCY—0 and CCY—1 leads will be effective. On each operation one of these four leads is grounded momentarily to perform such operations as those described in connection with Figs. 2 and 3. In this Fig. 8, there is shown at the extreme right and beyond the broken line, a circuit involving the four incoming leads to the last (right-hand) decimal order and the OP lead. This shows how the leads incoming to such last right-hand order are electrically characterized by the sign relays. As it will more fully appear hereinafter, the switching relays are prepared through the firing of the LB or the LC tubes so as to prepare the circuits for the operating impulse immediately afterwards supplied by the firing of the operating tube OP. Thus, upon the firing of tube LB all of the CA relays operate (one in each decimal order) and remain operated until tube LB is extinguished. Likewise the tube LC controls the BA relays, so that while tube LC is active the BA relays are operated, the C carry leads are effective and the C calculating relays (now acting as augend means) are held locked until the B relays (now acting as sum means) have been properly operated through the firing of tube OP. As soon as this has happened the tube LC is extinguished, the BA relays release and the C calculating relays are released ready to act as sum relays on the next half of the summing cycle.

Figure 16:
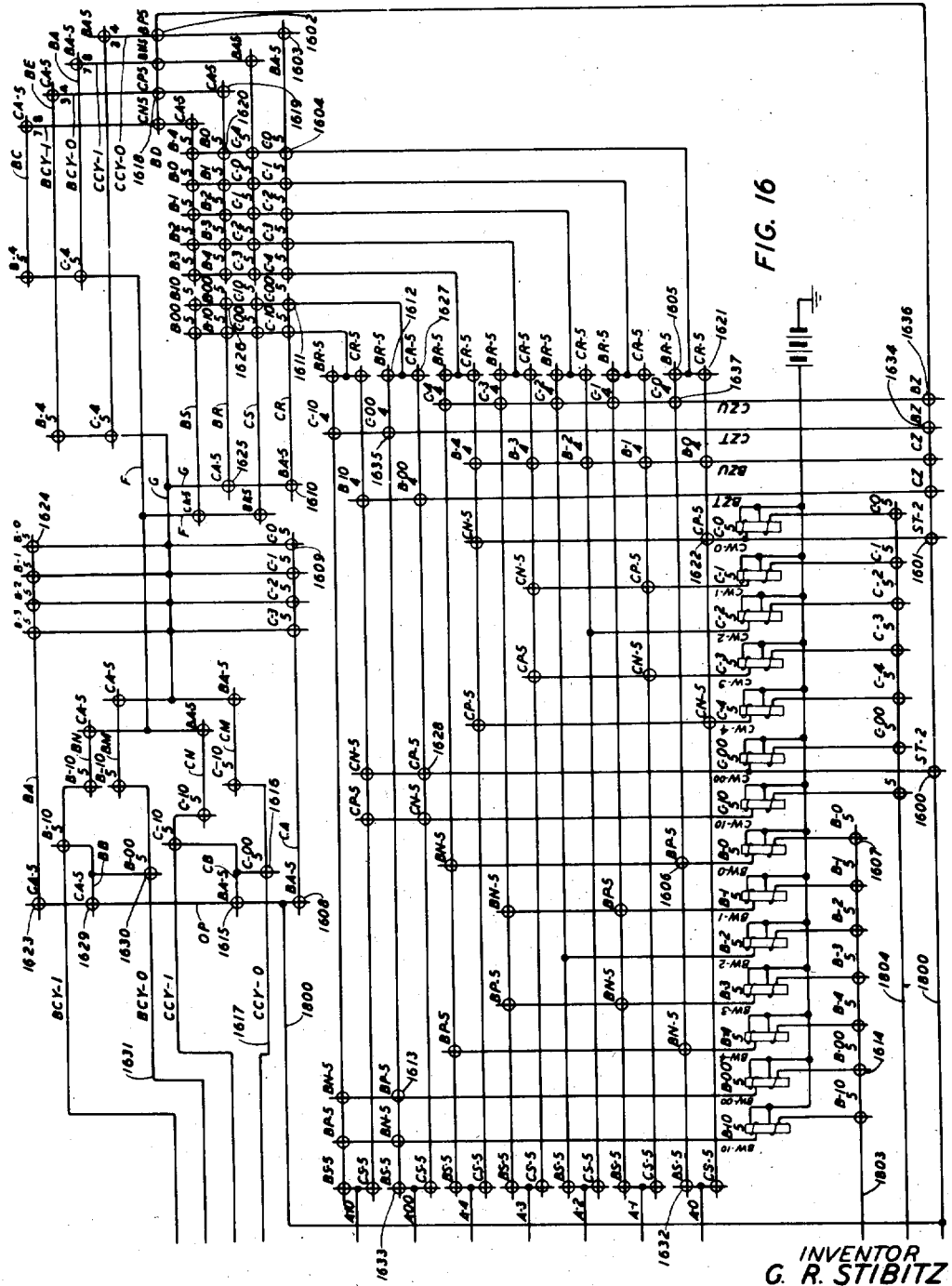
Fig. 16 shows the fifth or lowest decimal denominationa. order.

It is also to be noted that the sign relays of the last right-hand or lowest decimal order provide the means for the automatic addition of the fugitive one. Thus, when the BN or CN relay which operates to invert the derived sum is operated, the carry in 1 lead is grounded so that a 1 is added to the sum thus changing the complement expressed from the nine's complement to the ten's complement. It may be noted at the right-hand edge of Fig. 16 that the ground connected at various times to the OP conductor 1800 may be connected to the CCY—0 conductor by the BP—5 relay (contacts 1602), to the CCY—1 (carry 1) conductor by the BN—5 relay, to the BCY—0 conductor by the CP—5 relay (contacts 1618) or to the BCY—1 conductor by the CN—5 relay.

The summing cycle

Figure 9:
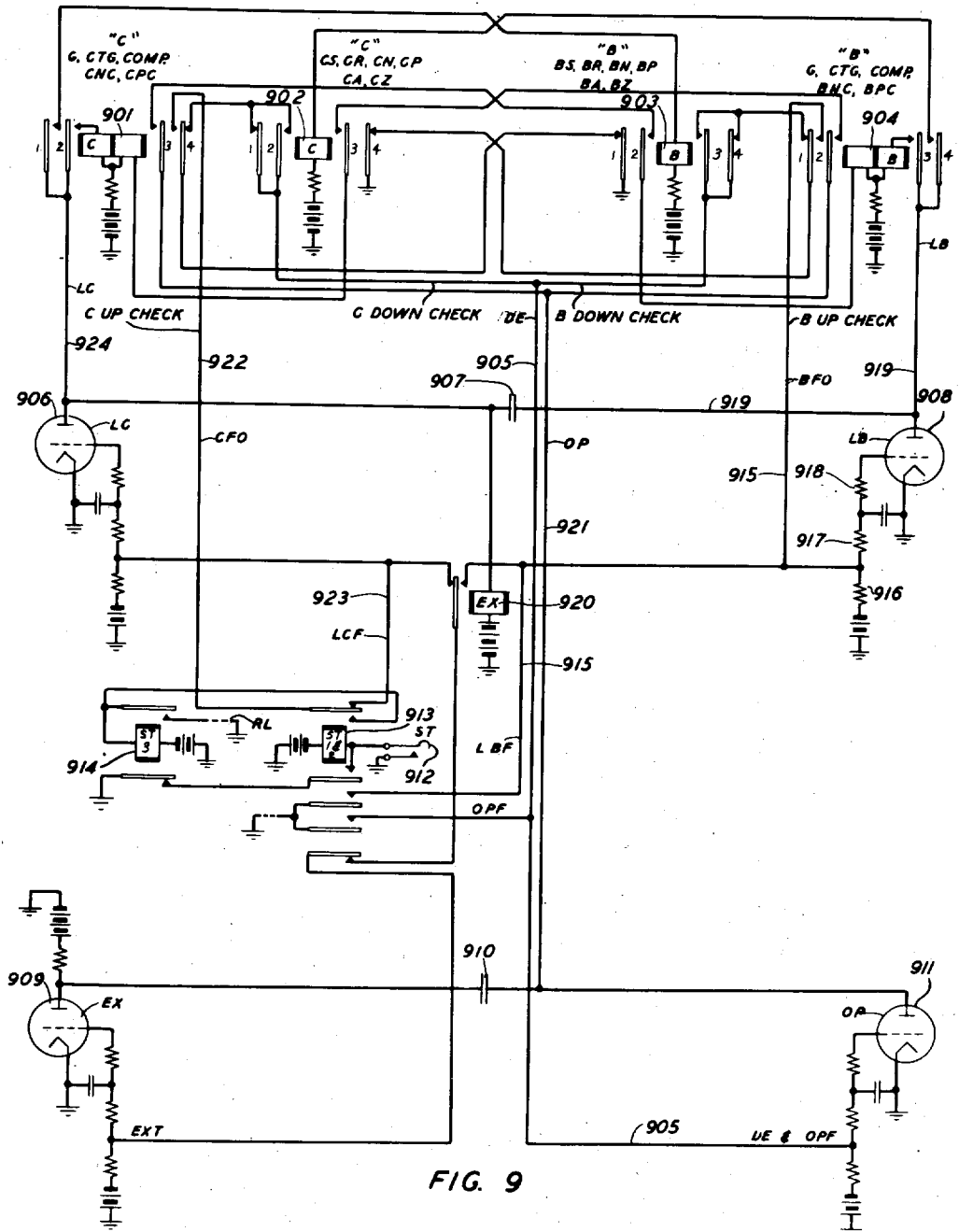
Fig. 9 is a schematic circuit diagram which will help to an understanding of the summing cycle.

Fig. 9 is a schematic circuit diagram designed to explain the summing cycle control and particularly the action and control of the gas tubes. The summing cycle may be stated as a series of operations taking place each of which is dependent upon the previous operation. First the augend and addend relays must be operated. When the augend relays have been properly operated then an extensive circuit through a series of contacts controlled by each of the augend relays in the complete arrangement is closed and this will give a signal for the operation of the operating tube. This tube thereupon fires and supplies an electrical condition on the operating lead which will thereupon cause the summing relays to be operated in accordance with the selective arrangement of the augend and addend relays. At this point another extensive circuit is closed to prove that the sum relays have been properly operated. Since the proper operation of the sum relays also depends upon the proper operation of the addend relays this second closed extensive circuit proves not only that the sum relays have been operated but also that the addend relays were previously properly operated. If this circuit is closed then an electrical condition will be established which will result in the firing of the sum lock tube and this tube in turn will extinguish the operating tube. Since the B and the C relays are alternately used as sum means the above-described cycle comprises but a half of what might be termed the summing cycle. There are two of the locking tubes, one known as LB for locking the B relays when they are used as sum means and one marked LC for locking the C relays when they are used as sum relays. Therefore when the tube LC, for instance, is fired, it will cause the extinguishment of both the LB tube and the operating tube OP.

The four relays 901, 902, 903 and 904 shown at the top of this diagram are representative of a large number of relays. Relay 901 represents the C computing relays, the C counting relays, the C group relays, and the C common sign relays. Relay 902 represents the C switching relays including the CS, the CR, the CN, the CP, the CA and the common CZ relays. Relay 903 represents the B switching relays and relay 904 represents the C computing and counting relays. Most of the circuits controlled by these relays are series circuits under the joint control of all the relays of a class as will be made clear in the following description of Figs. 21 to 25. Thus the circuit which is traced from ground on armature 1 of relay 903 actually extends in the series through all the BS, the BR, the BP, the BN, the BA and the BZ relays and then in series through the armatures and back contacts of all the C computing relays including the C00, C10, C0, C1, C2, C3 and C4 relays of each decimal denominational order, the C group relays including the GTC, the GHC, the GXC and the GLC, the C counting relays including the CC00, CC10, CC0, CC1, CC2, CC3, CC4 and CC5 relays and the two sign relays CPC and CNC, thence through the front contacts of certain and back contacts of certain other switching relays (it will be noted that either the CS or the CR relays of a group are operated and either the CN or the CP relays are operated) before it reaches the DE conductor 905. It will therefore be understood that this circuit may be generally described as ground, armature 1 and back contacts of the B switching relays, armature 4 and back contacts of the C counting and computing relays, contacts of the C switching relays to the DE conductor whereby the grid of the tube OP is brought from a negative to a ground potential.

Below the four relays 901 to 904 there are shown four gas tubes marked LC, LB, EX and OP. The LC and LB tubes are, as hereinbefore mentioned, used to lock in the derived sums on the C and B relays, respectively. The EX tube is used as a means of extinguishing the OP tube which in turn is known as the operating tube.

Each of these tubes is essentially a three-element gas-filled tube having its cathode at ground potential and its anode at certain times extending through load circuits to a positive potential (+100 volts). The grid of each of these tubes is connected through a number of resistances forming a potentiometer to a source of negative potential (—48 volts). If the anode of this tube is connected to its load circuit and therefore has standing on it a positive potential it will not operate so long as the grid is held at a negative potential. However, when the tube is to be fired it will be found that a circuit is connected to a point on the said potentiometer whereby the grid is changed from negative to a ground potential and at this time the tube will fire and will thereafter remain in operation even though the ground is removed from the said potentiometer point. It will be noted that the anode of the LC tube 906 is connected by a condenser 907 to the anode of the LB tube 908. The condenser 907 is of fairly large capacity (16 microfarads) so that if tube 908 is in operation and the ground has been removed from its potentiometer point then upon the firing of tube 906 the discharge of condenser 907, due to the fact that its connection to the anode of tube 906 is suddenly reduced to ground potential will, in effect, momentarily short-circuit the tube 908 and this tube will thereupon cease operation.

In the same manner the anode of tube 909 is connected by a large capacity condenser 910 to the anode of the operating tube 911 so that upon the firing of tube 909 tube 911 is extinguished.

Since under the circuit conditions herein established each of these tubes will have a positive potential connected to its plate, through some one or more paths at all times, the firing of the tube is accomplished by connecting ground to the said cathode potentiometer point. The extinguishment of the tube is accomplished by first opening this ground connection and second by subjecting it to a condenser discharge from another tube which fires at the instant the tube in question is to be extinguished. In the pattern of operation herein employed the tubes LB and LC mutually control each other, that is LB on firing extinguishes LC and LC on firing extinguishes LB. Since the tube OP must be extinguished each time either of the tubes LB or LC is extinguished a tube EX is provided for this particular purpose and this is controlled by a relay EX(920) which connects the potentiometer point of the tube EX to the potentiometer point of the LB tube when the LC tube is operating and to the potentiometer point of the LC tube when the LB tube is operating.

Figure 17:
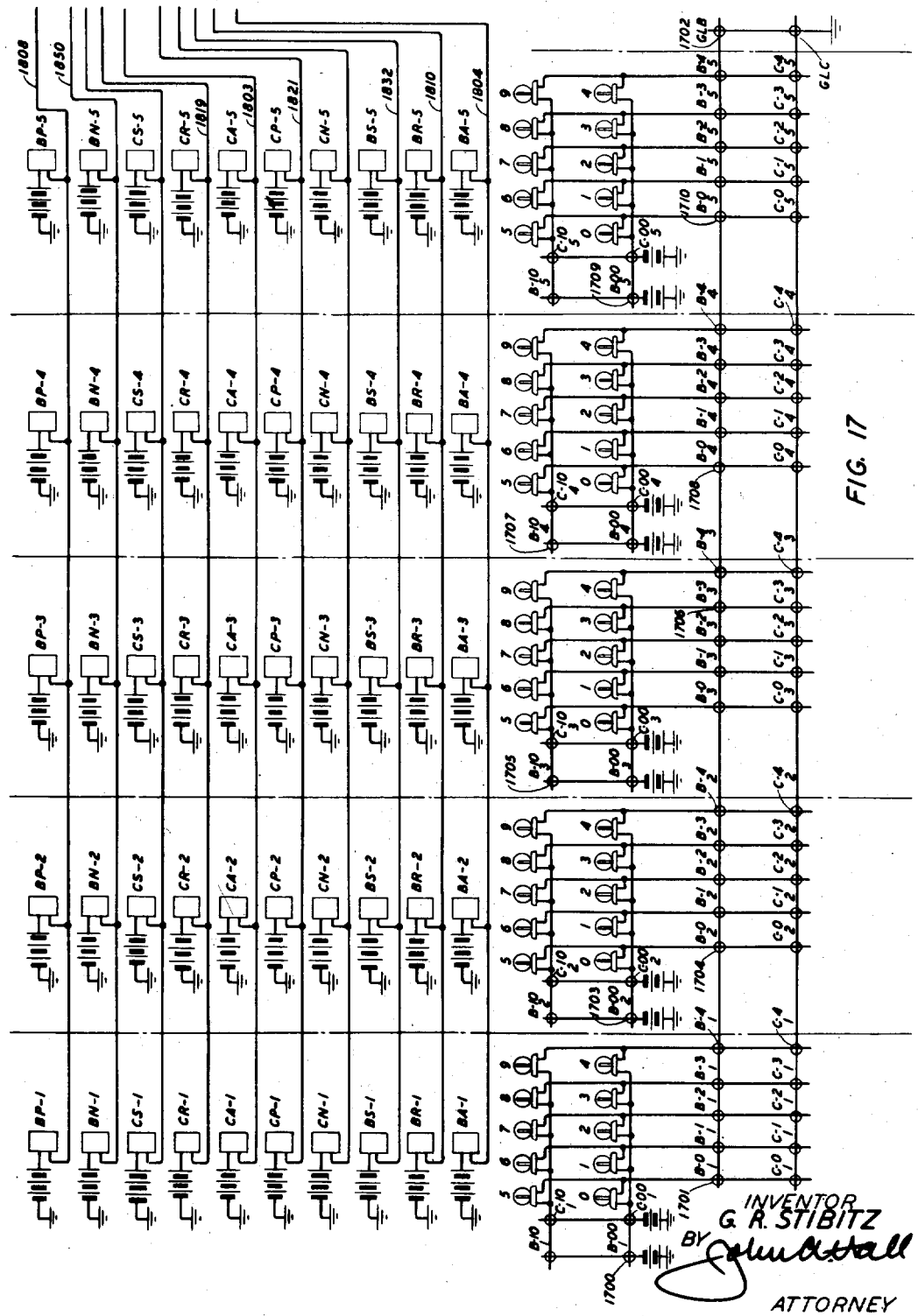
Fig. 17 shows the switching relays individual to each of the decimal orders.
Figure 18:
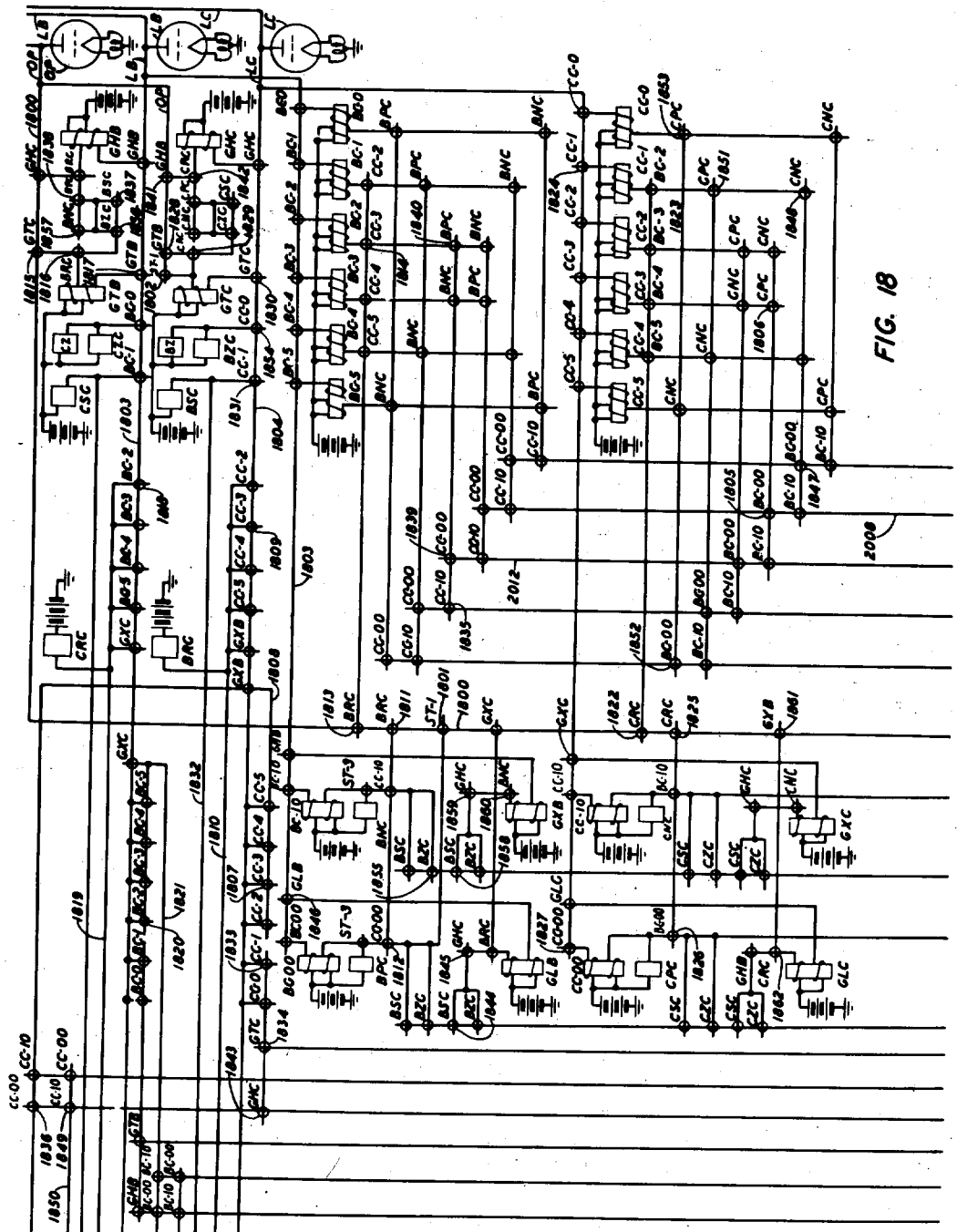
Fig. 18 shows the common switching relays.

In the left-hand center portion of this diagram here are shown several relays and a starting key. The summing cycle actually starts with the operation of the start key 912. This grounds the winding of the start relay here designated 913. This start relay locks through its armature 2 and front contact to ground supplied by armature 2 of relay ST3 here designated 914. Relay 913 now supplies a ground connection over its armature 1 and front contact to the LBF lead 915 leading to the potentiometer point between resistances 916, 917 and 918 of tube 908. The tube 908 will fire at this time since a load circuit connection to the lead 919 to a source of positive battery which is at all times present (note the connection of the LB conductor 1803 to the CA relays in Fig. 17). A similar circuit from ground will be established from armature 4 and front contact of relay 913 to the DE lead 905 extending to the potentiometer point for tube 911 so that the operating tube OP now connects ground to the OP lead 921. Through connections which are indicated in Figs. 21 to 25 the OP lead will originally cause the operation of all of the C00 and C0 computing relays thus setting the C relays to 0 as the original augend to be used in the following computation. It may be noted at this time also that armature 5 of relay 913 opens the circuit to the potentiometer point of EX tube 909 to prevent this tube from firing at this particular time.

Certain of the C counting relays will also have been operated through the firing of the OP tube so that now if the proper pattern of operation has taken place, the first series circuit will be closed from ground, armature 1 and back contact of the B switching relays, armature 4 and front contact of the C computing and counting relays to the CFO lead 922 leading through armature 1 and front contact of relay 913 to the winding of relay 914. Thus the ST3 relay will operate and remove the holding ground from relay 913. Since the operation of the start key 912 is only momentary the relay 913 will release and by removing the ground from the potentiometer points of tubes 908 and 911 prepares these tubes for extinguishment. Upon the full release of relay 913, the CFO lead 922 is now switched to the LCF lead 923 leading to the firing point of tube 906. Therefore the ground which causes the operation of relay 914 is now extended to the potentiometer point of the LC tube and this tube fires. The discharge of condenser 907 at this time will cause tube 908 to become extinguished. Relay 920 is released at this time so that now the ground on the LCF conductor 923 is extended through the back contact and armature of relay 920, the back contact and armature 5 of relay 913 to the firing point of the EX tube 909. This tube fires and through the charging of condenser 910 causes the extinguishment of tube 911. Upon the firing of the LC tube 906, the EX relay 920 is operated so that upon the application of ground to the BFO conductor 915 to fire the LB tube 908 and thus extinguish the LC tube 906, the EX tube 909 will be fired to extinguish the OP tube 911.

Upon the firing of the LC tube 906 ground is connected to the LC conductor 924 whereupon relay 920 is operated to extend the firing point of the LB tube 908 to the firing point of the EX tube 909, and the operated C relays are locked in and a ground is extended over armature 1 and front contact of the C computing relays to the wiring of the B switching relays, thereupon preparing the circuits for the first summing operation. If the relays operate in the proper order then a circuit may be traced from ground, armature 4 and back contact of the C switching relays, armature 1 and back contact of the B counting and computing relays, the front contact and armature 3 of certain and back contact and armature 4 of certain other of the B switching relays to the DE conductor 905 whereupon the OP tube 911 is again fired. This is followed by the effective connection of ground to the OP lead 921 by the OP tube 911 whereupon a connection may be traced through the armature 3 and front contact of the C computing relays, the front contact and armature 2 of the B switching relays and, it may be noted, the armatures and contacts of the A relays, not shown in this figure, to the operating windings of the B computing relays whereby a derived sum in accordance with the selective operation of the C computing and A relays is now expressed by the selective operation of the B computing relays. The ground at the armature 4 and back contact of the C switching relays is now extended through armature 1 and front contact of the B computing relays to the BFO lead 915 which causes the firing to the LB tube. The LB tube locks in the B computing relays and through condenser 907 causes the extinguishment of the LC tube 906. Upon the firing of tube 908 ground connected to the BFO conductor 915 is extended to the firing point of tube 909. This tube through condenser 910 causes tube 911 to be extinguished.

At this point half of the summing cycle has been completed. The C computing relays are now all returned to the released state and when it is established through the series circuit represented by armature 4 and back contact of the C computing relays that these relays have properly released then the next half-cycle will occur.

*The counting relays*

The summing cycle has also been pictured in another manner in Fig. 10 which is a combination of the sequence chart and schematic circuit diagram. The three tubes LB, OP and LC here numbered 1001, 1002 and 1003 are shown at the left of this figure. The graph 1004 represents the periods of operation of the LB tube, the lower horizontal portions of this graph representing periods of non-operation and the upper portions of this graph representing the operating periods thereof. In the same manner graph 1005 represents the operation of the OP tube 1002 and the graph 1006 represents the operation of the tube 1003. The diagram in this instance represents the summing operations taking place when the multiplier digit keys have been set to multiply a given multiplicand by 23. Thus when the start key ST—1 represented by point 1007 is operated it will connect the anode of the operating tube OP through the multiplier units key 3 here represented by point 1008 to the CC3 counting relay. The CC3 relay will lock to the anode of the LC tube through the point 1009. The LC tube, firing at this point, extinguishes the tubes 1001 and 1002 which had been operated upon the operation of the start key. The counting relay CC3 now closes a circuit through the BRC relay represented by point 1010 and one of its own contacts represented by point 1011 to the BC2 relay. When the operating tube 1002 next fires it renders this circuit effective and this is followed by the locking of the BC2 relay to the LB conductor through the point 1012. The firing of the LB tube extinguishes the OP and LC tubes. The operation of relay BC2 now closes a circuit from the OP lead through point 1013 controlled by the CRC relay, a contact controlled by itself designated 1014 to the CC1 relay. In turn the CC1 relay is operated and this results in a connection now through a group relay GTC so that the following counting relay to be operated will be BC2 as determined by the tens multiplier key, in this case key T—2.

It should be noted in this case that the counting relays operate in a pattern which may be stated as the operation of first one relay of one counting relay group followed by the operation of the next lower numbered counting relay of the other group. This is shown in Fig. 10 through the operation of first CC3, second BC2, third CC1 (for the units multiplier digit 3) then BC2 and finally CC1 (for the tens multiplier digit 2). It will be noted that the LC and LB tubes are alternately in operation and that the operating tube OP operates during the operation of each of these locking tubes. A complete summing cycle therefore consists of one operation of each of the tubes LB and LC and two operations of the operating tube OP. It may further be noted that during the operation of the counting relays numbered BC2 or greater the BRC and CRC relays are operated but that finally when a counting relay such as CC1 is operated the shift relay BSC is operated for the purposes hereinbefore explained. Thus the operation of the BC2 relay the second time is controlled over the point 1017 by the BSC (shift) relay and point 1015 by the GTC relay and 1016 by the tens key T—2.

It may further be noted that the more complete sequence charts, Fig. 27, will correspond exactly with the graphs 104, 105 and 106.

Check circuits

Figure 22:
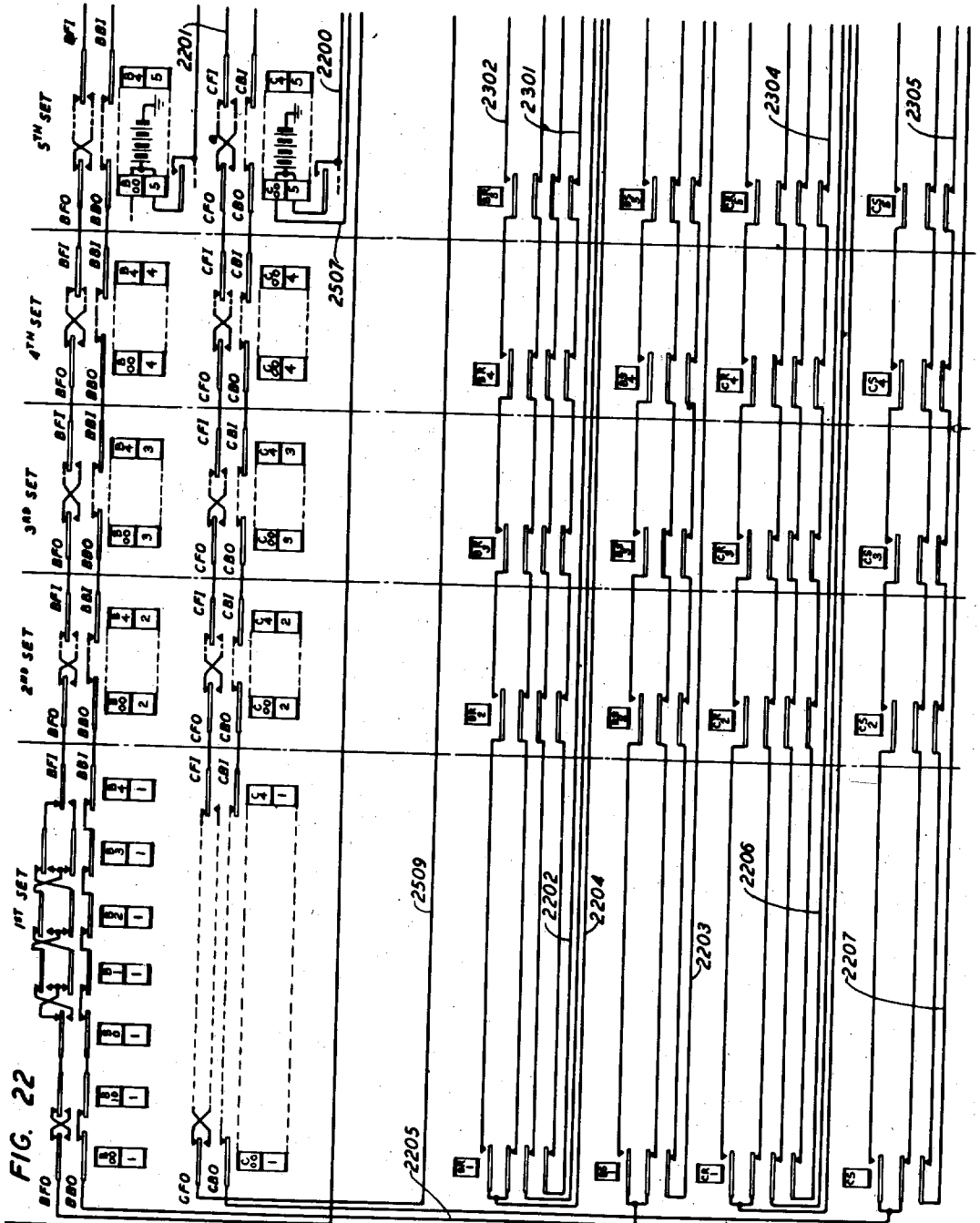
Fig. 22 shows the B and C computing relays and part of the switching relays for the five decimal denominational orders.
Figure 23:
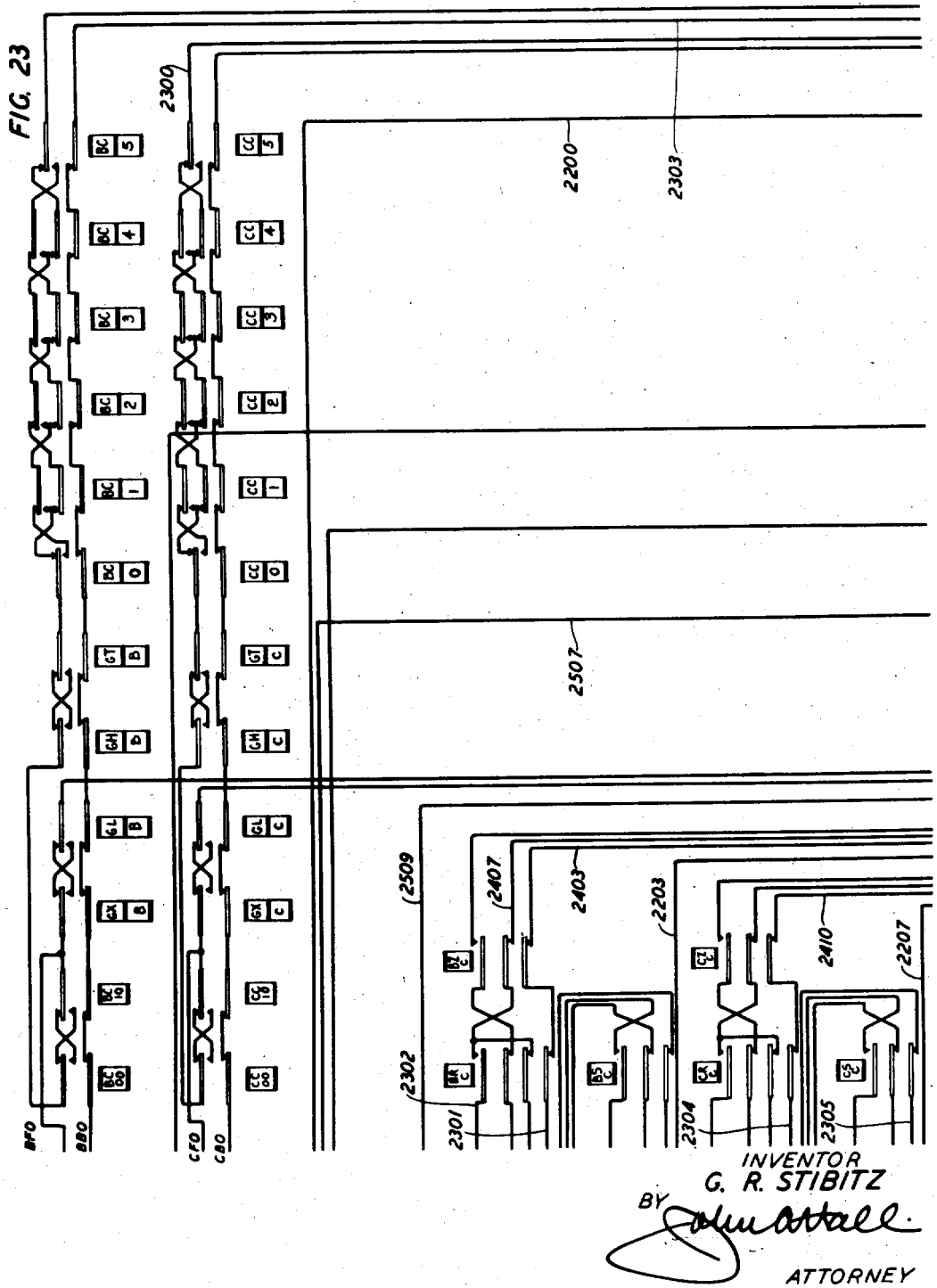
Fig. 23 shows the counting relays, the group relays and certain of the common switching relays.
Figure 24:
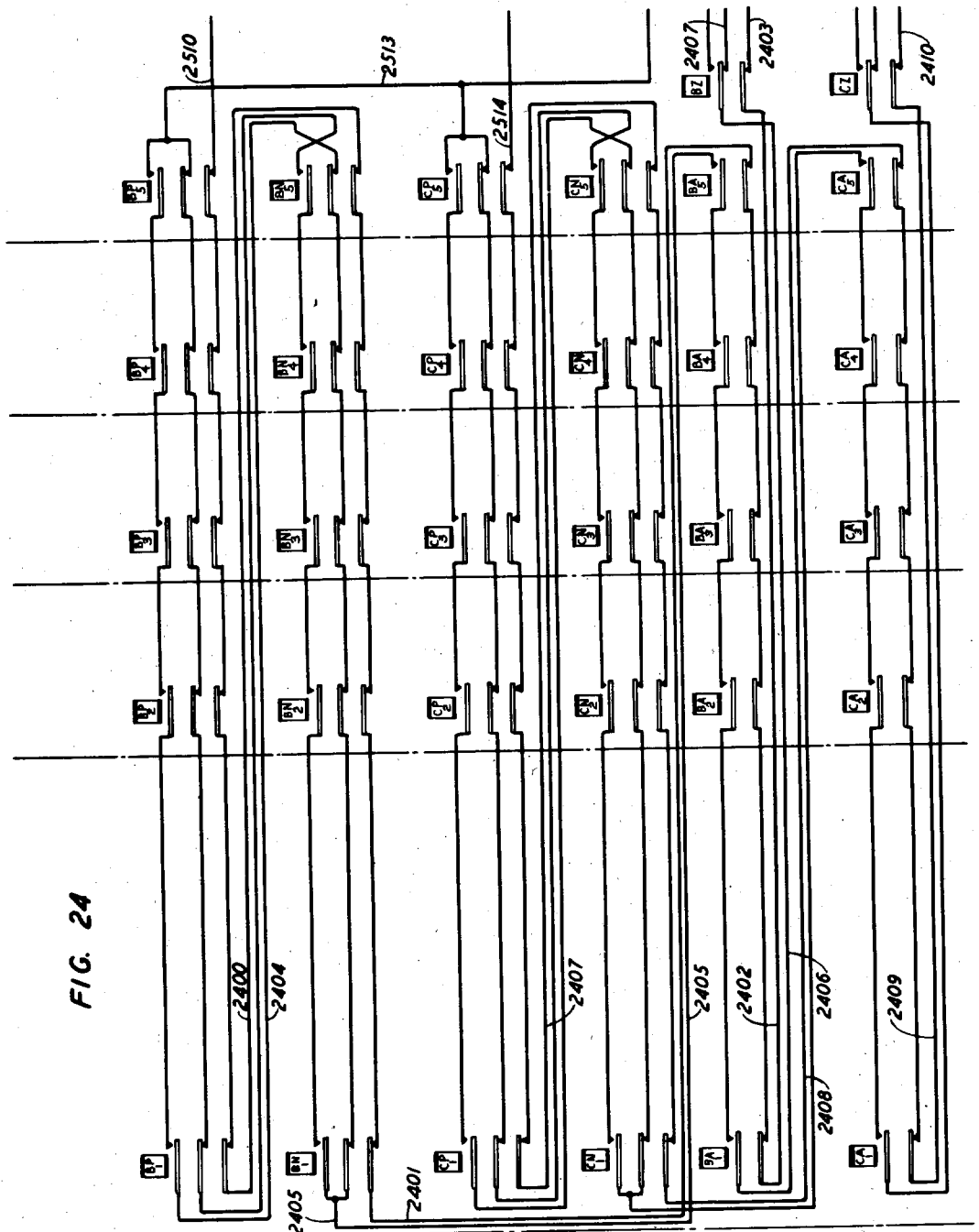
Fig. 24 shows the remainder of the individual decimal denominational order switching relays.

Fig. 21 shows the manner in which Figs. 22 to 25, inclusive, may be placed to form a schematic circuit diagram of the check circuits. In Figs. 22 and 24 there are shown the computing and switching relays of the five decimal denominational orders. The computing relays are shown at the top of Fig. 22 and consist of seven B relays and seven C relays in each of the orders. The seven B relays, by way of example, and as has been pointed out hereinbefore, consist of the relays B00, B10, B0, B1, B2, B3 and B4. These seven relays are shown in full without any connections to their windings but only with the check circuits operated thereby. The remaining sets of computing relays are shown only by the first and last relays of the set, that is B00 and B4. In the fifth set the relays B00 and C00 are shown with both their windings connected to a source of positive battery for purposes which will appear hereinafter and the relay C00 is shown with a connection to its operating winding as well as to its locking winding.

In the lower part of Fig. 22 and in Fig. 24 the switching relays individual to each of the decimal orders are shown consisting of the relays BR, BS, CR, CS, BP, BN, CP, CN, BA and CA. These relays are shown schematically, that is, the windings are indicated but no means for operating them is shown. Each of these relays is shown also only with its armatures and contacts which are included in the check circuits.

In the upper part of Fig. 23 and in line with the B and C computing relays are shown the B and C counting relays with the check circuit armatures and contacts controlled thereby. In the lower left-hand corner of Fig. 23 are shown certain common switching relays associated with the BR, BS, CR and CS relays. Likewise in the left portion of Fig. 25 there are shown certain common sign relays CN, CP, BN and BP.

In the right-hand upper portion of Fig. 25 there is shown the common start and release circuit and in the lower right-hand portion of Fig. 25 is shown three of the gas tubes and the five testing keys indicated on the mounting plate 110 of Fig. 1.

The operation of the check circuits will be apparent from the following short description of certain operations. It will be assumed that the multiplicand keys have been operated to energize the addend relays A which constitute part of the second and third decimal denominational orders but which are not shown in this schematic circuit diagram since they are not involved in the check circuits. It will also be assumed that the multiplier keys have been operated. Thereupon the start key 2500 will be operated and this will result in the immediate operation of start relays ST—1 and ST—2. These two relays actually constitute a single relay but for practical purposes have been made into two relays connected in parallel. Upon the operation of relay ST—1, relays ST—1 and ST—2 will lock in a circuit from ground, armature 2 and back contact of relay ST—3 designated 2503, armature 2 and front contact of relay ST—1 here designated 2501 to the windings of both relays 2501 and 2502. Through the operation of these two relays a circuit is now extended from ground over armature 3 and back contact of relay 2503 to armatures 3 and 4 of relay 2501 whence the potentiometer grid circuits of the gas tubes OP, here designated 2505, and LB, here designated 2506, will be grounded. It has been explained hereinbefore that the grid of these tubes is normally held at negative potential but that when these grid potentiometer circuits are grounded this potential is reduced to ground potential and therefore the tube will fire if its plate is properly connected at this time to a source of positive potential. The plate of tube 2505 may now be traced through the front contact and armature 3 of relay 2502, conductor 2507 and thence to the upper winding of the computing relay marked C00—5 and thence to positive potential so that the tube OP will fire and cause the operation of this computing relay C00—5. This is representative of ten such relays which are simultaneously operated by the tub OP, these relays being the C00 and the C0 relay of each set whereby the C relays of each set are operated to represent the value 0. Each of these relays will connect through its lower winding and its lower armature and front contact to conductor 2200 which may be traced through Figs. 23 and 25 to the plate of the LC tube, here designated 2508. Although the tube LC has not fired at this time it will be noted that before the operating ground supplied by the tube OP to the operating winding of these C relays is removed the ground will be placed on conductor 2200 by tube 2508. In other words the OP tube 2505 will remain in operation until it is extinguished through the firing of the EX tube simultaneously with the firing of the LC tube 2508 as hereinbefore explained in connection with Fig. 9.

In accordance with other descriptions herein given it will be understood that the firing of tube 2505 will also result in the proper operation of the C counting relays shown in the upper part of Fig. 23. At this time therefore further operation of the device depends upon the closing of an extensive check circuit. This may be traced from the winding of relay ST—3 here designated 2503 through the front contact and armature 1 of relay 2502, conductor 2509 to the upper armature of relay C1—00 and thence through a chain circuit which is closed only if one and one only of the relays C00 and C10 is operated and only if one and one only of the five relays C0 to C4, inclusive, is operated in each of the five sets to conductor 2201, thence through a circuit controlled by the C counting relays which is closed if one and one only of the relays CC00 and CC10 is operated through a similar circuit controlled by relays GHC and GTC which is closed if one and one only of these two relays is operated, thence through a circuit which is closed if one and one only of the six counting relays CC0 to CC5, inclusive, is operated, over conductor 2300 through a circuit which is closed if one and one only of the relays CNC and CPC is operated, conductor 2510, over a circuit passing through the back contact and armatures of the BP relays, conductor 2400 over a circuit including the back contact and armatures of the BN relays, conductor 2401 over a circuit including the back contact and armatures of the BA relays, conductor 2402, over the lower armature and back contact of the BZ relay, conductor 2403 through a circuit controlled by the back contact and lower armatures of the BZC and BRC relays, conductor 2301, the back contacts and armatures of the BR relays, conductor 2202, the back contact and lower armature of the BSC relay, the back contacts and armatures of the BS relays, conductor 2203, through the test keys 2511 and 2512 to ground. Thus if the C computing and counting relays are properly operated and all of the B switching relays are released the ST—3 relay here designated 2503 will operate. This relay now locks through its winding, its upper armature 1 and front contact, the upper armature 1 and back contact of the release relay 2504 to ground. The operation of relay 2503 will open the holding circuit of the ST—1 and ST—2 relays so that these will release. Upon the release of the ST—1 and ST—2 relays, the CFO lead 2509 is extended to the cathode potentiometer circuit of the LC tube and this tube fires. It may also be noted that a refinement in time saving has been provided whereby the LC tube is fired immediately that the ST—3 relay is operated from armature 5 thereof, such circuit being opened again as soon as ST—2 operates to close the principal connection through armatures 1 of both the ST—1 and ST—2 relays. The potentiometer grid circuit grounds for tubes OP and LB will now be opened but these tubes will continue to operate as long as current flows therethrough by reason of the fact that their plates are connected to a load circuit terminating in a positive potential.

Upon the operation of relay 2503 a connection is extended from ground through the armature 5 and front contact of relay 2503 to the grid potentiometer circuit of the LC tube here designated 2508 whereupon this tube will fire to lock into operated position such relays as C00—5. The firing of the LC tube as hereinbefore explained results in the return to normal of the tubes OP and LB so that the circuit is at this instant in the condition of having the properly operated C computing and C counting relays locked and any of the B counting relays which may have been operated now released due to the removal of ground from the plates of tubes 2505 and 2506.

The B switching relays are now operated in accordance with the pattern hereinbefore explained. If, for instance, the CC3 counting relay has been operated, then the BRC and BR relays, the BP relays and the BA relays will respond. This will result in the establishment of another extensive check circuit. This circuit may be traced from the ground potentiometer circuit of tube 2505, conductor 2513, over the front contacts and operated armatures of the BP relays, conductor 2404, the back contacts and armatures of the BN relays (either the positive or negative relays but not both must be operated) conductor 2405, the front contact and operated armatures of the BA relays, conductor 2406, the upper armature and back contact of the BZ relay, conductor 2407, the back contact and middle armature of the BZC relay, the front contact and upper armature of the BRC relay, conductor 2302, the front contact and operated armatures of the BR relays, conductor 2204, the back contact and middle armature of the BSC relay and the back contact and middle armatures of the BS relays (either the regular BR or shift BS relays must be operated but not both), conductor 2205 through a straight chain circuit involving an armature and back contact of each of the B computing and B counting relays, conductor 2303, the back contact and lower armatures of the relays BPC and BNC, conductor 2514, the back contact and armatures of the CP relays, conductor 2407, back contact and lower armatures of the CN relays, conductor 2408, the back contact and lower armatures of the CA relays, conductor 2409, the lower armature and back contact of the CZ relay, conductor 2410, the back contact and lower armatures of the CZC and CRC relays, conductor 2304, the back contact and lower armatures of the CR relays, conductor 2206, the back contact and lower armature of the CSC relay, conductor 2305, the back contact and lower armature of the CS relays, conductor 2207, through the test keys 2515 and 2512 to ground. Thus if all the B computing and B counting relays are in released position ready to properly compute the first sum to be derived from the addend values expressed by the A relays in the second and third denominational orders and the augend value expressed by the operation of the C computing relays and if, in addition, the proper operation of the B and C switching relays is established then the operating tube OP will be fired.

It will be seen from these schematic drawings, Figs. 22 to 25, that there are two checking circuits which must be closed, the first to operate relay ST—3 (and in later stages to fire the tube LC) and the second to close the potentiometer grid circuit for the operating tube OP. The first check circuit extending over the back contacts of the B switching and what might be termed the front contacts of the C computing and counting relays proves that the C computing and counting relays are properly operated and that no one of the B switching relays is improperly operated at this time. The second circuit which results in the operation of the tube OP proves that no one of the B computing or counting relays has been operated and that the B switching relays have now been operated ready to perform the first summing operation. These are extensive circuits going through a very large number of armatures and contacts but they nevertheless follow the well-known principles.

The extensive series circuit used for the operation of the ST—3 relay 2503 and the application of ground to the potentiometer circuit of the LC tube 2508 is known as an "up-check" circuit since the closure of this circuit checks the fact that certain relays have properly come up (the armature has moved up to the pole face of the relay and the front contacts have been made). This particular up-check circuit identified by the letters CFO may be termed the C up-check circuit since it proves that the C relays have been operated in a proper pattern. Similarly, the BFO circuit leading to the potentiometer circuit of the LB tube 2506 may be termed the B up-check circuit.

Other circuits, one of which has been described in detail, are known as down-check circuits for they prove that certain relays of a group are "down," that is such relays are completely released. Thus the B down-check circuit leads from ground over conductor 2207 a chain circuit BBO including the back contacts of the B relays to the conductor 2513 for firing the OP tube 2505 and the C down-check circuit leads from ground over conductor 2203 a chain circuit CBO including the back contacts of the C relays to conductor 2513.

The up-check circuits fire the locking tubes and the down-check circuits both fire the OP tube.

While no alarm circuits have been shown herein in order to avoid complicating the disclosure it will be understood that, also in accordance with well-known principles, an alarm circuit may be caused to operate when any one of these check circuits fails to close within a given period. For the purposes of satisfying the requirements of showing every element claimed, the lamps used for displaying the derived product may be taken as an alarm, since the operation of the device is so very fast that it will seem to the operator that in normal operation he can hardly remove his finger from the start key before such display lamps light up. Therefore if these lamps fail to display a product immediately after the start key is depressed, such failure will act as a signal and will constitute an alarm. The check circuit for operating tube LC has a counterpart in a symmetrical and like check circuit for operating tube LB so that fundamentally there are three of these extensive circuits, two of which have been described in some detail.

*Detailed operation*

The detailed operation of the circuits will be described in connection with the shorthand schematic circuits diagrams, Figs. 12 to 20, inclusive, arranged as in Fig. 11 and with the sequence charts Fig. 27. These sequence charts will show the sequence of operations in four examples which illustrate the four different types of operation controlled by the sign relays.

With the short-cut method of multiplication the number of additions is reduced so that the maximum number of additions is five for any multiplier digit. When the digit is 0 to 4 the number of additions to be made will be 0 to 4 unless a previous digit was 5 or more in which case the number of additions to be made will be 1 to 5. When the number of additions is 5 to 9 (in accordance with the value of the digital key depressed) the number of subtractions will be 5 to 1 unless a previous digit was 5 or more in which case the number of subtractions will be 4 to 0. Because subtraction is obtained by adding the complement of the number one additional addition is required. The sign relays and the computing sets are controlled either from key contacts or contacts of the counting relays. The positive or P relay operates when counting relays 2 to 5 are operated and the accumulated sums are placed on the B and C computing relays as added. The shift is made when the No. 1 counting relay is operated. The sign relay N or P is operated by a combination of key and binary counting relay contacts to place the accumulated sum in the B or C computing relays either as computed with P operated or as the complement with N operated.

There are four conditions governing the sign relays. At the time of shift the next multiplier digit to be used is placed on the counting relays and since the binary relay set for the old multiplier digit is still operated the setting of the counting relays for the new digit can be modified accordingly. Thus the four conditions are as follows:

*1.—New digit 0 to 4; old digit 0 to 4*

At the time of shift the P computing and P counting relays are operated and since the 00 binary relay of the old digit is operated the quinary counting relays for the new digit are set in direct correspondence to the key setting.

*2.—New digit 0 to 4; old digit 5 to 9*

At the time of shift the N computing and N counting relays are operated and since the 10 binary relay of the old digit is operated the quinary counting relays for the new digit add 1 to the key setting to provide for the final addition required by the method of subtraction which is employed for the old digit. The N computing relays provide for placing the complement of the accumulated sum on the B or C computing relays in the shifted position.

*3.—New digit 5 to 9; old digit 0 to 4*

At the time of shift the N computing and N counting relays are operated and since the 00 binary relay of the old digit is operated the quinary relays for the new digit are set to count 10 minus the key setting, whereby 9 becomes 1, 8 becomes 2, 7 becomes 3, 6 becomes 4 and 5 becomes 5. The complement of the accumulated sum is shifted on the B or C computing relays. If the new digit is the last multiplier digit a relay X (such as GXB or GXC) is operated at the time of shift. This relay causes one more addition to be made without any further shift and thus compensates for the method of subtraction used.

*4.—New digit 5 to 9; old digit 5 to 9*

At the time of shift the N computing and N counting relays are operated and since the 10 binary relay of the old digit is operated the quinary relays for the new digit are set to count 9 minus the key setting and 9 becomes 0, 8 becomes 1, 7 becomes 2, 6 becomes 3 and 5 becomes 4. The complement of the accumulated sum is shifted and the X relay is operated to cause one more addition to be made without further shift.

These operations may be tabulated as follows:

| Old Digit | | New Digit | | Sign | | | Quinary Ctg. Relay | Relay X GXB—GXC |
|---|---|---|---|---|---|---|---|---|
| Key | Binary Ctg. Relay | Key | Binary Ctg. Relay | Ctg. | Key-set | Last Digit | | |
| 0–4 | 00 | 0–4 | 00 | P | P | P | 0–4 | Not operated. |
| 5–9 | 10 | 0–4 | 10 | P | N | N | 1–5 | Do. |
| 0–4 | 00 | 5–9 | 10 | N | N | N | 5–1 | Operated. |
| 5–9 | 10 | 5–9 | 10 | N | P | N | 4–0 | Do. |

The attached chart illustrates the operation of the four combinations just discussed. The circuits will be traced with reference particularly to the shorthand schematics, Figs. 12 to 20, inclusive, and other sketches will be referred to for more detailed wiring when needed. Four examples fulfilling the four conditions in the above table will be given: (1) the multiplication of 37 by 23; (2) the multiplication of 37 by 19; (3) the multiplication of 37 by 80; (4) the multiplication of 37 by 88 all as indicated in the four headings over the four sections of sequence charts, Fig. 27.

1.—Multiplication of 37 by 23—result 851

In the solution of this problem the counting and computing relays operate as follows:

| Multiplier Digit | Counting | | Computing | |
|---|---|---|---|---|
| Units 3 | CC00 | CC3 | C relays set for | 00000 |
| | | | A relays set for | 03700 |
| | BC00 | BC2 | B relays sum | 03700 |
| | | | A relays set for | 03700 |
| | CC00 | CC1 | C relays sum | 07400 |
| | | | A relays set for | 03700 |
| Tens 2 | BC00 | BC2 | B relays sum and shift | 01110 |
| | | | A relays set for | 03700 |
| | CC00 | CC1 | C relays sum | 04810 |
| | | | A relays set for | 03700 |
| | | | B relays sum and shift | 00851 |

In the sequence chart the small figure in the bottom right-hand corner marked "Legend" indicates the manner in which the operation of the various devices is indicated. There are in this legend five intervals marked 3, 4, 5, 6 and 7, during the first two of which, 3 and 4, the relay is shown in non-operated position. During the fifth interval the slanting line indicates that the relay is in operation during this interval, that is, it begins to operate at the end of the fourth or beginning of the fifth interval and completes its operation at the end of the fifth or beginning of the sixth interval. During the sixth and seventh intervals this relay remains operated and within the space provided for showing the relay in operated condition is a letter which will designate the particular relay of a class which is operated. It has been pointed out hereinbefore that there are certain group relays such as GTB, GHB, GLB and GXB and correspondingly designated relays for the C group. Hence in the legend it will be the H relay of one of these two groups which is operated.

These charts also are in the nature of timing charts and show that it takes a complete interval for a relay to operate whereas the tubes, such as the OP, the LB and the LC tubes, operate practically instantaneously. No attempt has been made to show the true value of these intervals but only to bring out the fact that the relay takes an appreciable time to operate in comparison with the tube.

Figure 19:
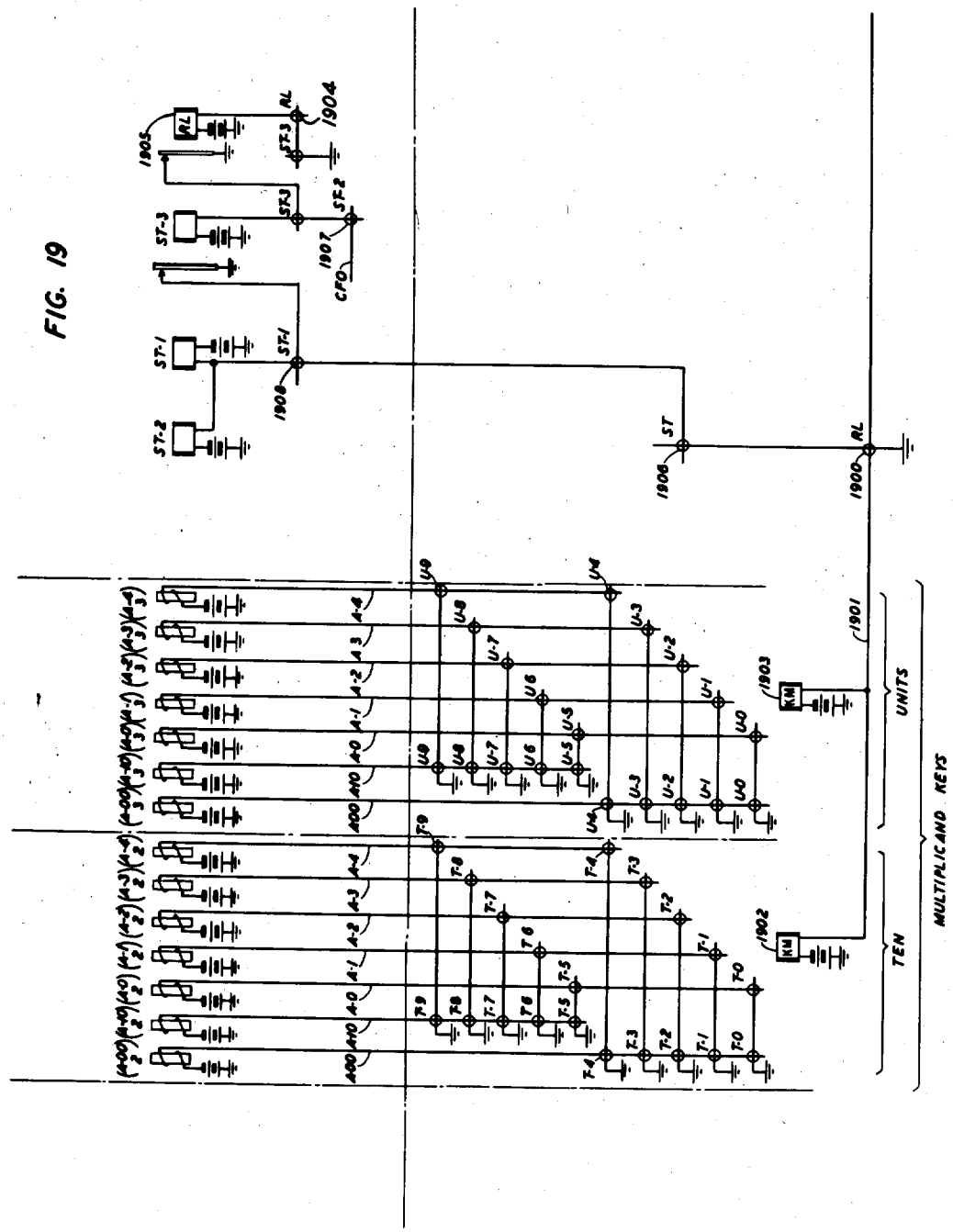
Fig. 19 shows the product display means, the multiplicand keys and the addend relays for the second and third decimal denominational orders.
Figure 20:
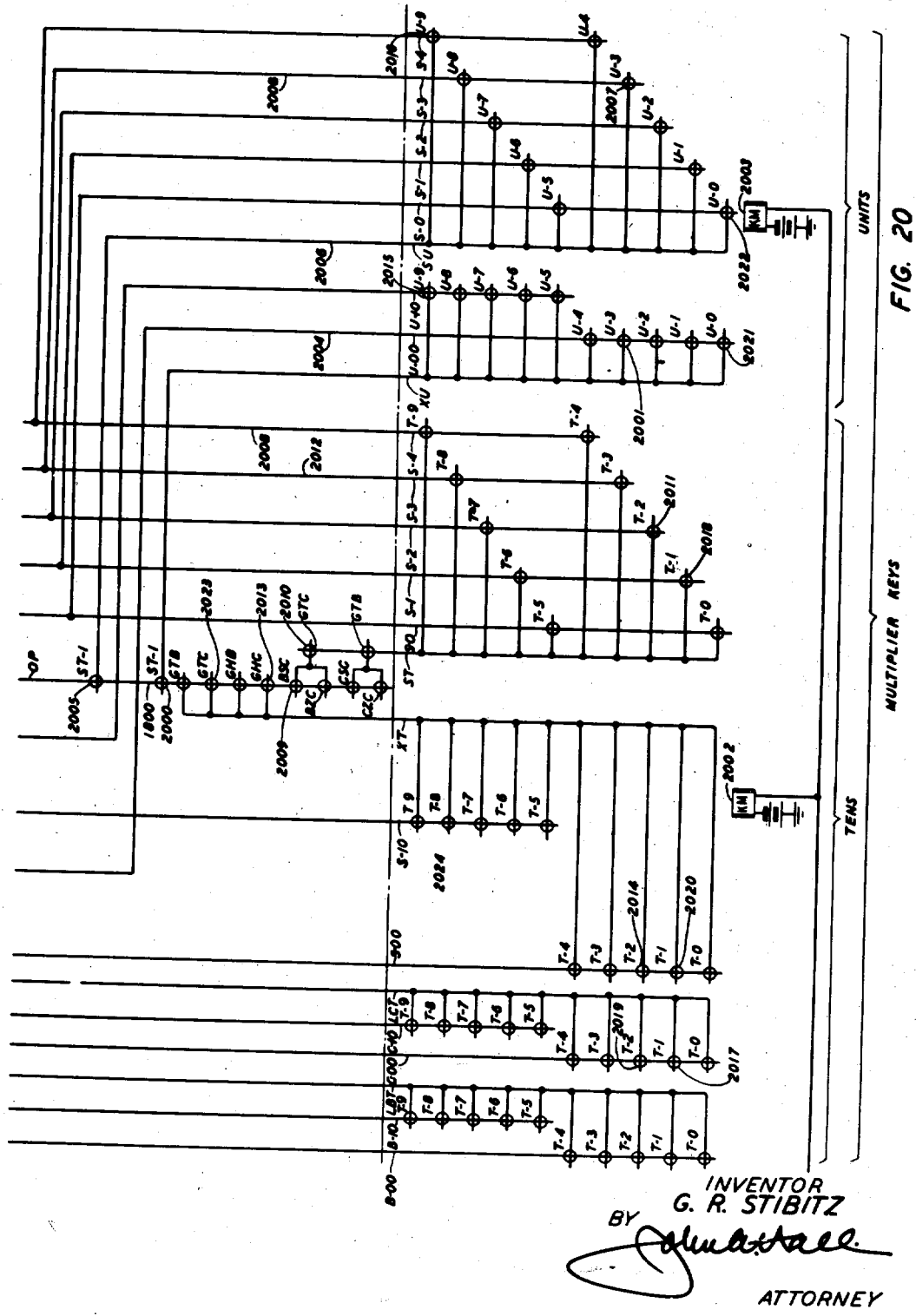
Fig. 20 shows the counting relays and the multiplier keys.

Looking now at Figs. 19 and 20, the key-sets are shown in schematic form. In Fig. 19 the tens and units multiplicand keys T—0 to T—9 and U—0 to U—9 are shown. Each of these keys will close two contacts. In Fig. 20 the tens and units multiplier keys are shown T—0 to T—9 and U—0 to U—9. Each of the tens keys closes four contacts and each of the units keys closes two contacts. In accordance with our assumption the T—3 and the U—7 multiplicand keys will be operated whereby the addend relays shown in Fig. 19 just above these keys will be operated as follows: A00—2, A3—2, A10—3 and A2—3. These four relays will remain operated until the operator releases the device by the depression of a release key indicated in Fig. 19 by the point 1900. This key which remains operated only during the time the operator manually depresses it therefore connects ground to the lead 1901 extending to the key release magnets 1902, 1903, 2002 and 2003. Another contact of this release key is shown near the upper right-hand portion of Fig. 19 and designated 1904. This contact will extend to ground which is at the time closed through by the relay ST—3 to the point 1904 so that the release relay 1905 will operate with the results which will be hereinafter described.

When the multiplicand and multiplier keys have been completely operated the calculation is started by the depression of the start key indicated in Fig. 19 by the point 1906 which connects ground to the windings of ST—1 and ST—2. These relays are shown as two separate relays connected in parallel and therefore operating simultaneously merely because the two together have to operate a large number of contacts and for commercial reasons it has been found expedient to use two standard relays for this purpose. Looking now at the sequence chart it will be noted that the key operates during the first interval and that as a result of its operation the start relay operates during the second interval. It will be assumed that the depression of the start key is only momentary and only lasts for the second interval, though in actual practice it probably would be impossible for any operator to depress the key and release it again in such a very short time interval. It may be noted, therefore, that if the key is not released the operations through interval 5 will take place but then will be held in the condition reached at that time until the start key is fully released whereupon the start relays may be released as indicated in the sequence chart. As a direct result of the operation of the start relays and as described hereinbefore in connection with Fig. 9 the OP and LB tubes will be fired at the end of the second interval. The OP lead 1800 will be found to extend into each one of the figures blocked out in Fig. 11 with the exception of Figs. 17 and 19 and since the relay ST—2 is now operated this will result in the operation of the C00 and the C0 relays in each of the five decimal denominational orders through relay contacts designated 1200 and 1201 in Fig. 12, 1300 and 1301 in Fig. 13, 1400 and 1401 in Fig. 14, 1500 and 1501 in Fig. 15 and 1600 and 1601 in Fig. 16. These C relays will be set to represent 0 and will be operated at the present time only through upper or operating windings. As seen from the sequence chart the counting relays BC00 and BPC are now operated and the circuit for this may be traced from the conductor 1800 through the contact point 1801 controlled by relay ST—1 to the operating winding of relay BC00 and the winding of relay BPC in parallel. Counting relays CC00 and CPC are also operated from the OP lead 1800 through the contact point 2000 controlled by relay ST—1, the units multiplifier key U—2 represented by point 2001, conductor 2004 and thence through the operating winding of counting relay CC00 and the companion sign relay CPC in parallel. Looking further down the sequence chart it will be noted that the relay GTC now becomes operated. The circuit for this relay may be traced from the OP lead 1800 through the contact point 1802 controlled by relay ST—1 to the operating winding of the relay GTC. It will be noted that among the relays described relay BC00 locks through one of its own contacts to the LB conductor 1803 and the CC00 and the GTC relays close connections to their locking windings through their own contacts to the LC conductor 1804. Since the LB conductor is grounded at this time the BC00 relay immediately locks but the CC00 and the GTC relays are held only through their operating windings. In the same manner each of the C computing relays C00 and C0 in each of the five decimal denominational orders closes a connection through its locking winding and one of its own contacts to the LC conductor 1804.

Thus during the third period the relays BC00, CC00, CPC, GTC and the C computing relays of the five decimal denominational orders operate. This is followed during the fourth interval by the operation of the CC counting relay 3 corresponding to the operative units key U—3. The circuit for this may be traced from the OP lead 1800 through the contact 2005 controlled by relay ST—1, conductor 2006, the contact point 2007 operated by the units key U—3, conductor 2008, the contact 1805 controlled by the operated relay BC00, the contact point 1806 closed by the operated CPC relay through the operating winding of the CC3 relay to positive battery. At the end of this fourth period with the CC counting relays properly operated a chain circuit will be closed as described in connection with Fig. 9 to operate the relay ST—3. This is indicated in Fig. 19 where the short conductor CFO indicates the chain circuit which will upon closure extend a ground through the contact point 1907 controlled by relay ST—2 to operate the relay ST—3. Since the relays ST—1 and ST—2 are held in operated condition from ground through a back contact of ST—3 and a contact 1908 controlled by relay ST—1 the operation of relay ST—3 will release relays ST—1 and ST—2 during the sixth interval.

Now in accordance with the description of Fig. 9 it will be remembered that, upon the complete release of relays ST—1 and ST—2, the circuit which upon being established to cause the operation of relay ST—3 will now fire the tube LC and further in accordance with this previous description it will be remembered that immediately upon the firing of the LC tube that the two other tubes OP and LB were extinguished. The LC tube now locks the relays CC00, CC3, GTC and the C sum relays into operated position but allows the relay CPC to release. The extinguishment of the tube LB releases the B counting relay BC00 so that during the seventh interval relays BC00 and CPC release. It will be noted also that the BR and BP relays become operated during this interval. The circuit for the BP relays may be traced from the LC conductor 1804 through the contact point 1807 controlled by the counting relay CC3, conductor 1808 leading in parallel to the winding of each of the BP relays in each of the five decimal denominational orders. The circuit for the BR relays may be traced also from the LC conductor 1804 through the contact point 1809 controlled by the CC3 relay to conductor 1810 leading in parallel to each of the BR relays in each of the decimal denominational orders. Thus at the end of the seventh interval the tube LC will be in full operation, the BC counting and sign relays will have become released, the CC counting relays will be in full operation, the CPC sign relay will have become fully released and the BR and BP relays will be operated in preparation for the first summing operation.

It may also be noted that the LC conductor 1804 directly operates the BA relays and likewise the LB conductor 1803 directly operates the CA relays. Therefore during the seventh interval the BA relay is operated and the CA relay is released.

At the ending of the seventh interval and the beginning of the eighth interval the firing circuit for the OP tube will be closed in accordance with the description of Fig. 9 so that the tube OP now fires as soon as the B switching relays have been properly operated so that the B computing relays may be operated to perform the first summing operation. It will be noted now that the BC counting relays BC00 and BC2 will be operated. The circuit for BC00 may be traced as follows. Upon the firing of tube LC a circuit is completed through the CC3 relay point 1809 to conductor 1810 for the operation of the BR relays as hereinbefore described. The BRC relay is connected to conductor 1810 and it therefore operates. Now a connection will be established from the OP conductor 1800 through point 1811 controlled by the BRC relay, the point 1812 controlled by the CC00 relay to the operating winding of BC00 and in parallel therewith, the winding of the relay BPC. Thus during the eighth interval the relays BC00 and BPC will operate. At the same time a circuit may be traced from the OP conductor 1800 through point 1813 controlled by the relay BRC, point 1814 controlled by the CC3 relay to the operating winding of the BC2 counting relay so that BC2 now responds. Also a circuit may be traced from the OP conductor 1800 through point 1815 controlled by the GTC relay, point 1816 controlled by the BRC relay to the operating winding of the GTB relay. This relay operates a point 1817 thus connecting its holding winding to the LB conductor 1803 so that when the tube OP is extinguished the GTB relay will remain operated through this locking circuit. With these various relays operated the first summing operation is now started so that the B computing relays operate during the eighth interval.

In the fifth decimal denominational order a circuit may be first traced from the OP conductor 1800 through the point 1602 controlled by relay BP—5 through the point 1603 controlled by relay BA—5, point 1604 controlled by relay C0—5, point 1605 controlled by relay BR—5, point 1606 controlled by relay BP—5 to the operating winding of relay B0—5. This relay closes point 1607 so as to lock the B0—5 relay to the LB conductor 1803 at the termination of this summing operation. A circuit may also be traced from the OP conductor 1800 through point 1608 controlled by relay BA—5, point 1609 controlled by relay C0—5, the G conductor, point 1610 controlled by relay BA—5, point 1611 controlled by relay C00—5, point 1612 controlled by relay BR—5, point 1613 controlled by relay BP—5 to the operating winding of relay B00—5. This relay operates and closes point 1614 so that the B00—5 relay will lock to the LB conductor at the end of this summing operation. The ground on the OP conductor 1800 will also be extended through point 1615 controlled by relay BA—5, point 1616 controlled by relay C00—5 to the CCY—0 conductor, 1617 which constitutes the outgoing carry 0 conductor to the next decimal denominational order.

Ground on conductor 1617 will now be extended into the fourth decimal denominational order and through circuits which are exactly similar to those just described for the last or fifth decimal denominational order resulting in the operation of the relays B00—4 and B0—4 and placing of ground on the outgoing carry 0 conductor 1517.

Ground coming in on conductor 1517 to the third decimal denominational order will follow a somewhat different path so that this will be described in detail. The ground is now extended through point 1403 controlled by relay BA—3, point 1404 controlled by relay C0—3, point 1405 controlled by relay A2—3, point 1406 controlled by relay BR—3 to the winding of relay B2—3. Relay B2—3 closes a contact point 1407 so that the relay B2—3 will lock to the LB conductor at the end of this operation. A ground will also be extended from the OP conductor through point 1408 controlled by relay BA—3, point 1409 controlled by relay C0—3, point 1410 controlled by relay A2—3, conductor G through point 1411 controlled by relay BA—3, point 1412 controlled by relay C00—3, point 1413 controlled by relay A10—3, point 1414 controlled by relay BR—3, point 1415 controlled by relay BP—3 to the winding of relay B10—3. Relay B10—3 closes point 1416 so that this relay will become locked to the LB conductor at the end of this operation. The ground extended to the G conductor will now be extended through point 1417 controlled by relay BA—3, point 1418 controlled by relay C00—3, point 1419 controlled by relay A10—3 to the CCY—0 conductor 1420 constituting the outgoing carry 0 conductor leading to the second decimal denominational order.

In this second decimal denominational order the ground on conduct 1420 will now be extended from point 1302 controlled by relay BA—2, point 1303 controlled by point C0—2, point 1304 controlled by relay A3—2, point 1305 controlled by relay BR—2, point 1306 controlled by relay BP—2, the operating winding of relay B3—2 so that this relay now becomes operated and by closing the point 1306 establishes a locking circuit to the LB conductor 1803.

A ground may be traced from the OP conductor 1800 through point 1308 controlled by relay BA—2, point 1309 controlled by relay C0—2, point 1310 controlled by relay A3—2 to conductor G and thence through point 1311 controlled by relay BA—2, point 1312 controlled by relay C00—2, point 1313 controlled by relay A00—2, point 1314 controlled by relay BR—2, point 1315 controlled by relay BP—2 to the operating winding of relay B00—2. This relay operates and by closing point 1316 establishes a locking circuit for itself to the LB conductor. A circuit may also be traced from the ground on the OP conductor 1800 through point 1317 controlled by relay BA—2, point 1318 controlled by relay A00—2, point 1319 controlled by relay C00—2 to the CCY—0 outgoing carry 0 conductor 1320.

Figures 11, 12:
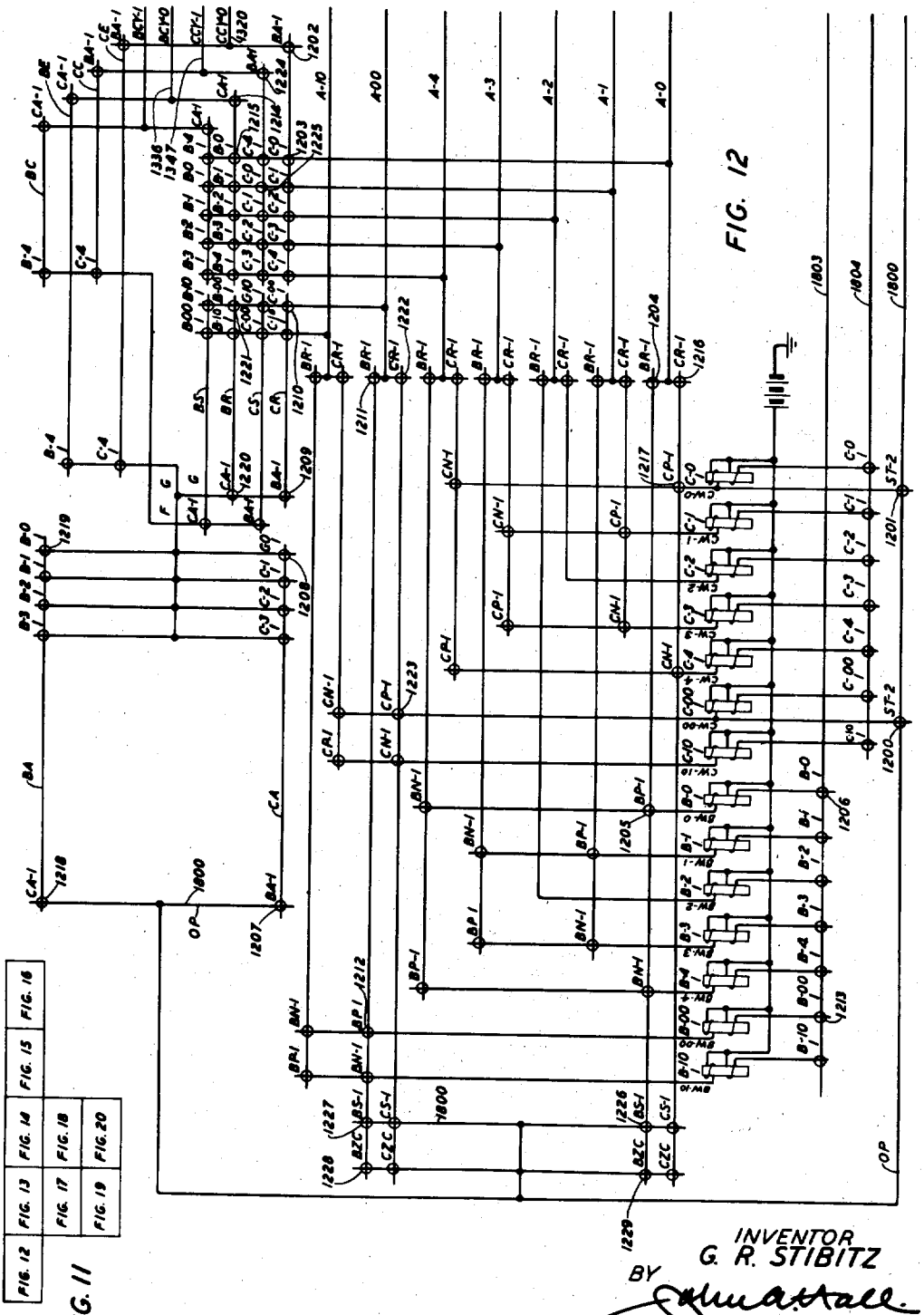

The ground on conductor 1320 in the first decimal denominational order shown on Fig. 12 will now be extended through point 1202 controlled by relay BA—1, point 1203 controlled by relay C0—1, point 1204 controlled by relay BR—1, point 1205 controlled by relay BP—1 to the B0—1 relay which now operates and closes the point 1206 to provide a locking circuit for itself to the LB conductor.

A circuit may also be traced from the OP conductor 1800 through point 1207 controlled by relay BA—1, point 1208 controlled by point C0—1, conductor G through point 1209 controlled by relay BA—1, point 1210 controlled by relay C00—1, point 1211 controlled by relay BR—1, point 1212 controlled by relay BP—1 to the operating winding of relay B00—1. This relay operates and by closing the point 1213 establishes a locking circuit for itself to the LB conductor 1803.

In this manner the B computing relays are operated to represent the value 03700 and this operation will take place during the eighth interval and be complete at the beginning of the ninth interval. Referring now to Fig. 9 it will be remembered that upon the proper operation of the B computing relays that a chain circuit is completed through one and one only of the binary relays of each decimal denominational order and one and one only of the quinary relays of each decimal denominational order and likewise through the similar operation of the BC counting relays so that the LB tube now has its grid circuit completed and will fire. This will be immediately followed by the extinguishment of the OP and the LC tube. As a consequence then during the ninth interval the BPC relay, the CC3, the CC00, the GTC, the BR, the BP, the C computing relays and the BA relays will all release. It will be remembered that the BPC relay depended upon a ground from the OP conductor, that the CC0 and CC00 relays depended upon a ground on the LC conductor, that the GTC relay had been locked to the LC conductor, that the BR and BP relays had been locked through the contacts of the CC3 relay to the LC conductor, that the C computing relays had been locked to the LC conductor and that the BA relay was directly tied to this conductor. Therefore, when the tube LC is extinguished all these relays release.

Now that tube LB has come into operation it will be noted that the CA relays which are directly tied to this conductor will operate and that the CP and CR relays will now operate from this conductor through the contacts of the BC2 counting relay. Thus ground may be traced from the LB conductor 1803 through the point 1818 controlled by the BC2 relay to conductor 1819 leading to the operation of the CR relays in each decimal denominational order and the common relay CRC. Ground on conductor 1803 may also be traced through the point 1820 controlled by relay BC—2 to conductor 1821 leading to the individual CP relays. Thus during the ninth interval the relays CA, CR, CRC and CP become operated.

Now at the end of the ninth interval when the C switching relays and the B computing relays are fully operated the check circuit for the OP tube will be closed and this tube will fire so that during the tenth interval the CC1 relay, the CC00 relay, the CPC relay, the GTC relay and the C computing relays will operate. The circuit for the CC1 relay may be traced from the OP conductor 1800 through point 1822 controlled by the CRC relay thence through point 1823 controlled by the BC2 relay to the operating winding of the CC1 counting relay. This relay closes a point 1824 to the LC lead so that at the end of this interval when the LC tube fires the CC1 relay will be locked in operated position.

Another circuit may be traced from the OP conductor 1800 through point 1825 controlled by the CRC relay, point 1826 controlled by the BC00 relay to the operating winding of the counting relay CC00 and its companion relay CPC so that these two relays will now become operated. The CC00 relay closes a circuit from point 1827 to the LC lead so that at the end of this operation the CC00 relay will become locked but the CPC relay will be allowed to release. The GTC relay is now operated from the OP lead 1800 through the point 1828 controlled by the GTB relay and the point 1829 controlled by the CRC relay and this relay in turn closes a contact point 1830 so that it may lock to the LC conductor. The C switching relays now being in operated condition the second summing operation will take place. The first circuit to be noted is from the ground on the OP conductor 1800 which is now extended through the contact point 1618 controlled by relay CP—5, contact point 1619 controlled by relay CA—5, contact point 1620 controlled by relay B0—5, contact point 1621 controlled by relay CR—5, contact point 1622 controlled by relay CP—5 to the C0—5 relay. Relay C0—5 prepares to lock to the LC conductor 1804 in the usual manner.

A circuit may also be traced from the OP conductor 1800 through the contact point 1623 controlled by relay CA—5, the contact point 1624 controlled by relay B0—5, conductor G, contact point 1625 controlled by relay CA—5, contact point 1626 controlled by relay B00—5, contact point 1627 controlled by relay CR—5, contact point 1628 controlled by relay CP—5 to the winding of relay C00—5 and this relay in the usual manner prepares to lock to the LC conductor.

Ground on the OP lead 1800 is also extended through contact point 1629 controlled by relay CA—5, contact point 1630 controlled by relay B00—5 to the BCY—0 conductor 1631 leading to the fourth decimal denominational order. Ground on this lead will cause operations within the fourth decimal order which will be an exact copy of the pattern just described. In turn therefore a ground will be extended for the BCY—0 conductor 1531 leading to the third decimal denominational order. In this circuit shown on Fig. 14 the ground will be extended from conductor 1531 through contact point 1421 controlled by relay CA—3, contact point 1422 controlled by relay B2—3, contact point 1423 controlled by relay A2—3, contact point 1424 controlled by relay CR—3, contact point 1425 controlled by relay CP—3 to the winding of relay C4—3 which will thereupon prepare to lock to the LC conductor.

The ground on the incoming carry lead 1531 will now be extended through contact point 1426 controlled by relay CA—3, contact point 1427 controlled by relay B2—3, contact point 1428 controlled by relay A2—3, conductor G, contact point 1429 controlled by relay CA—3, contact point 1430 controlled by relay B10—3, contact point 1431 controlled by relay A10—3, contact point 1432 controlled by relay CR—3, contact point 1433 controlled by relay CP—3 to the winding of relay C00—3 and this relay as usual will prepare to lock to the LC conductor.

An outgoing carry may be traced from the OP conductor 1800 through the contact point 1434 controlled by relay CA—3, contact point 1435 controlled by relay A10—3, contact point 1436 controlled by relay B10—3 to the BCY—1 outgoing carry lead 1437 leading to the second decimal denominational order. In the second decimal denominational order shown in Fig. 13 ground will be extended from conductor 1437 through contact point 1321 controlled by relay CA—2, contact point 1322 controlled by relay B3—2, contact point 1323 controlled by relay A3—2, contact point 1324 controlled by relay CR—2 to the operating winding of relay C2—2 which now prepares in the usual manner to lock to the LC conductor.

Ground will be extended from the OP conductor 1800 through the contact point 1325 controlled by relay CA—2, contact point 1326 controlled by relay B3—2, contact point 1327 controlled by relay A3—2, conductor F through contact point 1328 controlled by relay CA—2, contact point 1329 controlled by relay B00—2, contact point 1330 controlled by relay A00—2, contact point 1331 controlled by relay CR—2, contact point 1332 controlled by relay CP—2 to the winding of relay C10—2 which now prepares to lock to the LC conductor 1804.

A carry may be traced from the OP conductor 1800 through the contact point 1333 controlled by relay CA—2, contact point 1334 controlled by relay A00—2, contact point 1335 controlled by relay B00—2 to the outgoing BCY—0 conductor 1336 leading to the first decimal denominational order.

In this first order the ground on conductor 1336 may be traced through contact point 1214 controlled by relay CA—1, contact point 1215 controlled by relay B0—1, contact point 1216 controlled by relay CR—1, contact point 1217 controlled by relay CP—1 to the winding of relay C0—1 which now prepares in the usual manner to lock to the LC conductor 1804. A ground may be traced from the OP conductor 1800 through the contact point 1218 controlled by relay CA—1, contact point 1219 controlled by relay B0—1, conductor G, contact point 1220 controlled by relay CA—1, contact point 1221 controlled by relay B00—1, contact point 1222 controlled by relay CR—1, contact point 1223 controlled by relay CP—1 to the winding of relay C00—1 which now operates a contact to lock to the LC conductor 1804.

Thus during the tenth interval the C computing relays to represent the value 07400 are operated. Due to this operation a check circuit as described in connection with Fig. 9 will be closed to cause the firing of the LC tube so that at the end of the tenth interval not only will the relays described have reached full operation but the LC tube will fire and become operative and as a consequence thereof will cause the extinguishment of the LB tube and the OP tube. During the eleventh interval the following relays are released: BC2, BC00, GTB, CPC, the B computing relays, CP, CR and CA relays. Also during this interval the BS, the BP and the BA relays become operative. Those relays which are released at this time, all but CPC, have depended upon the operation of the LB tube. The CPC relay releases during this interval due to the extinguishing of the tube OP. Of these relays which now operate, the circuit for relay BS may be traced from the LC conductor 1804 through contact point 1831 controlled by the counting relay CC1, conductor 1832 to the BS relays of the five decimal denominational orders. Relay BSC is operated in this same circuit since it is tied to conductor 1832. The relays BP are operated over a circuit which may be traced from the LC conductor 1804 through contact point 1833 controlled by counting relay CC1, contact point 1834, controlled by the GTC relay, contact point 2019 of the tens multiplier digit key T—2, contact point 1836 controlled by relay CC00 to conductor 1808 leading in parallel to the BP relays of the five decimal denominational orders. The BA relays being tied directly to the LC conductor 1804 also operate during this eleventh interval. At the end of this interval all of the B computing relays having returned to normal a check circuit will be closed through a chain of back contacts as explained with reference to Fig. 9 so that the firing circuit of the OP tube is completed and this tube fires.

During the twelfth interval the following relays will become operated: BC00, BPC and the B computing relays. The circuit for relay BC00 and BPC may be traced from the OP conductor 1800 through contact point 1811 controlled by the BRC relay, contact point 1812 controlled by the CC00 relay to the operating winding of relay BC00 and in parallel therewith the winding of relay BPC.

The circuits for the B computing relays are as follows: In the fifth decimal denominational order the only circuit there to be traced will be the carry-out lead since there is no sixth decimal denominational order into which the sum now to be produced may be shifted. Therefore a circuit may be traced from the OP lead 1800 through contact point 1615 controlled by relay BA—5, contact point 1616 controlled by relay C00—5 to the CCY—0 outgoing carry 0 conductor 1617. The ground on conductor 1617 may now be traced through contact point 1502 controlled by relay BA—4, contact point 1503 controlled by relay C0—4, contact point 1632 controlled by relay BS—5, contact point 1606 controlled by relay BP—5 to the winding of relay B0—5 which now operates its own contact point 1607 in the usual manner to lock to the LB conductor 1803. The circuit may also be traced from the OP conductor 1800 through the contact point 1504 controlled by relay BA—4, contact point 1505 controlled by relay C0—4, conductor G, contact point 1506 controlled by relay BA—4, contact point 1507 controlled by relay C00—4, contact point 1633 controlled by relay BS—5, contact point 1613 controlled by relay BP—5 to the winding of relay B00—5 which now operates and closes contact point 1614 in order to lock to the LB conductor 1803. A circuit may also be traced from the OP conductor 1800 through the contact point 1508 controlled by relay BA—4, contact point 1509 controlled by relay C00—4 to the CCY—0 outgoing carry 0 conductor 1517.

In the third decimal denominational order where the C relays C00 and C4 are operated, the ground on conductor 1517 will be extended through contact point 1402 controlled by relay BA—3, contact point 1438 controlled by relay C4—3, contact point 1439 controlled by relay A2—3, contact point 1510 controlled by relay BS—4, contact point 1511 controlled by relay BP—4 to the operating winding of relay B1—4 which in the usual manner closes a contact of its own to lock to the LB conductor 1803. A circuit may also be traced from the OP conductor 1800 through contact point 1408 controlled by relay BA—3, contact point 1440 controlled by relay C4—3, contact point 1441 controlled by relay A2—3, conductor F, contact point 1442 controlled by relay BA—3, contact point 1443 controlled by relay C00—3, contact point 1431 controlled by relay A10—3, contact point 1512 controlled by relay BS—4, contact point 1513 controlled by relay BP—4 to the operating winding of B00—4 which relay becomes operated and prepares in the usual manner to lock to the LB lead 1803. Thus the B computing relays of the fourth decimal order have now been set to represent the value 1.

A circuit may also be traced from the ground on conductor F through the contact point 1444 controlled by relay BA—3, the contact point 1445 controlled by relay C00—3, the contact point 1446 controlled by relay A10—3 to the CCY—1 outgoing carry 1 conductor 1447.

In the third decimal denominational order ground on conductor 1447 is extended through contact point 1337 controlled by relay BA—2, contact point 1338 controlled by relay C2—2, contact point 1339 controlled by relay A3—2, contact point 1448 controlled by relay BS—3, contact point 1449 controlled by relay BP—3 to the winding of relay B1—3 which now prepares in the usual manner to lock to the LB conductor 1803. A ground may also be traced from the OP conductor 1800 through the contact point 1308 controlled by relay BA—2, contact point 1340 controlled by relay C2—2, contact point 1341 controlled by relay A3—2 to conductor F and thence through contact point 1342 controlled by relay BA—2, contact point 1343 controlled by relay C10—2, contact point 1313 controlled by relay A00—2, contact point 1450 controlled by relay BS—3, contact point 1451 controlled by relay BP—3 to the winding of relay B00—3 which now prepares in the usual manner to lock to the LB conductor 1803. A circuit may also be traced from the ground on conductor F through the contact point 1344 controlled by relay BA—2, contact point 1345 controlled by relay C10—2, contact point 1346 controlled by relay A00—2 to the CCY—1 outgoing carry 1 conductor 1347.

Thus the B relays in the third decimal denominational order have been set to represent the value 1 and a 1 has been carried from the second to the first decimal denominational order. In this first order the ground on conductor 1347 may be traced through contact point 1224 controlled by relay BA—1, contact point 1225 controlled by relay C0—1, contact point 1348 controlled by relay BS—2, contact point 1349 controlled by relay BP—2 to the winding of relay B1—2 which now prepares in the usual manner to lock to the LB conductor.

Ground may also be traced from the OP conductor 1800 through contact point 1207 controlled by a relay BA—1, contact point 1208 controlled by relay C0—1, conductor G, contact point 1209 controlled by relay BA—1, contact 1210 controlled by relay C00—1, contact point 1350 controlled by relay BS—2, contact point 1315 controlled by relay BP—2 to the winding of B00—2 which operates and prepares to lock to the LB conductor. Thus the B computing relays of the second decimal denominational order have been set to represent the value 1.

In the first decimal denominational order a ground may be traced from the OP conductor 1800 through the contact point 1226 controlled by relay BS—1, the contact point 1205 controlled by relay BP—1 to the winding of relay B0—1 which now operates and prepares to lock to the LB conductor. A similar circuit may be traced from the ground on the OP conductor 1800 through the contact point 1227 controlled by relay BS—1, contact point 1212 controlled by relay BP—1 to the winding of relay B00—1 which now prepares to lock in the usual manner to the LB conductor. Thus the B computing relays and the first decimal denominational order have been set to represent the value 0. This ends the operations within the twelfth interval.

During the thirteenth interval relays GHB and BC2 become operated. The circuit for relay GHB may be traced from the OP conductor 1800 through contact point 1815 controlled by relay GTC, contact point 1837 controlled by relay BSC, contact point 1838 controlled by relay BPC to the operating winding of relay GHB which now prepares to lock to the LB conductor. The BC2 counting relay is operated from ground on the OP conductor 1800 through the contact point 2009 controlled by relay BSC, contact point 2010 controlled by relay GTC, contact point 2011 controlled by the tens multiplier key T—2, conductor 2012, contact point 1839 controlled by relay CC00, contact point 1840 controlled by relay BPC to the winding of the counting relay BC2 which now operates and prepares to lock to the LB conductor. When the two relays GHB and BC2 have operated at the end of the thirteenth interval then the check circuit leading to the grid of LB tube as described generally in connection with Fig. 9 will be closed and the LB tube will fire thereupon causing the extinguishment of the OP tube and the LC tube thus bringing the thirteenth interval completely to an end. As a result of the removal of ground from the LC conductor by the release of tube LC, the BPC relay, the C counting relays CC1 and CC00, the GTC relay, the BS relays, the BP relays, the C computing relays and the BA relay will release. At the same time during this fourteenth interval the CA relays will become operated since the LB conductor is now grounded. Thus at the end of this interval, when the relays above have been released so that the chain circuit proving that the C computing relays are now in condition to be used for the next summing operation is closed, the OP tube will become fired. During the fifteenth interval the following relays will become operated: CC1, CC00, CPC, GHC and the C computing relays. The circuit for relays CC00 may be traced from the ground on OP conductor 1800 through the contact point 1825 controlled by relay CRC, the contact point 1826 controlled by relay BC00 and thence in parallel through the operating winding of relay CC00 and the winding of relay CPC. Relay CC00 prepares to lock to the LC conductor whereas the relay CPC will release as soon as this circuit from the OP lead is opened. The relay CC1 is operated in a circuit from the OP conductor 1800 through the point 1822 controlled by relay CRC, the point 1823 controlled by relay BC2 to the winding of relay CC1 which thereupon prepares to lock to the conductor LC. The relay GHC is operated in a circuit from ground on the OP conductor 1800 through the contact point 1841 controlled by the relay GHB, the contact point 1842 controlled by the relay CRC to the operating winding of the relay GHC which now operates and prepares to lock to the LC conductor.

The C computing relays are now operated in a manner similar to that heretofore described to produce the sum of 01110 and 03700 which equals 04810. With the CR, CP and CA relays operated, the summing operation will be confined to the relays within each decimal denominational order and it is believed clear that the circuits established at this time will be understood without further description.

At the end of this fifteenth interval when the C computing relays have been operated a chain circuit through their front contacts and the front contacts of the companion counting relays will be closed to cause the firing of the LC tube so that at this time LC becomes operative and causes the tubes OP and LB to be extinguished.

During the sixteenth interval the following relays release: BC2, BC00, GHB, CPC, the B computing relays, the CP relays, the CR relays and the CA relays. The reason for the release of these relays will be apparent from the previous description. Also during this interval the following relays will become operated: the BS relays, the BP relays and the BA relays. The BS relays operate from the LC conductor through the contact point 1831 controlled by relay CC1, the BP relays operate from the LC conductor through contact point 1833 controlled by the relay CC1, the contact point 1843 controlled by relay GHC, the contact point 1836 controlled by relay CC00 to conductor 1808. The BA relays, of course, being tied directly to the LB conductor operate during the period immediately following the firing of the LB tube, that is, this sixteenth interval.

As soon as the B counting and B computing relays have become released a chain circuit is established for the firing of the OP tube so that during the seventeenth interval the following relays become operated: the GLB and the B computing relays. The circuit for the GLB relay may be traced from ground on the OP conductor 1800 through the contact point 2013 controlled by relay GHC, contact point 2014 controlled by the tens multiplier key T—2, contact point 1844 controlled by relay BSC which operates in parallel with the BS relays, contact point 1845 controlled by the GHC relay to the operating winding of relay GLB which now closes a contact point 1846 preparatory to locking to the LB conductor.

During this seventeenth interval the B computing relays are operated in a manner similar to that hereinbefore described to produce the sum of 04810 added to 03700 and shifted one place to the right since at this time the BS relays are operated in the manner hereinbefore described.

At the end of this seventeenth interval when the B computing relays have been operated in the proper manner the chain circuit leading to the grid and the LB tube will be closed whereupon the LB tube will be fired resulting in the immediate extinguishment of the OP and the LC tubes. Therefore during the eighteenth interval all the relays which depended upon the grid on the OP conductor 1800 and those relays which were locked to the LC conductor will be released. Thus the following relays are released: CC1, CC00, GHC, the BS relays, the BP relays, the C computing relays and the BA relay. The only relays to become operated in this eighteenth interval will be the CA relays which are tied directly to the LB conductor 1803.

condition becomes stable and will persist until reelased by the operator. This is done through the operation of the release key which will, as hereinbefore described, extend a ground through a circuit controlled by the relay ST—3 through the contact point 1904 controlled by the release key to the winding of the release relay 1905. The release relay opens a main ground connection to the tubes, not shown herein but described in detail in connection with Fig. 25, so that with the removal of this ground the tube LB, which is now in operation, becomes extinguished and therefore releases the CA relays which at this time perform no useful function and the GLB relay which controls the lighting of the signal lamps. The relay ST—3 is released since its continued energization depends upon a ground from a back contact of the RL relay and thus the circuit is restored to normal.

In the time sequence chart, intervals 19 and 20 are shown but this is only to indicate that after the end of the eighteenth interval which completes the calculating operation, the LB tube, the GLB relay and the B computing relays remain operated indefinitely.

2.—*Multiplication of 37 by 19—result 703*

In the solution of this problem the counting and computing relays operate as follows:

| Multiplier Digit | Counting | | Computing | |
|---|---|---|---|---|
| Units—9 1 (derived algebraically) | CC10 | CC1 | C relays set for<br>A relays set for | 00000<br>03700 |
| Tens—1 2 (derived algebraically) | BC00<br>CC00 | BC2<br>CC1 | B relays sum-shift and invert<br>A relays set for<br>C relays sum<br>A relays set for | 99630<br>03700<br>03330<br>03700 |
| | | | B relays sum and shift | 00703 |

At this time circuits will be closed for the indicator elements to indicate the completed product 00851 as follows: Lamp 0 in the first decimal denominational order is operated in a circuit from battery, contact point 1700 controlled by relay B00—1, lamp 0, contact point 1701 controlled by the relay B0—1, contact point 1702 controlled by relay GLB to ground. In the second decimal denominational order a similar circuit will be closed through the contact points 1703 and 1704 to cause the 0 lamp in this block to operate. In the third decimal denominational order a circuit will be closed from battery through the contact point 1705 controlled by relay B10—3, lamp No. 8, contact point 1706 controlled by relay B3—3, contact point 1702 controlled by relay GLB to ground. In the fourth decimal denominational order a circuit will be established from battery through contact point 1707 controlled by relay B10—4, lamp No. 5, contact point 1708 controlled by relay B0—4, contact point 1702 to ground. In the last or fifth decimal denominational order a circuit will be established from battery, contact point 1709 controlled by relay B00—5, lamp No. 1, contact point 1710 controlled by lamp B1—5 through the contact point 1702 to ground. Thus the lamps will indicate the derived product 00851. This In the sequence chart the second group illustrates the present problem. It will be noted that the operations through the first eight intervals are exactly the same as those hereinbefore described with the exception that the CC1 counting relay is operated instead of the CC3, the CC10 is operated instead of the CC00, the CNC relay is operated instead of the CPC, the BS and the BSC relays are operated instead of the BR and BRC relays and the BN relays are operated instead of the BP relays. It will be noted that in this case the multiplier keys operated are the T—1 and the U—9 keys. Therefore upon the operation of the ST—1 relay and the first operation of the OP tube a circuit is closed from the OP lead 1800 through the point 2000, the point 2015 controlled by the units key U—9 to the operating winding of the counting relay CC10 and in parallel therewith the winding of the sign relay CNC. Another circuit is also closed from the OP conductor 1800 through the contact point 2005 controlled by the relay ST—1 through the point 2016 controlled by the units multiplier key U—9, point 1847 controlled by relay BC00, point 1848 controlled by relay CNC to the winding of the counting relay CC1 which now operates its own controlled point 1824 in preparing to lock to the LC conductor. It is noted that the CNC relay is operated in parallel with the CC10 relay at this time. It is also noted that the BS and BSC relays are operated in place of the BR and the BRC relays. The reason for this is the same as when before described as a direct result of the operation of the CC1 counting relay. The BN relays are operated from the LC conductor 1804 through the contact point 1833 controlled by the CC1 counting relay, point 1834 controlled by the GTC relay, point 2017 controlled by the tens multiplier key T—1, point 1849 controlled by counting relay CC10 over conductor 1850 to the BN relays.

It may also be noted that the group relay GTB operated during the eighth interval in the first example does not operate at this time but that the group relay GHB will operate during the next interval. Relay GTB depends for its operation on GTC and BRC and the latter completes its operation at the end of the 7th interval whereas the relay GHB depends for its operation on GTC, BSP and BPC and the last of these does not complete its operation until the end of the 8th interval. Therefore the GHB operates one interval later than would the GTB relay. Therefore during the eighth interval the computing relays will operate in the manner hereinbefore described to set up on such B computing relays the value 99630 which is the complement of 03700 shifted one place to the right.

During the ninth interval the relays BC2 and GHB become operated. The circuit for the relay BC2 may be traced from the OP conductor 1800 through the point 2009 controlled by the relay BSC, point 2010 controlled by the relay GTC through point 2018 controlled by the tens multiplier key T—1, point 1835 controlled by relay CC10, point 1848 controlled by relay BPC to the winding of relay BC2 which now prepares in the usual manner to lock to the LB conductor. The circuit for relay GHB may be traced from the OP conductor 1800 through point 1815 controlled by relay GTC, point 1837 controlled by relay BSC, point 1838 controlled by relay BPC to the winding of relay GHB which now prepares to lock to the LB conductor. At the end of this ninth interval the B computing relays having been operated the other switching relays in the chain including the relay GHB will complete the circuit for the firing of the LB tube which thereupon fires and through this action causes the extinguishment of the LC and OP tubes.

During the tenth interval the following relays become released: the BPC, CC1, CC10, GTC, BSC and the BS relays, the BN relays, the C computing relays and the BA relays, all of which were locked to the LC conductor. During this interval the CP relays, the CR relays and the CA relays become operative.

The operation of the CA relays is apparent from the fact that these relays are directly tied to the LB conductor. The operation of the CP relays may be traced from the LB conductor through the point 1820 controlled by the BC2 counting relay and the operation of the CR and CRC relays may likewise be traced from the LB conductor through the point 1818 controlled by the BC tube. At the end of this tenth interval the check circuit for the OP tube will be closed and this tube will fire thereby placing ground on the OP conductor 1800 and causing the operation of the counting relays CC1, CC00, the CPC relay, the GHC relay and the C computing relays. The operation of the CC1 counting relay may be traced from the OP conductor 1800 through the point 1822 controlled by the CRC relay, the point 1823 controlled by the BC2 relay to the winding of CC1 so that this counting relay now operates and through the point 1824 which it controls will prepare to lock to the LC conductor. The circuit for the counting relay CC00 may be traced from the OP conductor 1800 through the point 1825 controlled by the CRC relay, point 1826 controlled by the BC00 relay to the operating winding of relay CC00 and in parallel therewith the winding of the CPC relay. The operation of the relay GHC may be traced from the OP conductor 1800 through the point 1841 controlled by relay GHB, point 1842 controlled by relay CRC to the winding of relay GHC which now prepares in the usual manner to lock to the LC conductor.

During this eleventh interval the C computing relays will operate to compute the sum of the value 99630 now registered on the A computing relays to form the sum 03330. At the end of this operation the check circuit through the front contacts of one and one only of each of the subgroups of computing relays will close the firing circuit for the LC tube which thereupon fires and causes the extinguishment of the OP and the LB tubes.

During the twelfth interval the BC2 and BC00 counting relays release, the GHB, the CPC, the B computing relays, the CP relays, the CR relays and the CA relays all depending upon the LB conductor return to normal. At the same time the following relays operate: the BSC, BS, the BP relays and the BA relays. The BA relays operate since they are tied directly to the LC conductor and the BSC relays operate through the point 1831 controlled by relay CC1 and the BP relays operate in a circuit from the LC conductor through the point 1833 controlled by relay CC1, point 1843 controlled by the relay GHC, point 1836 controlled by relay CC00 to conductor 1808 leading to the BP relays. At the end of this interval the B computing relays having returned entirely to normal a check circuit will be established for firing the OP tube which fires and during the following or thirteenth interval causes the operation of the group relay GLB and the B computing relays. The relay GLB is controlled over a circuit from the OP conductor 1800 through the point 2013 controlled by relay GHC, the point 2020 controlled by the tens multiplier key T—1, point 1844 controlled by the BSC relay, point 1845 controlled by the GHC relay to the winding of relay GLB which thereupon closes a contact 1846 to lock to the LB conductor. During this interval also the augend value 03330 now registered on the C computing relays is added to the addend value 03700 and shifted one place to the right to produce the sum value 00703 now registered on the B computing relays. This actually ends the computation although in the following interval certain elements such as the counting relays CC1 and CC00 and the group relay GHC, the shift relays BSC and BS, the sign relays BP and the control relays BA are released In the manner hereinbefore described the signal lamps shown in Fig. 17 will light to indicate the value 00703 and this product may be wiped out in the manner also hereinbefore described by the operation of the release key RL.

3.—Multiplication of 37 by 80—result 2960

In the solution of this problem the counting and computing relays operate as follows:

| Multiplier Digit | Counting | | Computing | |
|---|---|---|---|---|
| Units 0 | CC00 | CC0 | C relays set for | 00000 |
| | | | A relays set for | 03700 |
| Tens 8 | BC10 | BC2 | B relays zero shift | 00000 |
| 2 | | | A relays set for | 03700 |
| (derived algebraically) | CC10 | CC1 | C relays sum | 03700 |
| | | | A relays set for | 03700 |
| Hundreds | BC10 | | B relays sum-shift and invert | 99260 |
| 1 | | | A relays set for | 03700 |
| (derived algebraically) | | | C relays sum | 02960 |

In this instance the pattern of operation through the eighth interval is exactly the same as in the previous case. Due to the fact that the units multiplier key U—0 is operated in this case, however, the CC counting relays 0 and 00 will be operated and the CPC relay parallel with relay CC00 will also respond. In this case, however the BZ and BZC relays will be operated in the following manner: ground on the OP conductor 1800 will be extended through the point 2000 controlled by relay ST—1, point 2021 controlled by units key U—1, conductor 2004 to the operating winding of relay CC00 and in parallel therewith the winding of the relay CPC. Another circuit will be traced from the OP conductor 1800 through the point 2005, contact point 2022 controlled by the units multiplier key U—0, point 1852 controlled by relay BC00, point 1853 controlled by relay CPC to the operating winding of the counting relay CC0 which thereupon operates and locks to the LC conductor. Upon the operation of the CC0 relay a connection is established from the LC conductor through point 1854 to the windings in parallel of the two relays BZC and BZ. Thus during the eighth interval with the relay BZ operated the value on the C relays in each decimal denominational order will be transferred directly to the B relays of the next lower decimal denominational order. Thus in the last decimal denominational order shown in Fig. 16 a circuit may be traced from the OP conductor 1800 through the point 1634 controlled by the relay BZ, the point 1635 controlled by the relay C00—4 (of the next higher decimal denominational order), point 1613 controlled by relay BP—5 to the winding of relay B00—5 whereupon this relay prepares to lock to the LB conductor 1803. A similar circuit may be traced from the OP conductor 1800 through the check point 1636 controlled by relay BZ, point 1637 controlled by relay C0—4 through point 1606 controlled by relay BP—5 to the winding of relay B0—5 which also prepares to lock to the LB conductor.

Figure 13:
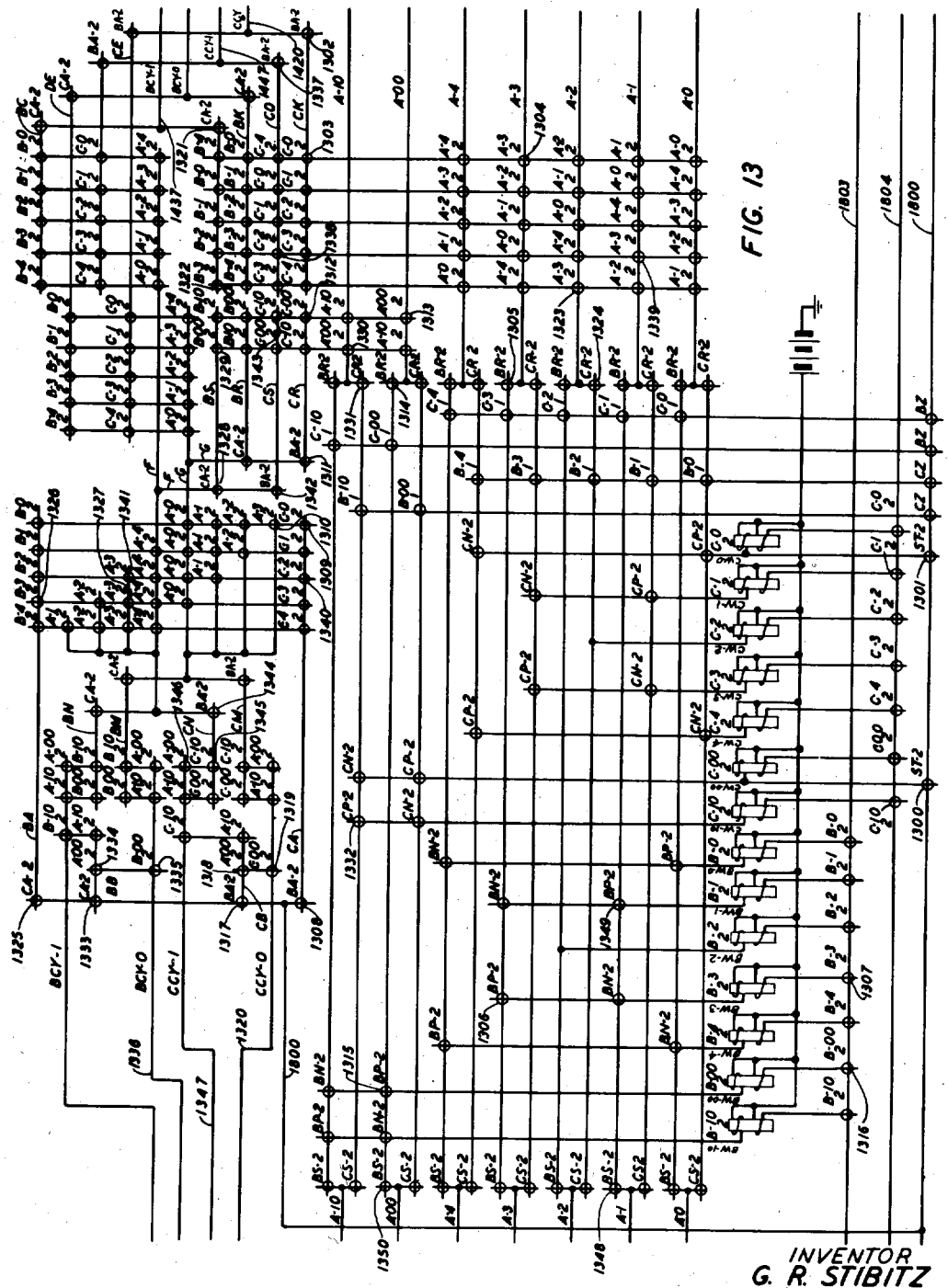
Fig. 13 shows the second order.
Figure 14:
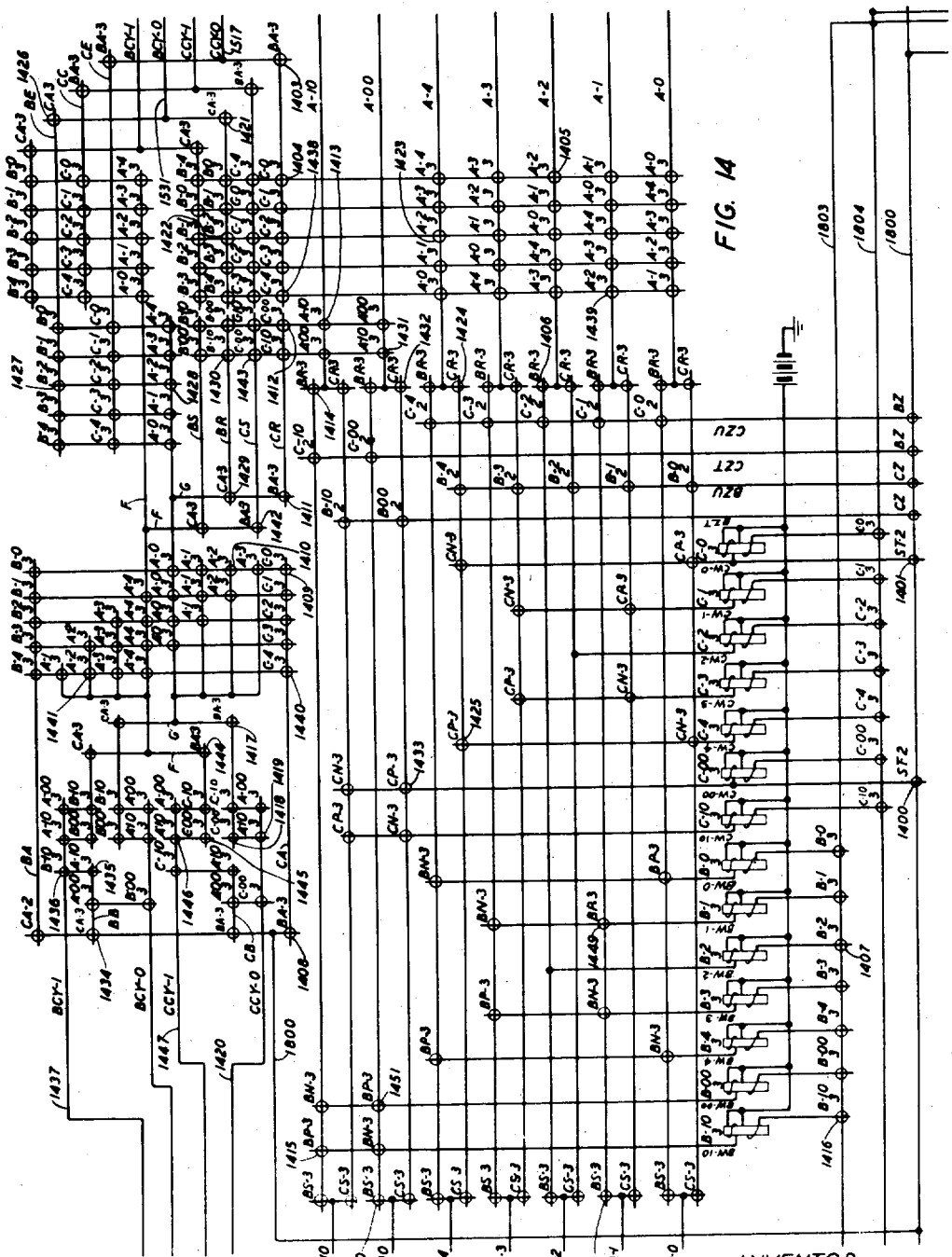
Fig. 14 shows the third order.
Figure 15:
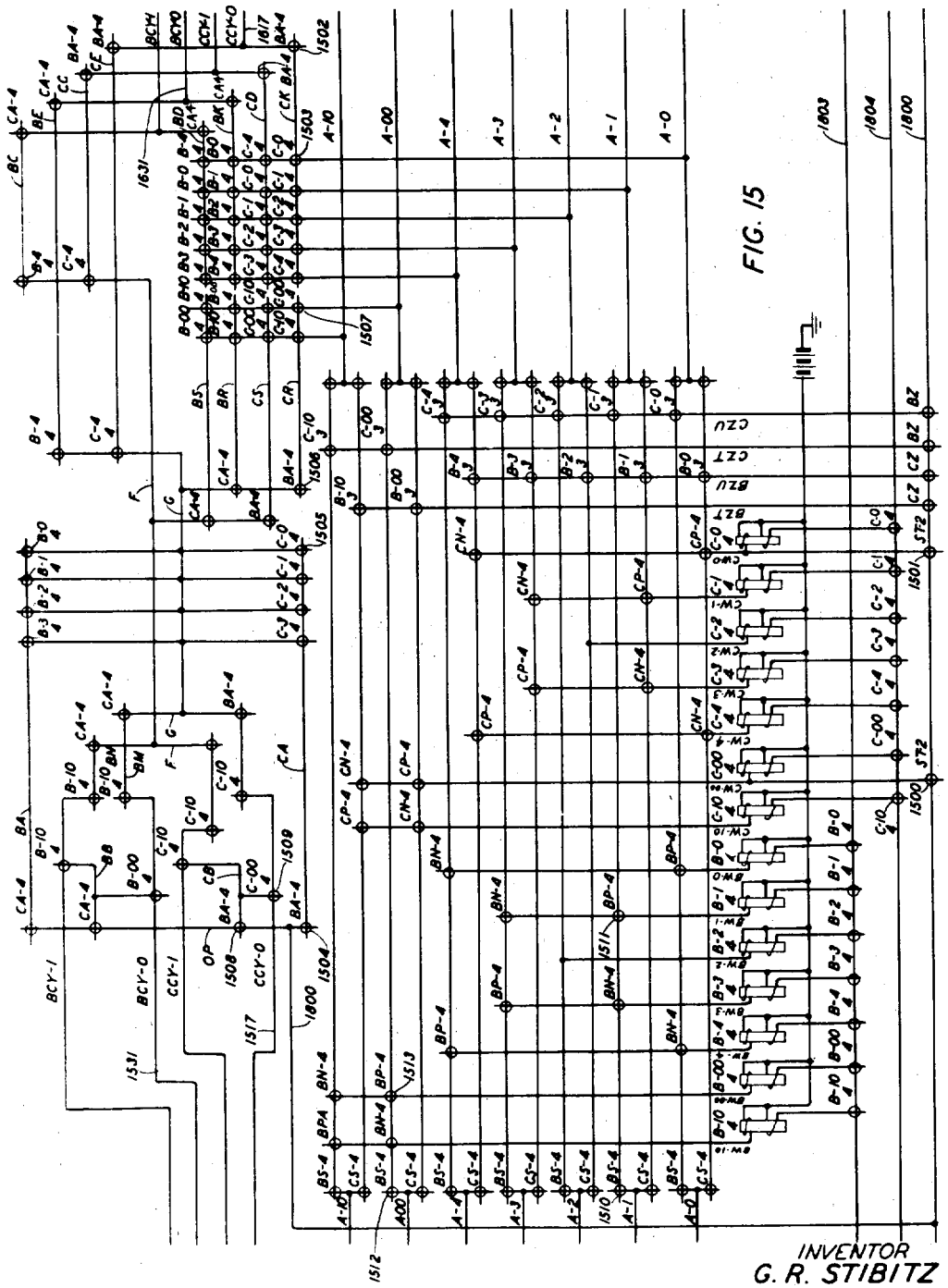
Fig. 15 shows the fourth order.

Similar operations will take place in the second, third and fourth decimal denominational orders shown in Figs. 13, 14 and 15, respectively. In the first decimal order due to the fact that there is no other order of a higher value a circuit will be traced from the OP conductor 1800 through the point 1228 controlled by relay BZC, point 1229 controlled by relay BZC, point 1205 controlled by relay BP—1 to the B0—1 relay thus setting the B relays of the first decimal denominational order to represent the value 0. Since in this instance the C relays in each of the decimal denominational orders represent 0 then the B relays will through this 0 shift operation also be set to equal 0.

During this eighth interval the relay BC10 will be operated instead of the relay BC00 as hereinbefore described. The operation of this relay may be traced as follows: ground on the OP conductor 1800 will be extended through the point 2023 controlled by relay GTC, point 2024 controlled by the tens multiplier digit key T—8, point 1855 controlled by relay BZC, the operating winding of relay BC10 and in parallel therewith the winding of the negative sign relay BNC. During the ninth interval the relay GHB is operated over a circuit from the OP conductor 1800 through the point 1815 controlled by relay GTC, point 1856 controlled by relay BZC, point 1857 controlled by relay BNC to the operating winding of the relay GHB which thereupon prepares to lock to the LB conductor.

The following operations are the same as those hereinbefore described. The only thing to be noted in this case is that the relay GXB is caused to operate during the fourteenth interval. A circuit for this relay may be traced from ground on the OP conductor 1800 through the point 2013 controlled by the relay GHC, the point 2024 controlled by the tens multiplier key T—8, the point 1858 controlled by the relay BSC, the point 1859 controlled by the relay GHC, the point 1860 controlled by the relay BNC to the windings of relay GXB which thereupon operates and prepares to lock to the LB conductor. With the relay GXB operated it will be noted that after the summing operation caused thereby to produce the sum 02960 a circuit may be traced from the OP conductor 1800 through the point 1861 controlled by relay GXB, point 1862 controlled by relay CRC to the winding of relay GLC which operates and prepares to lock to the LC conductor.

In this instance also the actual computation is complete at the end of the sixteenth interval but the seventeenth, eighteenth and nineteenth intervals are shown to indicate the establishment of a steady condition during which the signal lamps are lighted and which will persist until released in the manner hereinbefore described.

4.—*Multiplication of 37 by 88—result 3256*

In the solution of this problem the counting and computing relays operate as follows:

| Multiplier Digit | Counting | | Computing | |
|---|---|---|---|---|
| Units—8 2 (derived algebraically) | CC10 BC10 | CCZ BC1 | C relays set for A relays set for B relays sum A relays set for | 00000 03700 03700 03700 |
| Tens—8 1 (derived algebraically) | CC10 | CC1 | C relays sum and shift A relays set for | 00740 03700 |
| Hundreds 1 (derived algebraically) | BC10 | | B relays sum, shift and invert A relays set for C relays sum | 99556 03700 03256 |

In this instance there is nothing of peculiar interest to note or any operations of relays which have not been hereinbefore described. It may be noted that inversion does not take place during the first shifting operation but will take place upon the second shifting operation but the reason for this has been explained hereinbefore.

It may be well to point out the pattern of operation of the group relays. In the first example where the multiplier was 23 each digit of which was below 5, there were five summing operations and starting with the operation of the group relay GTC the relays operated in turn were GTB, GTC, GHB, GHC and GLB (the L group relay being the last of such group relays to be operated in every instance). In the second example where the multiplier was 19 this was transformed algebraically into one summing operation in the units place and two summing operations in the tens place making three operations altogether so that starting with the operation of the group relay GTC the others operated in turn were the GHB, the GHC and the GLB.

In the third example where the multiplier was 80 (to illustrate the operation of the zero shift) the multiplier was transformed algebraically into one summing operation in the units place, two summing operations in the tens place and one summing operation in the hundreds place making four summing operations in all so that starting with the energization of the group relay GTC the others operated in turn will be GHB, GHC, GXB and GLC.

In the last instance where the multiplier is 88 this is transformed algebraically into one operation in the units place, one operation in the tens place and two operations in the hundreds place making four operations altogether so that starting with the operation of the group relay GTC the others operated in turn are GTB, GHC, GXB and GLC.

Power circuit

The power arrangements for the device of the present arrangement are shown in Fig. 26. A gang switch 2600 has five blades 2601 to 2605, inclusive. The blade 2605 serves to connect a source of alternating current 2606 to the primaries 2607 and 2608 of a power transformer used for heating the filaments of the four gas tubes. This source of power may by way of example be 125 volts, 60 cycles. Each of the four tubes is shown as connected to a mid-tap secondary winding such as 2609, 2611 and 2612, the mid-tap of which is connected to ground here shown through the back contact and armature of the release relay 2613. Therefore when the switch 2600 is operated to place the device in operative condition the first result is to heat the filaments of each of the four tubes.

At the same time the blade 2602 connects one side of a source of 110 volts direct current to the ground bus bar 2614. A blade 2604 also connects a source of 48 volts negative direct current to the bus bar 2615 and a circuit is at the same time esetablished from this source of 48-volt negative direct current through the blade 2603 to the winding of a relay 2616 from which the circuit is extended through a resistance 2617 to the grounded bus bar 2614. Since the negative 48-volt source is also grounded the relay 2616 will be energized. This relay, however, is a slow-to-operate and quick-to-release relay the arrangement being such that the relay will operate in approximately twenty-five seconds. Thus after the switch 2600 is operated it will be in the neighborhood of twenty-five seconds before the relay 2616 operates its armature. At that time relay 2618 will be placed in parallel therewith and this relay being of ordinary arrangement will pull up its armature immediately and connect the positive terminal of the 110-volt source through the blade 2601 to the 110-volt bus bar 2619. The four tubes will have their anodes connected through their load circuits and fuse 2602 to this source of positive potential, the arrangement being such that the positive potential cannot be applied to the anode of any one of these tubes until the cathode has become fully heated and in operative condition.

There are four tubes as mentioned, tube 2621 being the OP tube. Tube 2622 is the EX tube which operates through the condenser 2623 to extinguish the OP tube. Tube 2624 is the LB tube and this operates through the condenser 2625 to extinguish the tube 2626 which is the LC tube.

The operation of the EX relay is shown in this diagram. Relay 2627 is shown as connected between the anode of the LC tube and positiive potential so that the EX relay is operated whenever the LC tube is in operation. The armature of the EX relay is connected to the firing point of the EX tube so that with the tube LC in operative condition the firing point of the EX tube will be connected in parallel with the firing point of the LB tube. Therefore when the LB tube fires it will at the same time cause the firing of the EX tube. Now when the tube LB is in operation relay EX will be released and therefore the firing point of the EX tube will be placed in parallel with the firing point of the LC tube so that when the LC tube does become fired the EX tube will fire simultaneously. The connection 2628 represents the firing point for the OP tube, the connection 2629 represents the firing point of the LB tube and connection 2630 represents the firing point of the LC tube.

It is believed that with the foregoing description the operation of the calculating device of the present invention will be clear.

What is claimed is:

1. In a calculator, a decimal code summing means having sets of augend, addend and sum code relays in each said decimal order, each said set of code relays consisting of a binary subgroup having a relay numerically weighted 0 and another numerically weighted 5, and a quinary subgroup having five relays numerically weighted 0, 1, 2, 3 and 4 respectively, means for operating said relays in pairs, one from each said subgroup, to express digital values corresponding to the sum of said weighted values, said augend and addend relays each having controlled contacts and circuits controlled by said contacts of said augend and addend relays for selectively operating said sum relays.

2. In a calculator, summing means comprising a plurality of decimal denominational orders, each said order having three similar sets of relays acting as augend, addend and sum means, each said set of relays consisting of two subgroups of relays, one of said subgroups consisting of a relay to express the value 0 and another relay to express the value 5, the other of said subgroups consisting of five relays to express the values 0, 1, 2, 3 and 4 respectively, means for operating said relays of a set in pairs one from each of said subgroups to express a digital value consisting of the sum of the values expressed by each of said two operated relays, a circuit network controlled by the said augend and said addend sets of relays for separately calculating the tens digit and the units digit of a sum of two digital values expressed by said augend and said addend relays and a carry over from a preceding decimal order, means for expressing said tens digit of said derived sum as a carry over to the next decimal order, said sum relays operating to express the said units digit of said derived sum.

3. In a calculator, electrical summing means comprising a plurality of decimal denominational orders each having a set of addend relays and two other sets of relays alternately acting as augend and sum relays for representing digital values in code and for calculating the sum of an augend and an addend, incoming and outgoing carry circuits for each said decimal denominational order, counting means for controlling the summing cycle, the said summing cycle being a controlled relay operation consisting of the operation of that set of relays at that time functioning as sum relays in accordance with the operated condition of that other set of relays at that time functioning as augend relays, the operated condition of said addend relays and the condition of said incoming carry circuits to register a sum on said sum relays and to accordingly affect the said outgoing carry circuits, and means to control the operation of said sum relays to express the sum in its true form or alternatively in its complemental form.

4. In a calculator, a plurality of sets of relays for expressing a number, each said set expressing a single digit of said number, each said set of relays consisting of a first subgroup of two relays for expressing the values 0 and 5 respectively and a second subgroup of five relays for expressing the values 0, 1, 2, 3 and 4 respectively, said set of relays expressing a digital value when two thereof, one from each of said subgroups, are energized, said digital value being equal to the sum of the individual values expressed by each of said two relays, a corresponding set of conductors for energizing said relays and a positive sign relay and a negative sign relay for connecting said conductors to said relays, said negative sign relay connecting said conductors to said relays in an order the inverse of the order by which said positive sign relay connects said conductors to said relays, the digital value expressed by said relays upon the operation of said negative sign relay being the nine's complement of the digital value expressed upon the operation of said positive sign relay, and means controlled by the said negative sign relay of the extreme right-hand set of relays for adding one to the sum expressed by said relays, whereby the ten's complement of said number is expressed.

5. In a calculator, a summing means consisting of a plurality of decimal denominational orders, each said order comprising three sets of relays for representing digital values in code, said sets of relays acting as augend, addend and sum means, circuits controlled jointly by said augend and addend relays for controlling said sum relays, and column shift means comprising switching means for switching the circuits established by the said augend and addend relays from their normally associated sum relays to the sum relays of a lower decimal denominational order.

6. In a calculator, a summing means consisting of a plurality of decimal denominational orders, each said order comprising augend, addend and sum elements, electrical circuits controlled jointly by the said augend and addend elements within each said order, said circuits normally controlling the said sum elements within the same order and column shift means for switching the said circuits from control of their normally associated sum elements to control of the sum elements of a lower decimal denominational order.

7. In a calculator, a summing means for performing multiplication by iterative addition, said summing means consisting of a plurality of decimal denominational orders, each said order comprising augend, addend and sum elements, multiplicand and multiplier registration means, counting means responsive to said multiplier registration means, a registered multiplicand being transmitted to and represented on said addend elements, electrical circuits controlled jointly by said augend and addend elements within each said order, said circuits normally controlling the said sum elements within the same order and column shift means responsive to said counting means upon the completion of each count representing a multiplier digit for switching the said circuits from control over their normally associated sum elements to control of the sum elements of a lower decimal denominational order.

8. In a calculator, summing means consisting of a plurality of decimal denominational orders, each having augend, addend, carry in, carry out and sum means, a plurality of conductors leading from and jointly controlled by said augend, addend and carry in means for controlling said sum means in each said decimal order, a first relay associated with each said decimal order for connecting said conductors to said sum means in said decimal order and a second relay in said decimal order for connecting the conductors of a higher decimal order to said sum means in said decimal order.

9. In a calculator, summing means consisting of a plurality of decimal denominational orders, each having augend, addend, carry in, carry out and sum means, a plurality of conductors leading from and jointly controlled by said augend, addend and carry in means for controlling said sum means in each said decimal order, a first relay associated with each said decimal order for connecting said conductors to said sum means in said decimal order and a second relay in said decimal order for connecting the conductors of a higher decimal order to said sum means in said decimal order, and multiplier digit controlled means for successively operating said first relay $(m-1)$ times and said second relay once during a summing operation characterized by a multiplier digit $n$.

10. In a calculator, summing means consisting of a plurality of decimal denominational orders each having augend, addend, carry in, carry out and sum means, a plurality of conductors leading from and jointly controlled by said augend, addend and carry in means for controlling said sum means in each said decimal order for registering a sum on the sum means thereof and a zero shift relay for establishing a controlling connection between the augend means of each decimal denominational order and the sum means of each respective preceding decimal order for registering a previously derived sum on the said sum means in a shifted relation thereto.

11. In a calculator, summing means consisting of a plurality of decimal denominational orders each having augend, addend, carry in, carry out and sum means, a plurality of conductors leading from and jointly controlled by said augend, said addend and said carry in means for controlling said sum means in each said decimal denominational order, a first relay in each said decimal order for connecting said conductors therein to said sum means therein, a second relay in each said decimal order for connecting the said conductors of a higher decimal order to said sum means therein, a common relay for all of said decimal orders having an individual set of contacts for each said decimal order excepting the highest of said decimal orders, for connecting the said augend means of each said decimal order to the sum means of each said next lower decimal order, and counting means set in accordance with multiplier digits for controlling the number of summing operations performed, means controlled by said counting means responsive to setting in accordance with any of the digits 1 or more for operating said first relay $(m-1)$ times and then said second relay once and responsive to setting in accordance with the digit 0 for operating said common relay.

12. In a calculator, electrical summing means comprising a plurality of decimal denominational orders each consisting of a set of augend, a set of addend and a set of sum relays for representing digital values in code, each said set of relays comprising two groups one consisting of two relays representing the values 0 and 5 respectively and the other consisting of five relays representing the values 0, 1, 2, 3 and 4 respectively, operating circuits for operating said addend relays from a point outside said decimal denominational order through the selection of one relay of each said group, operating circuits for said sum relays responsive to said augend relays, said addend relays and to carry channels for operating said sum relays through the selection of one relay of each said group, carry channels controlled by said sum relays for entering a carry in the next higher decimal denominational order and locking means for said sum relays for retaining a sum calculated for use as an augend in a subsequent summing operation, means being provided to transpose the functions of said augend and said sum relays after each summing cycle.

13. In a calculator, summing means comprising a plurality of decimal denominational orders, each said order having one group of relays for representing addend digital values in code and two similar sets of relays for alternatively representing augend and sum digital values in code one of said sets functioning as augend means while the other of said sets is functioning as sum means, said sets of relays each being divided into two subgroups, one of said subgroups being arranged on a binary basis and the other of said subgroups being arranged on a quinary basis, alternative sets of incoming carry 0 and carry 1 leads for transmitting decimal carries into a decimal denominational order, alternative sets of outgoing carry 0 and carry 1 leads for transmitting decimal carries from a decimal denominational order and a single set of inter-subgroup carry leads for transmitting binary carries from said quinary subgroups to said binary subgroups, said inter-subgroup carry leads being invariably used in combination of either set of said alternative sets of carry in and carry out leads.

14. In a calculator, summing means comprising a plurality of decimal denominational orders, each said order having a group of augend, addend and sum relays, means for operating said augend and said addend relays to represent digital values, said augend and said addend relays having controlled contacts, each said group being divided into a binary and a quinary subgroup, incoming carry 0 and carry 1 decimal carry leads and outgoing carry 0 and carry 1 decimal carry leads for each said decimal order, a carry lead network and a calculating network controlled by the said contacts of the said augend and addend relays within each said order, said incoming carry leads entering both said networks and said outgoing carry leads coming from said carry network and under control of said calculating network, said sum relays being operated over said calculating network.

15. In a calculator, summing means comprising a plurality of decimal denominational orders, each said order having a group of augend, addend and sum relays for representing digital values in code, means for operating said augend and said addend relays, said augend and addend relays each having controlled contacts, a calculating network controlled by the said contacts of said augend and addend relays for operating said sum relays, each said group of relays being divided into a binary and a quinary subgroup, incoming decimal carry leads, outgoing decimal carry leads and inter-subgroup binary carry leads, the incoming carry leads further controlling the said calculating network in the group into which they enter and the outgoing carry leads being controlled by the said calculating network in the group from which they lead.

16. In a calculator, summing means comprising a plurality of decimal denominational orders, each said order having a group of augend, addend and sum relays for representing digital values in code, means for operating said augend and addend relays, contacts controlled by said augend and addend relays for operating said sum relays, each said group of relays being divided into a binary and a quinary subgroup, incoming carry 0 and carry 1 leads, for further controlling the operation of said sum relays, outgoing carry 0 and carry 1 leads and inter-subgroup carry leads for each said order, the said incoming carry leads being selectively extended to said outgoing carry leads over said inter-subgroup carry leads under control of said augend and addend relays.

17. In a calculator, summing means comprising a plurality of decimal denominational orders, each said order having two groups of augend, addend and sum relays for representing digital values in code, one group being arranged on a binary basis and the other group being arranged on a quinary basis, means for operating said augend and said addend relays, contacts controlled by said augend and said addend relays, carry leads incoming to each said decimal order for decimal carries from a preceding decimal order, carry leads outgoing from each said decimal order for decimal carries to a succeeding decimal order and intergroup carry leads for code carries within each said decimal order, and means including said incoming carry leads and said augend and addend relay contacts for operating said sum relays.

18. In a calculator, summing means comprising a plurality of decimal denominational orders, each said order having two groups of augend, addend and sum relays for representing digital values in code, one group being arranged on a binary basis and the other group being arranged on a quinary basis, means for operating said augend and said addend relays, contacts controlled by said augend and said addend relays, a carry 0 lead and a carry 1 lead incoming to each said decimal order for transmitting carries from a preceding decimal order, a carry 0 lead and a carry 1 lead outgoing from each said decimal order for transmitting carries to a succeeding decimal order intergroup carry leads for transmitting code carries from said quinary group to said binary group within each said decimal order, and means including said incoming carry leads and said augend and addend relay contacts for operating said sum relays.

19. In a calculator, summing means comprising a plurality of decimal denominational orders, each said order having groups of augend, addend and sum relays for representing digital values in code, said augend and sum relays being functionally interchangeable, means for determining which group will at a given time function as augend relays and correspondingly which remaining group will function as sum relays, a carry 0 and a carry 1 lead incoming to each said decimal order for each said group of augend and sum relays and a carry 0 and a carry 1 lead outgoing from each said group of augend and sum relays and selective means for rendering a particular set of incoming and outgoing carry 0 and carry 1 leads effective under control of said determining means.

20. In a calculator, summing means consisting of a plurality of decimal denominational orders each having augend, addend, and sum means for normally registering on said sum means the sum of the values registered in said augend and addend means, column shifting means consisting of means for coupling the said addend and said augend means of each said decimal order with the said sum means of each next lower decimal order respectively, means for inverting the connections between the said augend and addend means and the said sum means for registering the sum as the complement thereof on the said sum means, a counting means for controlling the number of summing operations to be performed when said summing means is employed in iterative addition operations for multiplication, for operating said shifting means and said inverting means on the last summing operation for each multiplier digit, means for inverting the number registered in said counting means, said last means being responsive to the registration of any multiplier digit greater than four whereby said counting means is limited to counting a maximum of five, means responsive to the registration of a digit greater than four for operating said sum inversion means upon the operation of said shifting means and for thereafter automatically performing an additional summing operation whereby the addend is added to the said shifted and inverted sum.

21. In a calculator, summing means consisting of a plurality of decimal denominal orders each having augend, addend and sum means normally in cooperative relationship with one another, column shifting means consisting of means for cooperatively coupling the said augend and addend means of each said decimal order with the sum means of each next lower order respectively, means for inverting the connections to said sum means for registering a sum as the complement thereof, a counting means for controlling the number of summing operations to be performed when said summing means is employed in iterative addition operations for multiplication, number keys for registering multiplier digits for the selective operation of said counting means, inverting means for operating said counting means in accordance with the complement of any number key number greater than four, means responsive thereto for operating said first inverting means simultaneously with said shifting means on the last summing operation of any multiplier digit when the next multiplier digit is in its natural form and means for deferring this operation when the next multiplier digit is in its complemental form, and means responsive to the said triple operation of summing, shifting and inverting to automatically perform an additional summing operation.

22. In a calculator, summing means comprising a plurality of decimal denominational orders each consisting of a group of addend relays and two other similar groups of relays alternately acting as augend means and sum means, a summing cycle control means comprising an operating gas tube and a pair of locking gas tubes corresponding respectively to said augend and sum groups of relays, each of said tubes having a grid circuit, a chain circuit closed by those relays of that group at a time acting as sum means when each and every one of the relays of the said group is in released position for closing the said grid circuit of said operating tube, a circuit closed by said operating tube controlled by the selective operation of said addend relays and the relays of said other group of relays at a time acting as augend means for operating said sum relays, another chain circuit closed by the operated ones of said sum relays for closing the grid circuit of said locking tube associated with that group of relays now operated in accordance with a derived sum for locking said operated sum relays, means controlled by said last tube upon its operation for releasing the others of said tubes, whereby those relays of that group up to this time acting as augend means are released ready to act as sum means in another cycle similar to that above described, the said described cycle constituting a half cycle of a complete summing cycle, and a counting means for controlling the number of half summing cycles to be performed.

23. In a calculator, summing means comprising a plurality of decimal denominational orders each consisting of a group of addend relays and two other similar groups of relays alternately acting as augend means and sum means respectively, each said group of relays consisting of two relays constituting a binary subgroup and five relays constituting a quinary subgroup, said groups of relays expressing digital values by the operation of one and one only of the relays in the said binary subgroup and the operation of one and one only of the relays in the said quinary subgroup, two groups of associated switching relays individual to each said decimal denominational order, a counting arrangement consisting of two groups of relays associated respectively with said two groups of relays acting alternately as augend and sum means, a group of common switching relays and a plurality of group relays associated with each said group of counting relays for controlling said individual and said common switching relays, an operating gas tube for causing the operation of sum and counting relays on each half summing cycle, said operating tube having a grid circuit controlled by a chain circuit extending in series through back contacts of each and every one of those relays of that group acting at a time as sum means, back contacts of each and every one of said associated counting relays, back contacts of each and every one of said associated switching relays and back contacts of each and every one of said associated common switching and group relays, circuits controlled by the selective operation of said addend relays, the relays of the said one of said groups acting at the same time as augend means and the said associated switching relays and responsive to the operation of said operating tube for operating the said relays of the group at the said time acting as sum means and for thereby opening said chain circuit to said operating tube grid circuit, a locking gas tube associated with each said group of relays, each said tube having a grid circuit controlled by a chain circuit extending in series through a circuit responsive to the operation of one and one only of the said relays of each of the said binary subgroups and one and one only of the said relays of each of the said quinary subgroups, similar circuits controlled by the associated counting relays of the group just operated as sum relays for locking the operated relays of said group independently of the original said operating circuits therefor and means controlled by said locking tube for extinguishing said other locking tube and said operating tube to release all relays of the said group acting through said operations as augend means in preparation for a subsequent series of like operations wherein said released relays will act as sum means and said operated and locked relays will act as augend means.

24. In a calculator, a summing cycle control consisting of two like sets of serially numbered counting relays, means to selectively operate the relays of one of said sets, an operating gas tube having a grid circuit for setting said tube into operation, a chain circuit completed through the back contacts of each and every one of said other of said sets of counting relays to close said grid circuit, means responsive to the consequent operation of said operating gas tube and controlled by said selectively operated relay for operating the next lower numbered counting relay of said other set and for opening said chain circuit, a locking gas tube having a grid circuit for setting said tube into operation, a second chain circuit completed through the front contacts of one and one only of a group of said other set of counting relays to close the said grid circuit of said locking gas tube, means controlled by the consequent operation of said locking tube for locking in said operated counting relay and for releasing the operated counting relays of said first set whereby the said counting relays are counted down by the alternate operation in each case of the next lower numbered relay of the other set under the mutual control exercised between said relays and said gas tubes.

25. In a calculator, a counting relay arrangement for controlling the summing cycle of said calculator, consisting of two like sets of serially numbered relays each set alternately acting as the companion to the other to hold a registration while the other is being released to receive a new registration, the counting being accomplished through the control by each relay over the next lower numbered relay in the other of said sets, whereby and in accordance with the odd or even character of the number to be counted the even-numbered relays of one set and the odd-numbered relays of the other of said sets are alternately operated, or alternatively the odd-numbered relays of one set and the even-numbered relays of the other of said sets are alternately operated, and means controlled by the lowest numbered relay of each said set for terminating a counting operation.

26. In a calculator, electrical summing means comprising a plurality of decimal denominational orders each having a set of addend relays and two other sets of relays alternately acting as augend and sum relays for representing digital values in code and for calculating the sum of an augend and an addend, incoming and outgoing carry circuits for each said decimal denominational order, counting means for controlling the summing cycle, the said summing cycle being a controlled relay operation consisting of the operation of that set of relays at that time functioning as sum relays in accordance with the operated condition of that other set of relays at that time functioning as augend relays, the operated condition of said addend relays and the condition of said incoming carry circuits, to register a sum on said sum relays and to accordingly affect the said outgoing carry circuits, positive relays for causing said sum to be registered in its derived form, negative relays for causing said sum to be registered as the complement of said derived sum and means for selectively operating said positive and negative relays.

27. In a calculator, electrical summing means comprising a plurality of decimal denominational orders each having a set of addend relays and two other sets of relays alternately acting as augend and sum relays for representing digital values in code and for calculating the sum of an augend and an addend, positive sign relays for causing a sum to be expressed in its true form, negative sign relays for causing a sum to be expressed in its complemental form, incoming and outgoing carry circuits for each said decimal denominational order, counting means for controlling the summing cycle, the said summing cycle being a controlled relay operation consisting of the operation of that set of relays at that time functioning as sum relays in accordance with the operated condition of that other set of relays at that time functioning as augend relays, the operated condition of said addend relay, the operated condition of said sign relays and the condition of said incoming carry circuits, to register a sum on said sum relays and to accordingly affect the said outgoing carry circuits.

28. In a calculator, a set of relays to express a digital value in code consisting of one relay operated in each of two sections, one of said sections consisting of two relays having the values 0 and 5 respectively arranged in order of ascending values and the other of said sections having five relays having the values 0, 1, 2, 3 and 4, respectively, arranged in order of ascending values, and means for expressing the nine's complement of said digital value in code consisting of switching means for changing the connections to said relays to invert the order of values of said relays in each of said sections.

29. In a calculator, a set of A relays, each having a set of controlled contacts, two other sets of B and C relays each having a winding and a set of controlled contacts, switching relays for establishing circuit networks through the said controlled contacts of said A and B relays to the windings of said C relays, other switching relays for establishing circuit networks through the said controlled contacts of said A and C relays to the windings of said B relays and means for alternately operating said switching relays.

30. In a calculator, a set of A relays in a decimal code arrangement to register an addend, each said relay having a set of controlled contacts, two other like sets of B and C relays in like decimal code arrangements, one set being employed for registering an augend while the other set thereof is being employed for registering a sum, each said relay having a winding and a set of controlled contacts, a first set of switching relays for establishing circuit networks through the said controlled contacts of said A and B relays to the windings of said C relays, a second set of switching relays for establishing circuit networks through the said controlled contacts of said A and C relays to the windings of said B relays, and means for alternately operating said switching relays.

31. In a calculator, a set of A relays in a decimal code arrangement to register an addend, each said relay having a set of controlled contacts, two other like sets of B and C relays in like decimal code arrangements, one set being employed for registering an augend while the other set thereof being employed for registering a sum, each said relay having a winding and a set of controlled contacts, a first set of switching relays for establishing circuit networks through the said controlled contacts of said A and B relays to the windings of said C relays, a second set of switching relays for establishing circuit networks through the said controlled contacts of said A and C relays to the windings of said B relays, means for alternately operating said switching relays and multiplier digit counting means for controlling said last means.

32. In a calculator, a set of A relays, consisting of a plurality of decimal orders each said order comprising two groups one consisting of two relays representing the values 0 and 5 respectively and the other consisting of five relays representing the values 0, 1, 2, 3 and 4 respectively, said relays representing the digital values through the selective operation of one relay of each of said two groups, each of said relays having a set of controlled contacts, two other like sets of B and C relays each having a winding and a set of controlled contacts, a first set of switching relays for establishing circuit networks through the said controlled contacts of said A and B relays to the windings of said C relays to operate said C relays in accordance with the sum of the values expressed by said A and B relays, a second set of switching relays for establishing circuit networks through the said controlled contacts of said A and C relays to the windings of said B relays to operate said B relays in accordance with the sum of the values expressed by said A and C relays, and means for alternatively operating said switching relays.

33. In a calculator, a set of A relays, consisting of a plurality of decimal orders each said order comprising two groups one consisting of two relays representing the values 0 and 5 respectively and the other consisting of five relays representing the values 0, 1, 2, 3, and 4, respectively, said relays representing the digital values through the selective operation of one relay of each of said two groups, each of said relays having a set of controlled contacts, two other like sets of B and C relays each having a winding and a set of controlled contacts, a first set of switching relays for establishing circuit networks through the said controlled contacts of said A and B relays to the windings of said C relays to operate said C relays in accordance with the sum of the values expressed by said A and B relays, a second set of switching relays for establishing circuit networks through the said controlled contacts of said A and C relays to the windings of said B relays to operate said B relays in accordance with the sum of the values expressed by said A and C relays, means for alternately operating said switching relays, a multiplier digit registering means and counting means controlled by said multiplier digit registering means for controlling said means for operating said switching relays.

34. In a calculator, summing means comprising a plurality of decimal denominational orders each consisting of a group of augend relays, a group of addend relays and a group of sum relays, a summing cycle control means including an up-check circuit controlled by said sum relays closed by the operation thereof when and only when said sum relays have responded properly to circuits controlled by said augend and said addend relays, a down-check circuit controlled by said sum relays closed by the release of each and every one thereof and a plurality of gas tubes, said down-check circuit controlling the firing of an operating tube for operating said sum relays through the contacts of said augend and addend relays, said up-check circuit controlling the firing of a locking tube for locking the properly operated sum relays and means controlled by the firing of said locking tube to extinguish said operating tube.

35. In a calculator, summing means comprising a plurality of decimal denominational orders each consisting of a group of A augend relays and two like groups of B and C relays alternatively acting as addend and sum relays, circuits controlled by contacts of augend and addend relays for operating sum relays, up-check circuits controlled by said B relays and said C relays responsive to proper operation thereof, down-check circuits controlled by said B relays and said C relays responsive to the complete release thereof, an operating OP tube for supplying power through the contacts of said A augend relays and said B addend relays to operate said C sum relays or alternatively through the contacts of said A augend relays and said C addend relays to operate said B sum relays, said OP tube being responsive to said C down-check circuit or alternatively to said B down-check circuit respectively, locking tubes LB and LC responsive to the B up-check circuit and the C up-check circuit respectively for locking the operated B and C relays respectively, and circuits controlled by said LB tube for extinguishing said OP and said LC tubes and controlled by said LC tube for extinguishing said OP and said LB tubes.

36. In a calculator, summing means comprising a plurality of decimal denominational orders each consisting of a group of A augend relays and two like groups of B and C relays alternatively acting as addend and sum relays, circuits controlled by contacts of augend and addend relays for operating sum relays, up-check circuits controlled by said B relays and said C relays responsive to proper operation thereof, down-check circuits controlled by said B relays and said C relays responsive to the complete release thereof, an operating OP tube for supplying power through the contacts of said A augend relays and said B addend relays to operate said C sum relays or alternatively through the contacts of said A augend relays and said C addend relays to operate said B sum relays, said OP tube being responsive to said C down-check circuit or alternatively to said B down-check circuit respectively, locking tubes LB and LC responsive to the B up-check circuit and the C up-check circuit respectively for locking the operated B and C relays respectively, circuits controlled by said LB tube for extinguishing said OP and said LC tubes and controlled by said LC tube for extinguishing said OP and said LB tubes, and counting means selectively set to any desired number of counting and controlling the number of summing operations performed by said summing means.

37. In a calculator, a counting relay arrangement for controlling the summing cycle of said calculator, consisting of two like sets of serially numbered relays, means for counting down by operating a single relay for each count alternately from said two sets of relays, each relay performing the double duty of (1) counting and (2) acting as the companion to the last operated relay of the other set to hold a registration while the other is being released to receive a new registration.

38. In a calculator, means for performing multiplication by a short-cut method comprising means for entering a multiplicand, means for entering a multiplier digit, accumulating means, means for iteratively adding said entered multiplicand on said accumulating means, counting means for terminating the operation of said iterative adding means, means for entering a multiplier digit less than five in its natural value, means for entering a multiplier digit greater than four in its nine's complement value, said counting means being under control of said multiplier digit entering means, shifting means under control of said couting means and responsive to the terminating operation thereof for shifting a number registered in said accumulating means one place to the right, means for inverting a number registered in said accumulating means to its nine's complement, said inverting means being responsive to said means for entering a multiplier digit greater than four and a means further and thereafter responsive to said means for entering a multiplier digit greater than four for adding said entered multiplicand to the said shifted and inverted number registered in said accumulator.

39. In a calculator, means for performing multiplication by a short-cut method comprising means for entering a multiplicand, means for entering a multiplier, means for translating said entered multiplier into a plurality of derived positive and negative digits in accordance with a predetermined mathematical plan, accumulating means, means for iteratively adding said entered multiplicand on said accumulating means, counting means sequentially responsive to each of said derived multiplier digits for terminating the operation of said iterative adding means, shifting means under control of said counting means and responsive to the terminating operation thereof for shifting a number registered in said accumulating means one place to the right, and means for inverting a number registered in said accumulating means to its nine's complement, said inverting means being responsive to a first negative derived multiplier digit or a changed sign derived multiplier digit in the sequential use of said derived multiplier digits.

40. In a calculator, means for performing multiplication by a short-cut method comprising means for entering a multiplicand, means for entering a multiplier, means for translating said entered multiplier into a plurality of derived positive and negative digits in accordance with a predetermined mathematical plan, accumulating means, means for iteratively adding said entered multiplicand on said accumulating means, counting means sequentially responsive to each of said derived multiplier digits for terminating the operation of said iterative adding means, shifting means under control of said counting means and responsive to the terminating operation thereof for shifting a number registered in said accumulating means one place to the right, said shifting means being further responsive to a zero derived multiplier digit, and means for inverting a number registered in said accumulating means to its nine's complement, said inverting means being responsive to a first negative derived multiplier digit or a changed sign derived multiplier digit in the sequential use of said derived multiplier digits.

GEORGE R. STIBITZ.

REFERENCES CITED

The following references are of record in the file of this patent:

UNITED STATES PATENTS

| Number | Name | Date |
|---|---|---|
| 1,813,830 | Weiner | July 7, 193 |
| 2,099,754 | Robinson | Nov. 23, 193 |
| 2,131,497 | Borel | Sept. 27, 193 |
| 2,176,934 | Smith | Oct. 24, 193 |
| 2,185,681 | Paris | July 11, 193 |
| 2,210,574 | Fitch | Aug. 6, 194 |
| 2,253,596 | Wright | Aug. 26, 194 |
| 2,364,540 | Luhn | Dec. 5, 194 |
| 2,386,763 | Williams | Oct. 16, 194 |
| 2,402,988 | Dickinson | July 2, 194 |
| 2,420,167 | Dickinson | May 6, 194 |
| 2,424,100 | Lang | July 15, 194 |